United States Patent [19]

Sakamoto et al.

[11] Patent Number: 5,027,275

[45] Date of Patent: Jun. 25, 1991

[54] METHOD FOR TOE ANGLE ADJUSTMENT FOR A VEHICLE AND A TOE ANGLE ADJUSTING APPARATUS THEREFOR

[75] Inventors: Shunji Sakamoto; Tuyoshi Watanabe; Hironobu Koda, all of Hiroshima, Japan

[73] Assignee: Mazda Motor Corporation, Hiroshima, Japan

[21] Appl. No.: 277,346

[22] Filed: Nov. 29, 1988

[30] Foreign Application Priority Data

Nov. 30, 1987 [JP] Japan .................. 62-300193
Dec. 26, 1987 [JP] Japan .................. 62-330466
Jan. 14, 1988 [JP] Japan .................. 63-4967
Feb. 1, 1988 [JP] Japan .................. 63-21778

[51] Int. Cl.$^5$ ............................................ B26D 5/06
[52] U.S. Cl. ........................... 364/424.05; 364/551.02; 280/95.1; 29/273; 33/203.18
[58] Field of Search ............ 364/364.05, 551.02; 33/203.18, 288; 29/273; 280/661, 95.1

[56] References Cited

U.S. PATENT DOCUMENTS

| | | | |
|---|---|---|---|
| 4,381,548 | 4/1983 | Grossman | 33/288 |
| 4,600,205 | 7/1986 | Stewart et al. | 280/95.1 |
| 4,679,327 | 7/1987 | Fouchey et al. | 33/288 |
| 4,745,469 | 5/1988 | Waldecker et al. | 29/273 |
| 4,761,749 | 8/1988 | Titsworth et al. | 33/288 |
| 4,835,714 | 5/1989 | Sano et al. | 33/288 |

*Primary Examiner*—Parshotam S. Lall
*Assistant Examiner*—Tyrone Queen
*Attorney, Agent, or Firm*—Fish & Richardson

[57] ABSTRACT

A toe angle adjusting method is a method wherein the toe angle of the rear wheels is adjusted for only one of the rear wheels, and the toe angle adjustment for the front wheels is performed subsequent to adjustment for the rear wheels. The toe angle adjustment for the front wheels is based on a composite angle of the rear wheels, or a forward direction, decided by a relative relationship between the rear wheels. The toe angle adjustment for the front wheels includes adjustment of a toe angle for the front wheels and a horizontal adjustment of the steering wheel to a horizontal position or neutral state. The toe angle of the front wheels is adjusted in a state when the front wheels are turned, and the horizontal adjustment for the steering wheel is performed by adjusting a tire angle of the front wheels. The toe angle adjustment for the front wheels is implemented on the basis of a forward advancing direction of the vehicle. This direction is determined on the basis of the relationship between the rear wheels. The toe angle of the front wheels is detected on the basis of the measured tire angle of the front wheels that is defined so as to contain a steered angle of the front wheels corresponding to a steered angle of the steering wheel. Thus the toe angle of the front wheels is adjusted.

22 Claims, 36 Drawing Sheets

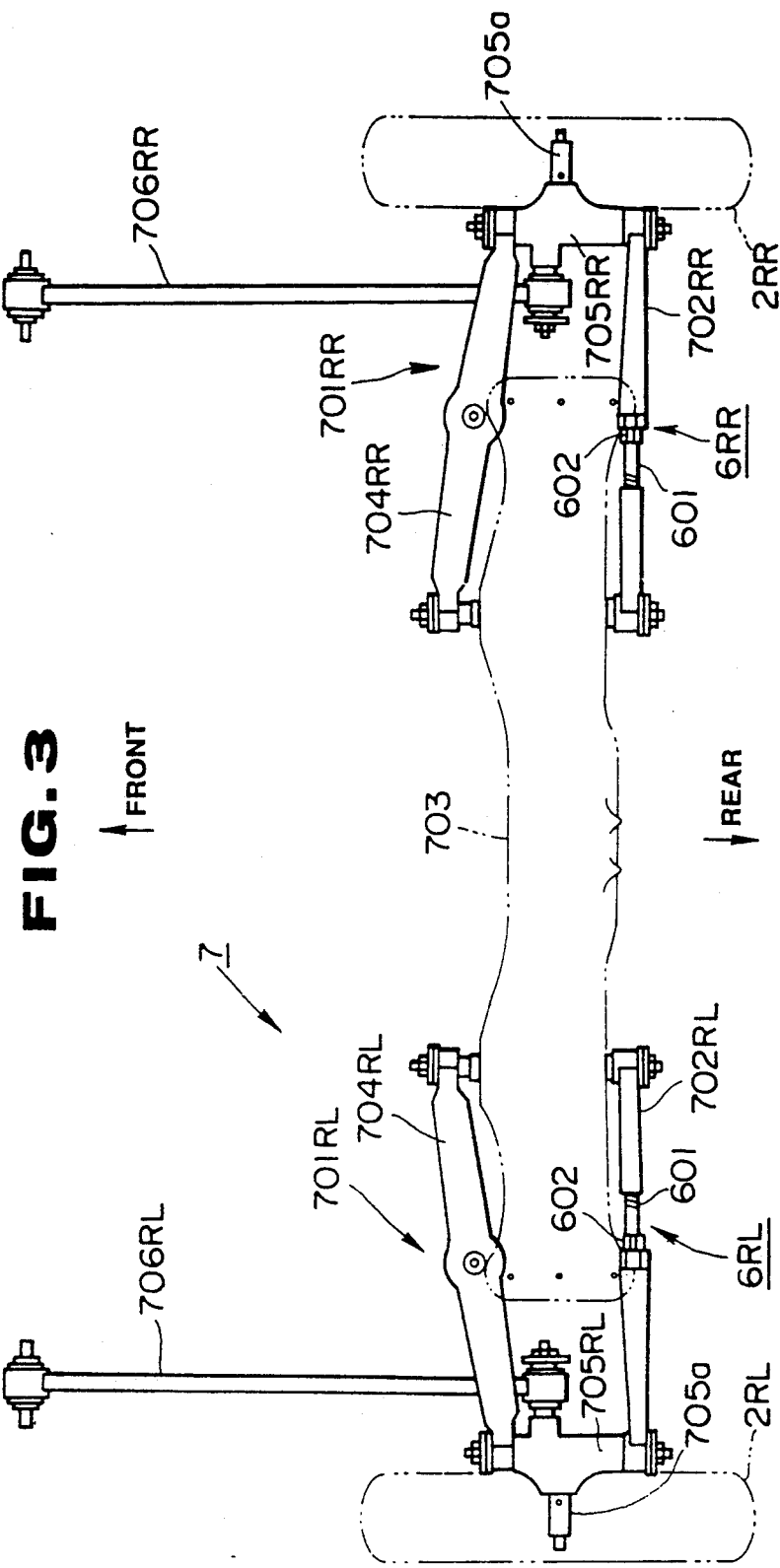
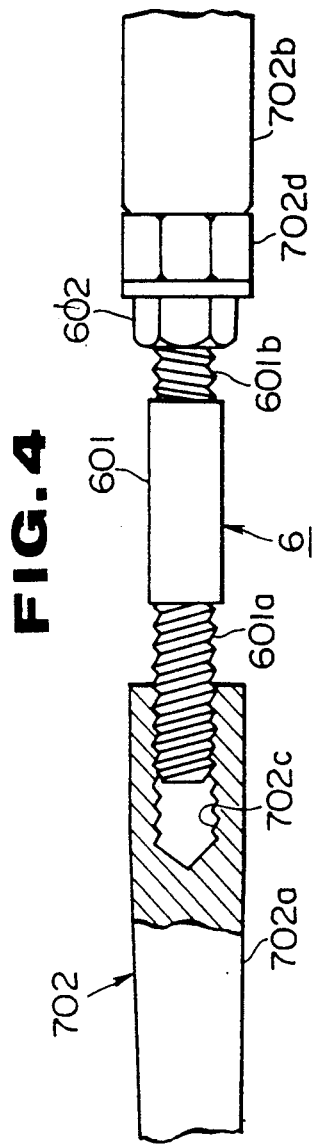
FIG. 3
FIG. 4

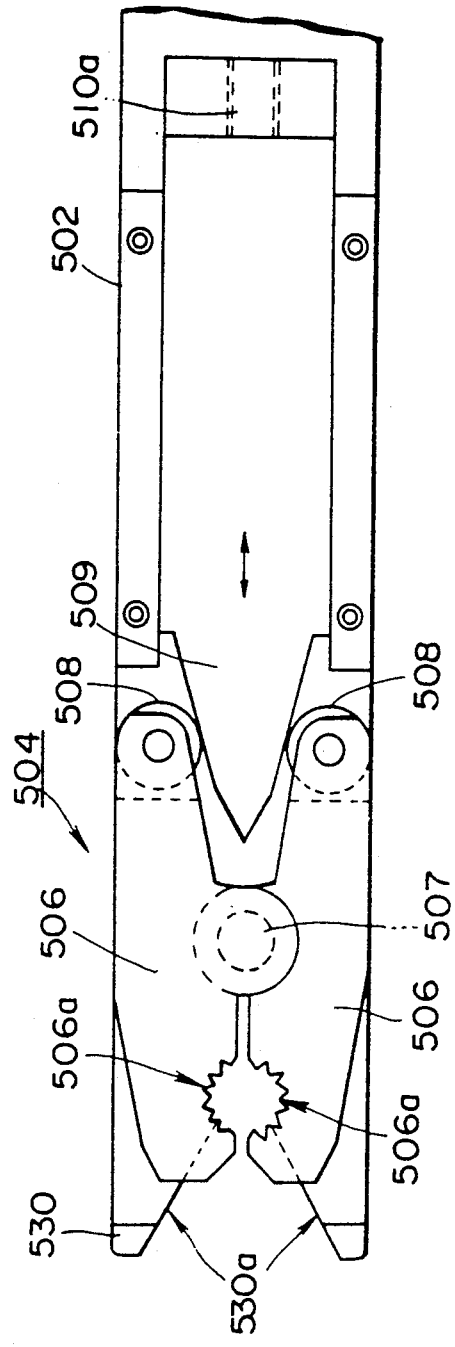
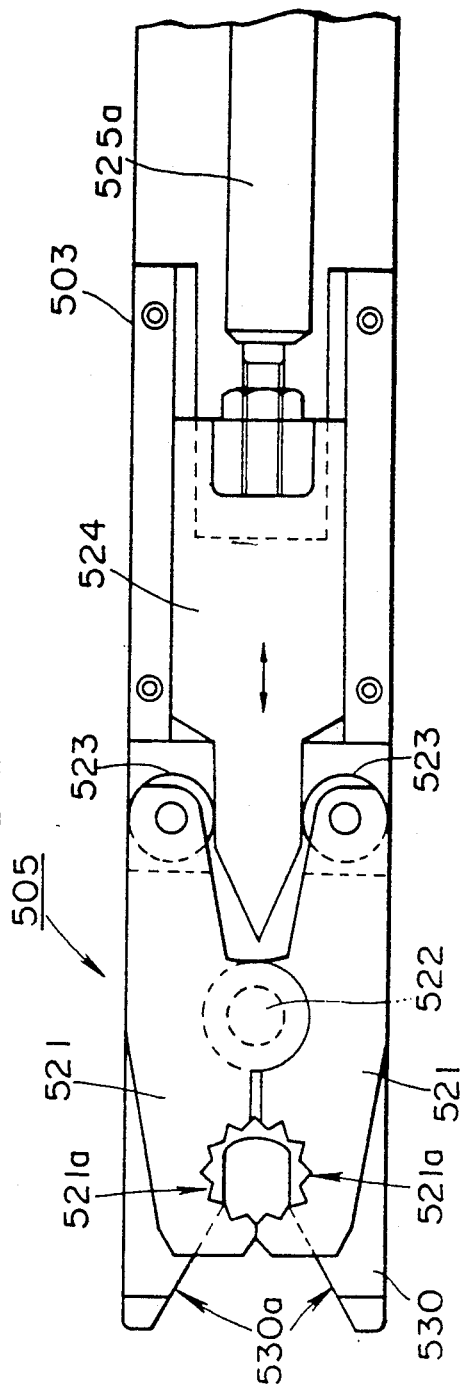

FIG. 39

| VEHICLE MODEL | TOE-IN AMOUNT | | OFFSET AMOUNT ($\alpha$) |
|---|---|---|---|
| | FRONT WHEEL ($\theta F$) | REAR WHEEL ($\theta R$) | |
| A | 1～7mm | 3～6mm | -2°～+2° |
| B | — | — | — |
| C | — | — | — |
| . | — | — | — |
| . | — | — | — |
| . | — | — | — |
| . | — | — | — |

FIG. 40

| VEHICLE MODEL | | STEERED ANGLE OF A STEERING WHEEL | 1° | 2° | 3° | 4° | - - - - |
|---|---|---|---|---|---|---|---|
| A | WITH A POWER STEERING | θ FR' | — | — | — | — | — — |
| | | θ FL' | — | — | — | — | — — |
| | NORMAL | θ FR' | — | — | — | — | — — |
| | | θ FL' | — | — | — | — | — — |
| B | WITH A POWER STEERING | θ FR' | — | — | — | — | — — |
| | | θ FL' | — | — | — | — | — — |
| | NORMAL | θ FR' | — | — | — | — | — — |
| | | θ FL' | — | — | — | — | — — |
| | | — | — | — | — | — | - - - - |
| | | — | — | — | — | — | - - - - |
| | | — | — | — | — | — | - - - - |

METHOD FOR TOE ANGLE ADJUSTMENT FOR A VEHICLE AND A TOE ANGLE ADJUSTING APPARATUS THEREFOR

BACKGROUND OF THE INVENTION

1. Field of the Invention

The present invention relates to a method for toe angle adjustment for a vehicle and a toe angle adjusting apparatus therefor.

2. Description of Related Art

A toe angle checking step is provided downstream in a vehicle assembly line for vehicles, in which a final adjustment is performed for a toe angle of the wheel (an angle between the plane of the wheel and the vertical plane). At this end, the wheels of the vehicle are provided each with a toe angle adjusting mechanism. Conventionally, for example, for the front wheels, such a toe angle adjusting mechanism is usually mounted on a tie rod that is one mechanism element for a steering mechanism. Various types of toe angle adjusting mechanisms are known. Japanese Utility Model Application (laid-open) No. 103,005/1985 discloses a toe angle adjusting mechanism of a type using a toe angle adjusting rod with a threaded portion. More specifically, the toe angle adjusting mechanism of this type is such that, for example, when the toe angle adjusting rod is mounted on the tie rod, the tie rod is arranged so as to extend or shorten its lengthwise dimension by a length corresponding to a screwed pitch of the threaded portion thereof when the toe angle adjusting rod makes one full revolution, thus shortening the toe angle in a toe-in or toe-out direction and changing a direction in which the vehicle advances.

At the toe angle checking step in the vehicle assembly line, there are performed a horizontal adjustment of a steering wheel, or adjustment of the steering wheel so as take a horizontal position, or a neutral position, and the mounting of the steering wheel, in addition to adjustment for toe angles of right-hand and left-hand front wheels as well as right-hand and left-hand rear wheels.

The toe angle adjustment has been performed on the basis of a result of measuring tire angles of the wheels. Measurement of tire angles may be made by various known techniques, such as the technique involving operation of a tire angle from a side force of each wheel rotating on a drum using a so-called dynamic toe tester or the technique, as disclosed in Japanese Patent Publication (laid-open) No. 100,307/1982, involving a direct determination of a tire angle from an angle of inclination of a measuring plate disposed so as to abut with an outer surface of the vehicle. In such conventional toe angle adjustment, a toe angle of each wheel has been adjusted by an operator on the basis of a toe angle adjusting amount displayed on a display screen. The toe angle adjusting amount, however, has been determined on the basis of a device for measuring a toe angle of the wheel, or a tire angle measuring device. More particularly, a center line extending in a longitudinal direction of the vehicle cannot be measured so that a reference line formed by the tire angle measuring device is regarded as a center line of the vehicle and a tire angle of the wheels obtained upon measurement by means of the tire angle measuring devices is regarded as a toe angle thereof. This technique may offer the advantage that the front and rear wheels can be adjusted on the basis of the same reference line.

However, it has been necessary to check every wheel as to whether the toe angle adjustment should be performed and, as a matter of course, if it has been found the toe angle adjustment required for all the wheels, the toe angle adjustment has been performed for all the wheels. It is apparently understood that the toe angle adjustment for all the wheels is very laborious and, even if the adjustment would be rendered automatic, a toe angle adjusting device should be disposed for every wheel.

Japanese Patent Publication (Laid-open) No. 48,875/1986 discloses an example of automation of the toe angle adjustment which involves adjusting a tire angle of the wheel so as to reach a predetermined target toe angle (as a reference value) on the basis of a found tire angle measured by a tire angle measuring device, the found tire angle being regarded in this example as a toe angle. In other words, this example performs the toe angle adjustment on the basis of the tire angle measuring device. In this case, the vehicle is provided with a toe angle adjusting mechanism consisting of a cam bolt with an eccentric cam, the cam bolt being designed so as to be rotatable about its axis leading to the toe angle adjustment. Accordingly, a toe angle adjusting amount that can be adjusted by this prior embodiment should become very small. A toe angle adjusting device basically comprises a mechanism for rotating a cam head.

Another technique is disclosed in Japanese Patent Publication (Laid-open) No. 100,307/1982, which regards a tire angle on the basis of a composite angle of the left-hand and right-hand wheels as a toe angle, while the technique disclosed in Japanese Patent Publication (Laid-opne) No. 48,875/1986 regards the found tire angle on the basis of the tire angle measuring device as a toe angle.

The composite angle disclosed in Japanese Patent Publication (Laid-open) No. 100,307/1982 is defined as follows:

$$\text{Composite Angle of Rear Wheels} = \frac{\theta R + \theta L}{2}$$

(where)
- $\theta R$ = a found tire angle of the right-hand rear wheel measured by the tire angle measuring device; and
- $\theta L$ = a found tire angle of the left-hand rear wheel measured by the tire angle measuring device, provided, however, that one of $\theta R$ and $\theta L$ is represented by positive sign (+) and that the other is represented by negative sign (−).

The composite angle of the rear wheels means a direction in which the vehicle advances straight, a direction being decided on the basis of a relative relationship of the right-hand rear wheel with the left-hand rear wheel. Thus it is to be understood that the found tire angle is corrected on the basis of the composite angle of the rear wheels and that the corrected tire angle is regarded as a toe angle. The toe angle for the right-hand rear wheel may be computed as follows:

$$\text{Toe angle of right-hand rear wheel} = \theta R - (\text{Composite angle of rear wheels})$$

A composite angle of front wheels may be defined as follows:

$$\text{Composite Angle of Front Wheels} = \frac{\theta R + \theta L}{2}$$

(where)

$\theta R$ = a tire angle of the right-hand front wheel measured by the tire angle measuring device; and $\theta L$ = a found tire angle of the left-hand front wheel measured by the tire angle measuring device, provided, however, that one of $\theta R$ and $\theta L$ is represented by positive sign (+) and that the other is represented by negative sign (−).

For a toe angle for the front wheel, like the toe angle for the rear wheel, the tire angle measured is corrected on the basis of the composite angle of the front wheels in substantially the same manner as that measured for the rear wheels, and the corrected tire angle is regarded as a toe angle for the front wheel.

The above technology is based on adjustment for the toe angle of the front wheels on the basis of the composite angle of the front wheels, independently from adjustment for the toe angle of the rear wheels on the basis of the rear wheels. This technique permits a uniformity in the toe angle adjusting amounts for both the left-hand and right-hand front wheels as well as for both the left-hand and right-hand rear wheels. However, this technique likewise requires the toe angle adjustment for all the wheels. If there is a deviation between the composite angle of the front wheels and the composite angle of the rear wheels, the front wheels and the rear wheels are adjusted on a different refernce line.

If the toe angles of the front and rear wheels are deviated from referece values, the corresponding wheel or wheels is or are subjected to the toe angle adjustment for correction.

Japanese Patent Publication (Laid-open) No. 100,307/1982 discloses adjustment of a steering wheel to a horizontal position, that, adjustment so as to allow the steering wheel to take a horizontal position, or a neutral position, when the vehicle advances straight. This adjustment will sometimes be called horizontal adjustment in the following description. In the disclosure in this prior patent application, the horizontal adjustment is designed so as to be performed by adjusting a state in which the steering wheel should be mounted. More specifically, the steering wheel is mounted so as to take a state in which the steering wheel is steered by an amount, $\alpha$, of deviation of the composite angle of the front wheels from the composite angle of the rear wheels by an operator who is visually confirming such an amount $\alpha$ with the assumption that the deviation between the composite angles adversely affects a horizontal position at which the steering wheel is held.

The amount of deviation, $\alpha$, may be defined as follows:

$\alpha$ = (composite angle of the front wheels) −

(composite angle of the rear wheels)

It should be noted that the above technique is adopted with a premise that the front wheels are in a neutral state.

SUMMARY OF THE INVENTION

Therefore, the present invention has the first object to provide a method for the toe angle adjustment and a toe angle adjusting apparatus for a vehicle adapted to perform a very efficient toe angle adjustment even if the toe angle adjustment has been performed with respect to either one of the left-hand and right-hand rear wheels.

The present invention has the second object to provide the method for adjusting a toe angle of a vehicle wheel and a toe angle adjusting apparatus therefor, adapted to perform the toe angle adjustment for the front wheels, including the horizontal adjustment for the steering wheel, in a state that the front wheel is still steered.

The present invention has the third object to provide the the toe angle adjusting apparatus adapted particularly to automation of the toe angle adjustment for the vehicle in which a toe angle adjusting mechanism to be disposed in the vehicle is constituted by a toe angle adjusting rod with a threaded portion.

In order to achieve the above first object, the present invention basically consists of a method for adjusting a toe angle of a wheel of a vehicle, which comprises a step of measuring a first time angle of each of front wheels and rear wheels on the basis of a tire angle measuring unit; a step of determining a first toe angle adjusting amount so as to allow a toe angle of the rear wheels to amount to a target toe angle therefor in a relative relationship of one of the rear wheels with the other thereof only by adjusting the toe angle of either one of the rear wheels; a step of adjusting a toe angle of either one of the rear wheels on the basis of the first toe angle adjusting amount; a step of determing a second tire angle of the rear wheel on the basis of the tire angle measuring unit after the toe angle of the rear wheel has been adjusted; a step of determining a composite angle of the rear wheels from the second tire angle, the composite angle representing a direction in the vehicle advances straight, the direction being decided on the basis of a relative relationship of one of the rear wheels with the other thereof; a step of converting the first tire angle of the front wheels to a tire angle based on the composite angle of the rear wheels to yield a corrected tire angle therefor; a step of detecting a toe angle of the front wheels from the third tire angle thereof; a step of determining a second toe angle adjusting amount for the front wheels from the toe angle of the front wheels detected from the corrected tire angle thereof and a target toe angle therefor; and a step of adjusting the toe angle of the front wheels on the basis of the second toe angle adjusting amount.

As have been described hereinabove, two conventional methods for the toe angle adjustment involve a technique in which the front and rear wheels are adjusted by regarding the tire angle measuring device as a virtual center of the vehicle body and a technique in which the toe angle of the front wheels is adjusted on the basis of the composite angle of the front wheels while the toe angle of the rear wheels is adjusted on the basis of the composite angle of the rear wheels, respectively. In summary, the conventional techniques are based on the toe angle adjustment for all of the wheels.

However, it is to be understood that the toe angle adjustment for the vehicle should be basically based on a relative relationship of each of the wheels so that it is less necessary to consider a relationship with the vehicle body in the toe angle adjustment. More specifically, the toe angle adjustment for the vehicle may be performed by taking into consideration a relative relationship of the left-hand front wheel with the right-hand wheel for the toe angle adjustment for the front wheels as well as a relative relationship of the left-hand rear wheel with the right-hand wheel for the toe angle adjustment for the rear wheels. It is to be noted, however, that the toe angle adjustment for the front and rear wheels should be performed on the basis of a common reference line.

With the foregoing taken into account, the present invention has been completed on the following idea.

It is not necessary to perform the toe angle adjustment for all the wheels if the front and rear wheels could be adjusted on the basis of a common reference line with the vehicle body set aside. If a direction in which the vehicle advances straight is decided by a composite angle of the rear wheels, the toe angle adjustment for the front wheels should be performed using the composite angle of the rear wheels. If the toe angle adjustment for the front wheels is executed subsequent to the toe angle adjustment for the rear wheels, this leads to the toe angle adjustment for the wheels is performed using the same reference line. In this case, it is be noted herein that the composite angle should be based on the rear wheels which have previously been adjusted. With the above idea, the adjustment for only one of the rear wheels can perform the toe angle adjustment for the rear wheels.

This arrangement can permit an ideal toe angle adjustment for the vehicle and result in a reduction by one in the number of wheels to be adjusted. For a toe angle adjusting apparatus, the advantage is presented such that the number of the toe angle adjusting apparatus to be disposed in a toe angle adjusting station can be reduced by one.

The toe angle adjustment for the front wheels may be performed in such a state that the front wheels are held at a neutral position. In this case, a tire angle of the front wheels measured by a tire angle measuring device is once converted to a tire angle corrected on the basis of the composite angle of the rear wheels, and the tire angle of the front wheels corrected is regarded as a toe angle therefor. Furthermore, the toe angle adjustment for the front wheels may be performed in such a state that the front wheels are steered. In this case, it is desired that the toe angle adjustment for the front wheels be executed so as to include a horizontal adjustment of the steering wheel.

In order to achieve the second object, the present invention in one aspect consists basically of a method for adjusting a toe angle of a wheel of a vehicle, which comprises a step of measuring a tire angle of each of front wheels and rear wheels on the basis of a tire angle measuring unit to yield a found tire angle thereof; a step of determining a composite angle of the rear wheels from the found tire angle of the rear wheels, the composite angle being defined as a direction in the vehicle advances straight, the direction being decided on the basis of a relative relationship of one of the rear wheels with the other thereof; a step of detecting a steered angle of a steering wheel by a steered angle detecting means; a step of setting a steered angle for the front wheels corresponding to the steered angle of the steering wheel; a step of converting the found tire angle of the front wheels to a tire angle on the basis of the composite angle of the rear wheels to yield a corrected tire angle thereof; a step of computing a toe angle of the front wheels by subtracting the steered angle of the respective front wheels from the corrected tire angle thereof; a step of determining a toe angle adjusting amount for the front wheels from the toe angle of the respective front wheels and a target toe angle therefor; and a step of adjusting a toe angle for each of the front wheels on the basis of the toe angle adjusting amount.

In other words, it is said that the present invention has been completed with the idea that a toe angle for the front wheel can be adjusted on the basis of the rear wheel composite angle on the premise that a direction in which the vehicle advances straight is determined by the composite angle of the rear wheels. In performing the toe angle adjustment for the front wheel, including the horizontal adjustment for the steering wheel while the front wheel is still steered, the toe angle adjustment for the front wheel may be performed on condition that a current tire angle contains a steered angle of the front wheel corresponding to a steered angle of the steering wheel. It is to be understood as a matter of course that the current tire angle should be corrected on the basis of the rear wheel composite angle to a corrected tire angle prior to the toe angle adjustment.

It is to be understood herein that the composite angle of the rear wheels is determined on the basis of tire angles of the rear wheels. It is thus preferred that the toe angle adjustment for the rear wheel is performed prior to the toe angle adjustment for the front wheel. Particularly, in adjusting a toe angle of the rear wheel on the premise that a found tire angle on the basis of a tire angle measuring device is regarded as a toe angle of the rear wheel, it is necessary to determine a composite angle of the rear wheels on the basis of the right-hand and left-hand rear wheels after adjustment of the tire angles for the rear wheels because their directions differ relatively between prior to adjustment thereof and subsequent to adjustment thereof. The toe angle adjustment may also be performed on the basis of the composite angle of the rear wheels. In this case, the composite angle of the rear wheels does not vary with the toe angle adjustment of the rear wheel so that it is not necessary that the toe angle adjustment of the rear wheels should be done prior to that of the front wheels. The toe angles of the left-hand and right-hand rear wheels may be adjusted on the basis of adjustment for a tire angle of only one of the wheels because the toe angles of the left-hand and right-hand rear wheels are eventually decided in accordance with a relative relationship of the left-hand rear wheel with the right-hand rear wheel. In adjusting the toe angles of the rear wheels on the basis of a tire angle of only one of the rear wheels, a toe angle adjusting amount may be determined from a found tire angle or from a composite angle of the rear wheels. This adjustment has the advantage that only one toe angle adjusting means is required for the rear wheels. That is, to achieve the second object, the present invention in another aspect consists basically of a toe angle adjusting method which further comprises a step of adjusting a toe angle of one of the rear wheels prior to the step of adjusting the toe angle of each of the front wheels in which the composite angle of the rear wheels is computed using a found tire angle thereof obtained by measuring a tire angle of the rear wheels after a toe angle of the rear wheels have been adjusted, said step of adjusting the toe angle of one of the rear wheels comprising a step of determining a toe angle adjusting amount for the one of the rear wheels so as to allow the found tire angle thereofto amount to a target toe angle for the rear wheels by adjusting the toe angle of the rear wheel in a relative relatiionship of one of the rear wheels with the other therof, the found tire angle thereof being regarded as a toe angle thereof; and a step of adjusting the toe angle of either one of the rear wheels on the basis of the toe angle adjusting amount.

As have been described hereinabove, when the composite angle of the rear wheels is used as a basis for the toe angle adjustment for the front wheels, the advantages are presented that the toe angle adjustment for the front wheels, including the horizontal arrangement for the steering wheel, is executed while the front wheels are steered. The advantages are such that no work for correcting the front wheels of a vehicle entering into the toe angle adjusting station to a neutral position is required any more and that no work for adjusting a position of the mounting of the steering wheel is required. Particularly, work of adjusting the mounting position of the steering wheel is laborious because this work is done by an operator upon visible confirmation on a mounting error with respect to the mounting of the steering wheel. Thus avoidance of such work is extremely efficient.

It is to be noted, however, that the present invention does not require any work for correcting the front wheels to a neutral position and for mounting the steering wheels at a correct position. Thus, the present invention is particularly suited to cause work for the toe angle adjustment to be rendered automatic fully.

In adjusting a toe angle of each wheel, the toe angle adjustment may be performed while tire angles of the wheels are fed back. This arrangement for the feedback permits an accurate adjustment for a toe angle. A control over the feedback may be implemented at a final stage of the toe angle adjustment. Thus, a rapidity in work for the toe angle adjustment can be achieved together with an accurate adjustment.

In order to achieve the third object, the present invention consists basically of a toe angle adjusting apparatus for a vehicle with a toe angle adjusting mechanism adapted so as to adjust a toe angle of wheels by rotating a toe angle adjusting rod about its axis, which comprises a toe angle detecting means for detecting an actual toe angle of each of the wheels; a first arm disposed so as to face the vehicle from underneath andextending in a vertical direction; a first clamp means for clamping the toe angle adjusting rod, mounted on an upper end of the first arm; a first driving means for swinging the toe angle adjusting rod about its axis, thus rotating the first arm of the toe angle adjusting rod; an adjusting amount setting means for setting a toe angle adjusting amount on the basis of the actual toe angle and a target toe angle; and a controlling means for controlling the first driving means on the basis of the toe angle adjusting amount.

The toe angle adjustment using a toe angle adjusting rod as a toe angle adjusting mechanism requires a rotation of the toe angle adjusting rod about its axis. In accordance with the present invention, such a toe angle adjusting mechanism comprises, as basic elements, an arm extending in a vertical direction and a clamp means disposed at a tip portion of the arm. With this arrangement, the clamp means is designed so as to enter into the toe angle adjusting rod and to rotate the toe angle adjusting rod by a swinging action of the arm without undergoing any interference with other mechanism parts and units present around the toe angle adjusting rod. A limit is produced physically upon a scope within which the arm is movable so that a cylinder may be used as a driving means for driving the arm. In this case, however, there may be caused the problem if an amount to be adjusted is larger than an amount adjustable by one full stroke of the cylinder because the cylinder should be returned to its original position per every full stroke. And if the clamp means is left in such a state of clamping the toe angle adjusting rod at the time when the cylinder is returning to the original position, the toe angle adjusting rod is caused to rotate in a reverse direction leading to no substantial toe angle adjustment. It is accordingly required that the clamp means should unclamp the toe angle adjusting rod as the cylinder is returned to its original position.

Furthermore, an interference of the arm with the vehicle body should be avoided upon entry of the vehicle into the toe angle adjusting station. In order to achieve this manner, the toe angle adjusting apparatus according to the present invention consists basically of a toe angle adjusting apparatus, which further comprises the first arm disposed displaceably between an operation position at which the first clamp means clamps the toe angle adjusting rod and a non-operation position at which the first clamp means is located underneath the toe angle adjusting rod in an awaiting state; and the first arm is connected to a second driving means for displacing the first arm between the operation position and the non-operation position and disposed so as to interpose a deviation absorbing means for absorbing a diviation in a vertical position of the toe angle adjusting rod with the second driving means.

In this manner, the deviation absorbing means is arranged so as to be capable of competing with vehicles in which vertical positions of toe angle adjusting rods disposed therein vary with tire sizes or the like. The great is also presented by the deviation absorbing means that can do without a fine control over an operation position of the arm.

Other objects, features and advantages of the present invention will become apparent in the course of the decription of the preferred embodiments in conjunction with the drawings attached hereto.

BRIEF DESCRIPTION OF THE DRAWINGS

FIG. 3 is a plane view showing a suspension for the rear wheel on which a toe angle adjusting mechanism.

FIG. 4 is a partial sectional view with the toe angle adjusting mechanism expanded.

FIG. 21 is a side view showing a portion of a clamp means of the toe angle adjusting rod.

FIG. 22 is a side view showing a portion of a clamp means of the toe angle adjusting rod for clamping a lock nut.

FIG. 39 is a table for reference values to be used for control over the toe angle adjustment.

FIG. 40 is a table for steered angles of the front wheel with respect to steered angles of the steering wheel.

DESCRIPTION OF THE PREFERRED EMBODIMENTS

Figure 1:
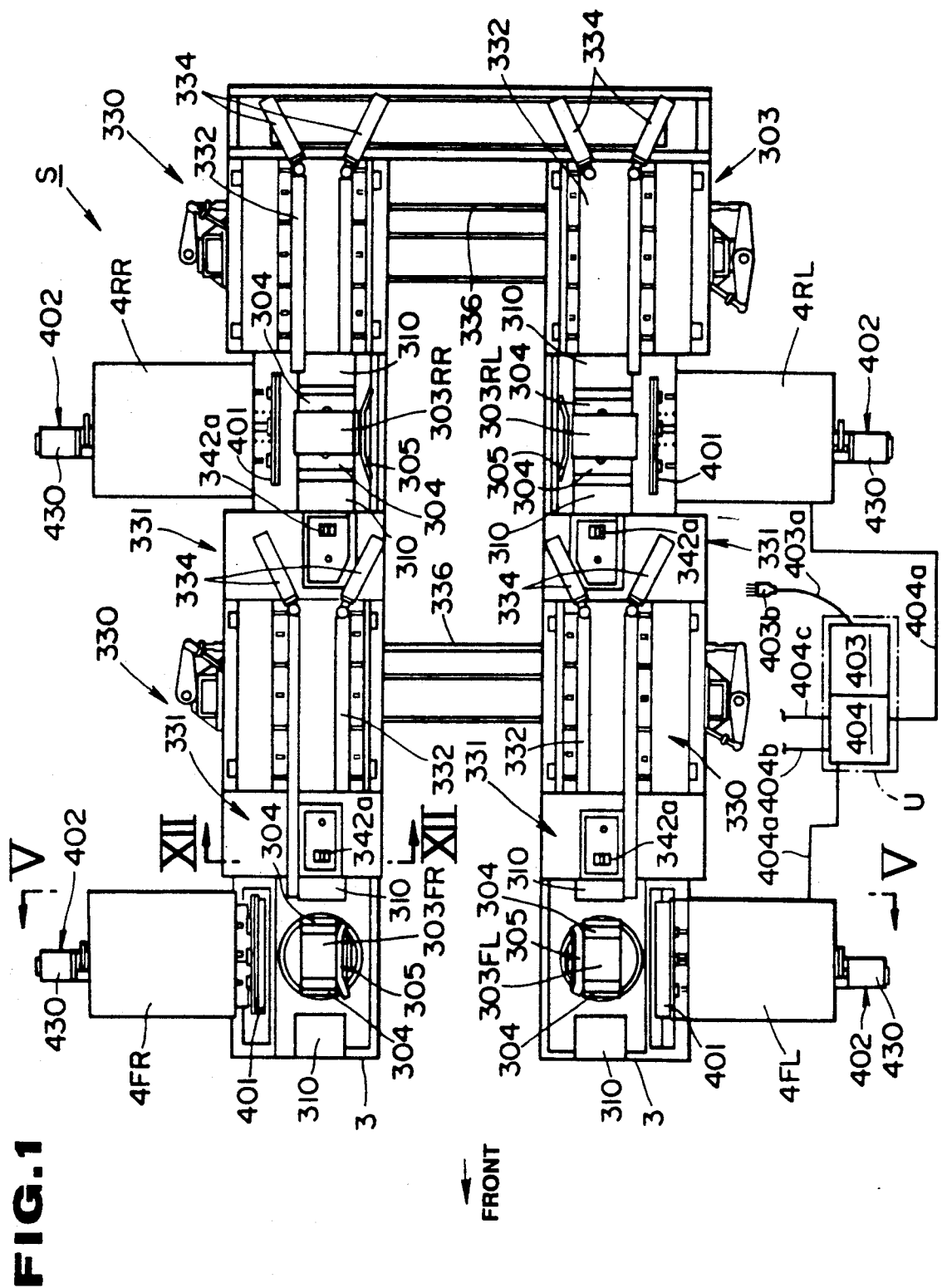
FIG. 1 is a plane view showing a toe angle adjusting station.

In the description which follows and the drawings attached hereto, reference symbol "FR" used subsequent to reference numeral, such as "2FR", refers to a wheel 2 disposed on a front side and at a right-hand position. In other words, the reference symbol 2FR is intended to mean the right-hand front wheel 2FR. In the same manner, reference symbol "FL" refers to front and left-hand, "RR" to rear and right-hand, and "RL" to rear and left-hand. Furthermore, when the wheels are intended to be distinguished between the front and rear wheels, the front wheel or wheels is or are represented by a combination of reference numeral 2 with the reference symbol "F" for the front, thus reference numeral "2F" meaning the front wheel or wheels, and the rear wheel or wheels is or are represented by "2R" meaning meaning the rear wheel or wheels. The same thing can be said of other members or elements.

Figure 2:
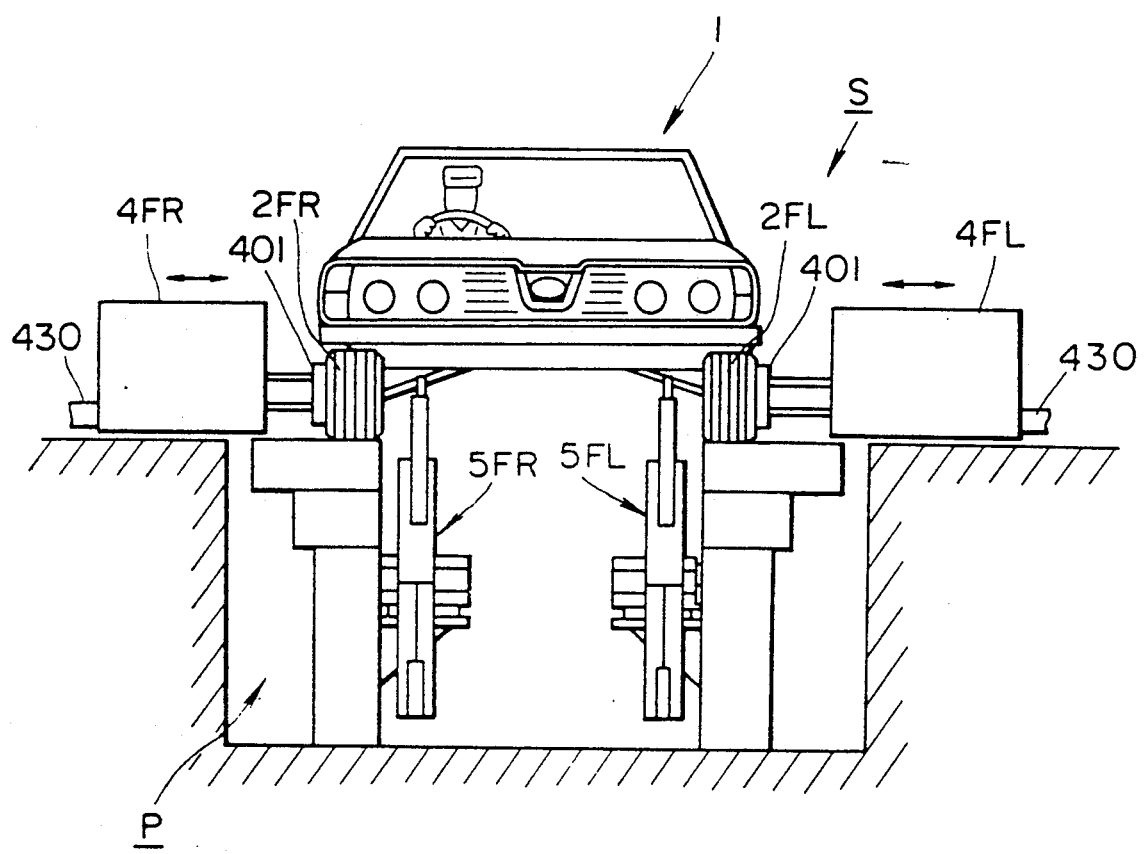
FIG. 2 is a brief front view showing the toe angle adjusting station.

Referring to FIGS. 1 and 2, there is shown a toe angle adjusting station S disposed in a final vehicle assembly line where plural models of vehicles are assembled in a mixed manner. The toe angle adjusting station S comprises a base 3 and a toe angle measuring unit 4, the base 3 being designed such that wheels 2 of the vehicle 1 are placed, and the toe angle measuring unit 4 being designed so as to measure a toe angle of each of the wheels 2. The toe angle adjusting station S further contains a pit P where there is mounted a toe angle adjusting unit 5. The toe angle adjusting unit 5 is mounted each for the wheels 2 to adjust a toe angle when a found value measures by the toe angle measuring unit 4 varies from a toe angle set for each of the corresponding wheels 2.

TOE ANGLE ADJUSTING MECHANISM (FIGS. 3 AND 4)

Each of the wheels 2 is provided with a toe angle adjusting mechanism 6 as shown in FIGS. 3 and 4.

Figure 5:
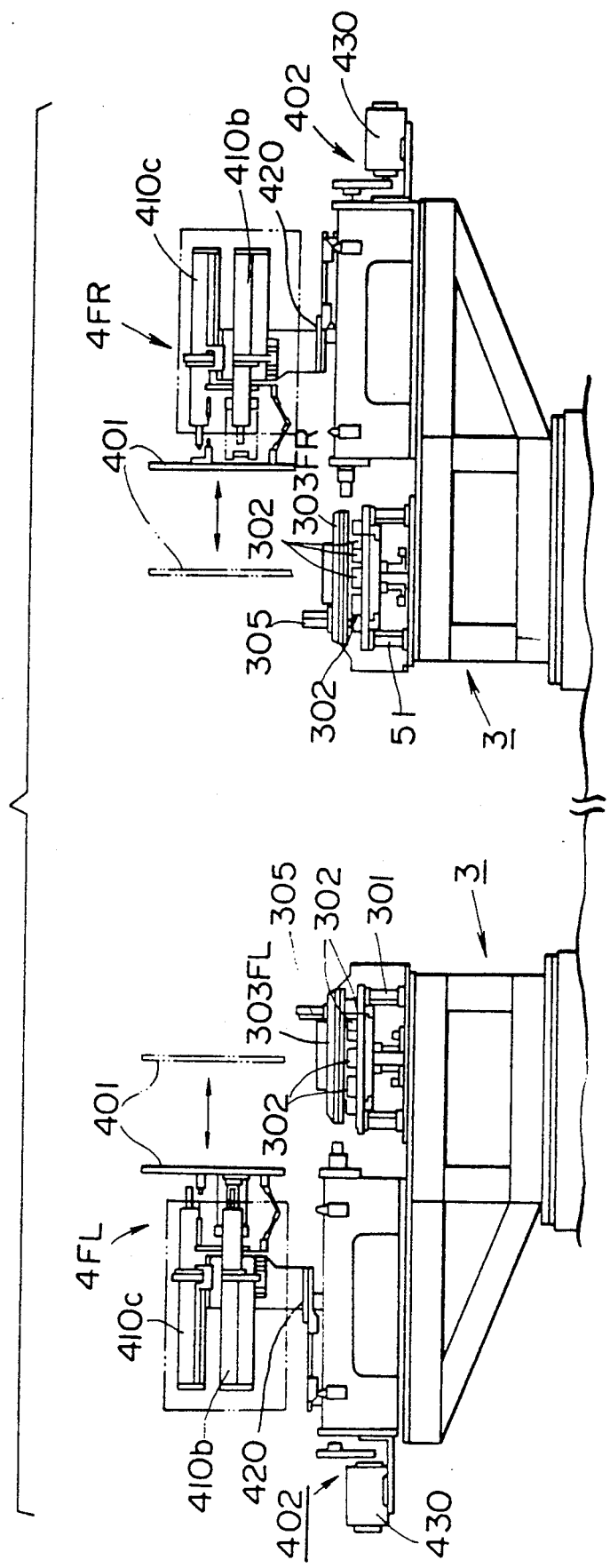
FIG. 5 is a cross-sectional view taken along the line V—V of FIG. 1.
Figure 6:
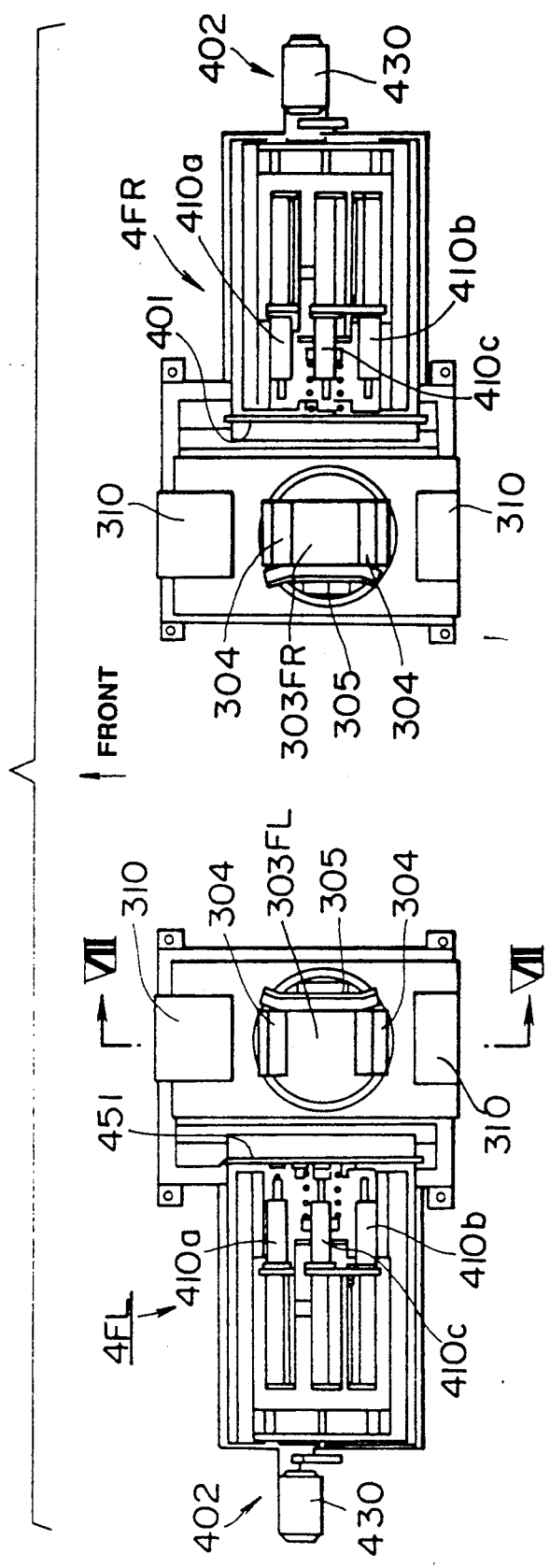
FIG. 6 is a plane view showing a turn table of the full float type and a toe angle measuring unit mounted on the turn table.
Figure 8:
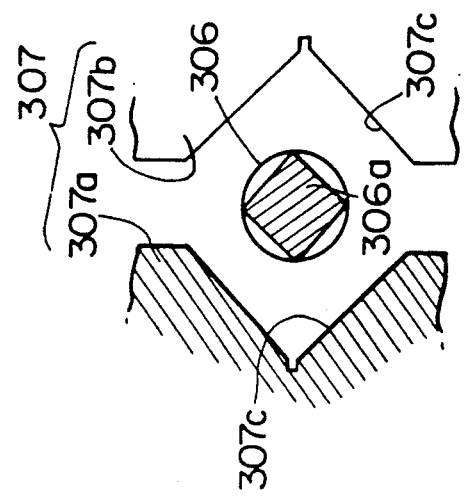
FIG. 8 is a cross-sectional view taken along the line VIII—VIII of FIG. 7.
Figure 7:
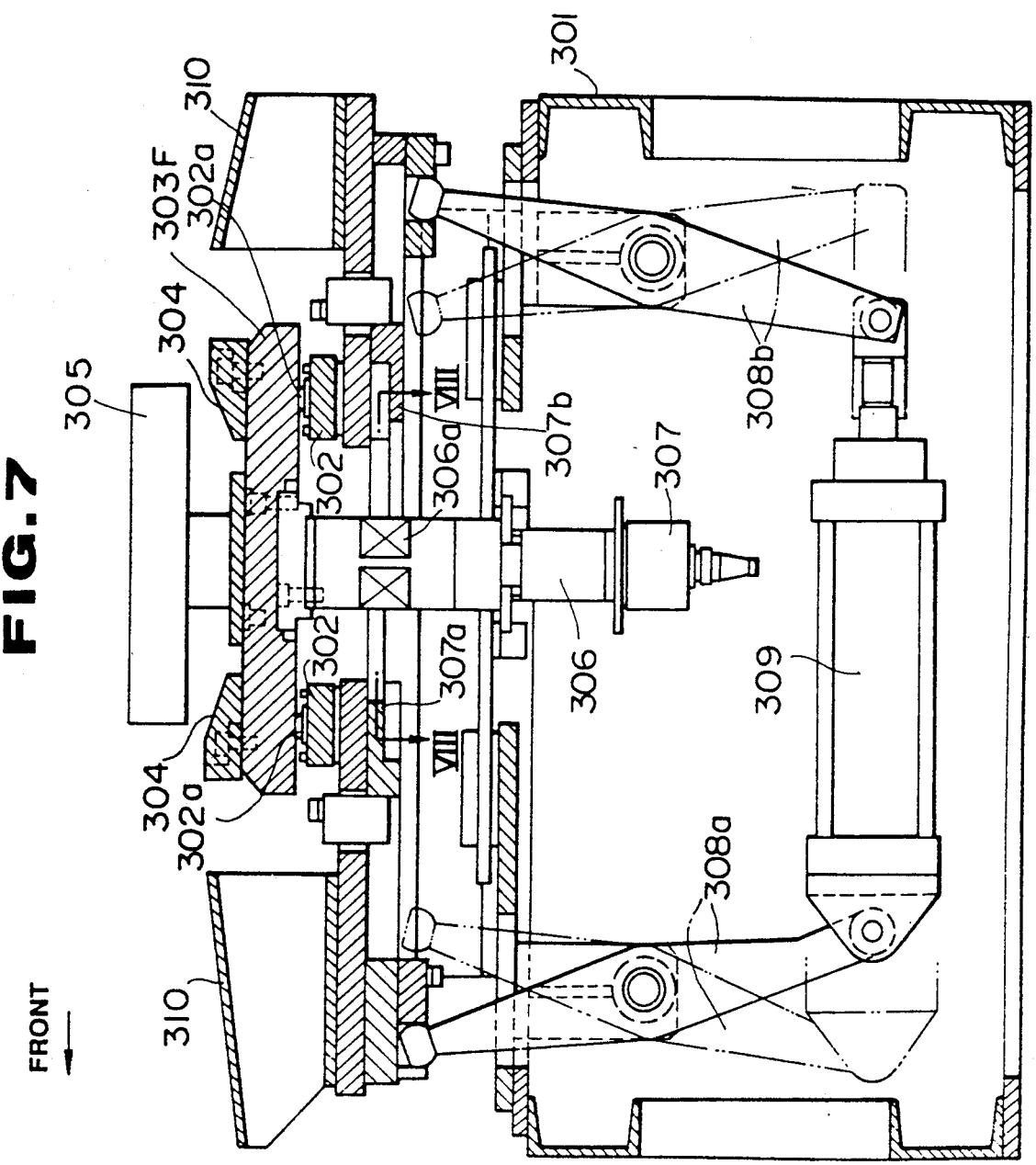
FIG. 7 is a cross-sectional view taken along the line VII—VII of FIG. 6.
Figure 9:
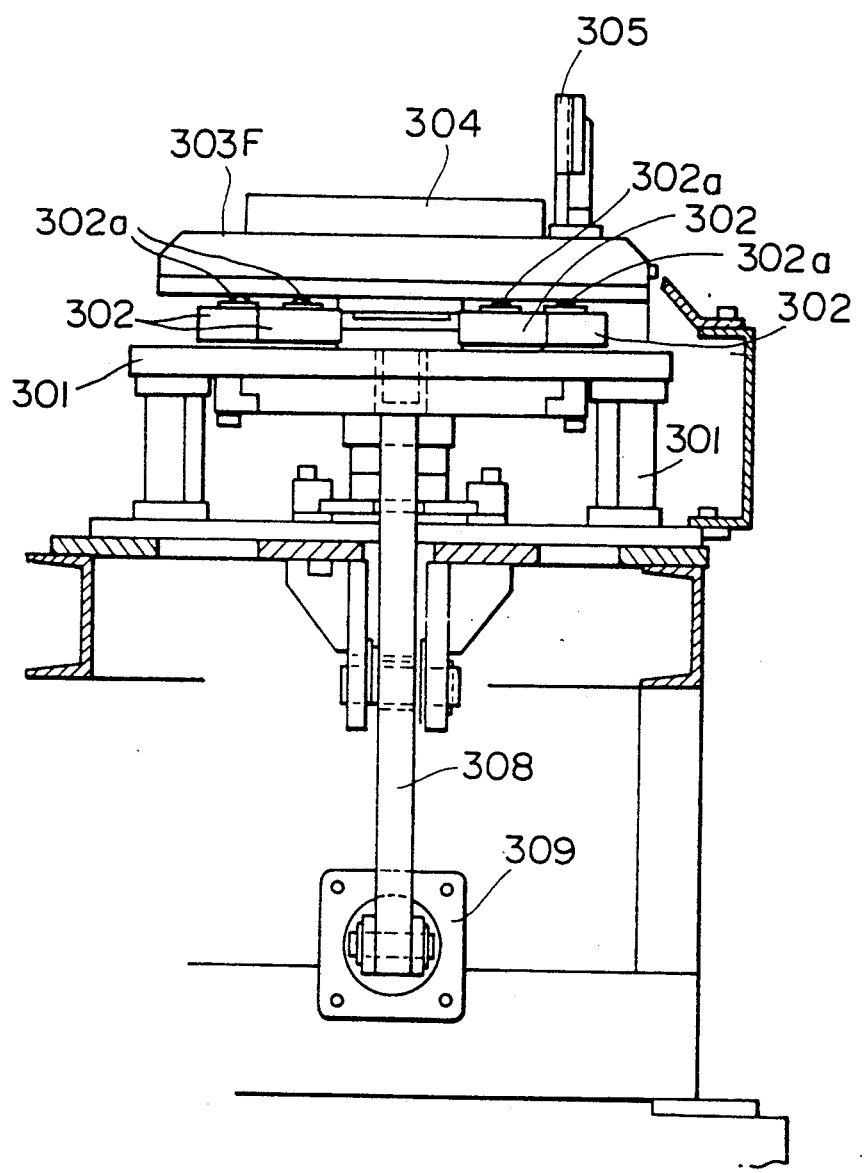
FIG. 9 is a partial vertical cross-sectional view showing the turn table.

FIG. 4 shows a suspension 7 for the rear wheel 2R, which is of a swinging arm type and which comprises a wheel support member, generally referred to as 701, and a rearward lateral link member, generally referred to as 702. On the rearward lateral link member 702R is mounted the toe angle adjusting mechanism 6 (as shown specifically in FIG. 5) for adjustment of the rear wheel 2R. More specifically, the left-hand rearward toe angle adjusting mechanism 6RL is mounted on the left-hand rearward lateral link member 702RL constituting the left-hand rearward wheel support member 701RL, on the one hand. Likewise, the right-hand rearward toe angle adjusting mechanism 6RR is mounted on the right-hand rearward lateral link member 702RR structuring the right-hand rearward wheel support member 701RR, on the other hand.

As shown in FIG. 3, a sub-frame, generally referred to as 703, extends transversely and is fixed to the vehicle body holding at its right-hand end portion the right-hand rear wheel 2RR and at its left-hand end portion the left-hand rear wheel 2RL through the wheel support members 701RR and 701RL, respectively, so as to move upwardly and downwardly.

The wheel support member 701 comprises the rear lateral link member 702, a forward lateral link member, generally referred to as 704, extending in a substantially transverse direction, and a connection link member, generally referred to as 705, extending in a longitudinal direction. The rearward lateral link member 702 and the forward lateral link member 704, respectively are disposed transversely in parallel to each other such that the former is located at a position rearward of the latter in a longitudinal direction. The rearward and forward lateral link members 702 and 704, respectively, are rotatably connected at their inner end portions (at end portions closer to the center inside the vehicle body) to the sub-frame 703 and at their outer end portions (at end portion apart from the center thereof) to the connection link member 705. More specifically, the forward lateral link member 704 is rotatably connected at its outer end portion to a forward end portion of the connection link member 705, while the rearward lateral link member 702 is rotatably connected at its outer end portion to a rearward end portion of the connection link member 705. The connection link member 705 is provided with a king pin 705a which extends in an outward direction toward the outside of the vehicle body so as to rotatably support the rear wheel 2R. The suspension 7 is provided with a pair of left-hand and right-hand torsion rods, generally referred to as 706, which extends in a longitudinal direction and is rotatably connected at its forward end to the vehicle body and at its rearward end to the connection link member 705, thus ensuring a sufficient rigidity of the wheel support member 701 in a longitudinal direction of the vehicle body.

The toe angle adjusting mechanism 6 is disposed at a approximately middle position of the rearward lateral member 702 in a lengthwise direction and comprises roughly a toe angle adjusting rod, generally referred to as 601, and a lock nut, generally referred to as 602, consisting of a hexagonal nut. As shown in FIG. 4, the rearward lateral link member 702 is divided into two portions, one portion being referred to as an inner link member portion 702a located at a position inside the vehicle body and the other half portion being referred to as an outer link member portion 702b located at a position outside the vehicle body. Between the inner and outer link member portions 702a and 702b, respectively, is disposed the toe angle adjusting rod 601 which is threaded at its both end portions in a relative direction opposite to each other to form a screw portion 601a and screw portion 602b. The inner link member portion 702a of the rearward lateral link member 702 is provided at its end portion in a direction inside thereof with a female threaded portion 702c to allow the screw portion 601a of the toe angle adjusting rod 601 to be screwed therethrough and fitted thereinto, while the outer link member portion 702b is provided at its end portion in an inner direction with a female threaded portion (not shown) so as to fit the screw portion 601b therein. This arrangement permits an engagement of the toe angle adjusting rod 601 with the inner and outer link member portions 702a and 702b, respectively. The female portion of the outer link member portion 702b with which the outer end portion of the toe angle adjusting rod 601 is engageable is constituted by a nut 702d which in turn is fixed to the outer link member portion 702b. The lock nut 602 is screwed along the thread portion 601b at the outer end portion of the toe angle adjusting rod 601, thus fitting to the lock nut 702d so as to lock a rotation of the toe angle adjusting rod 601.

With the above arrangement, the inner link member portion 702a of the rearward lateral link member 702 is allowed to come close to or go apart from the outer link member portion 702b thereof by releasing the locking of the lock nut 602 and rotating the toe angle adjusting rod 601 about its axis, thus leading to the shortening or extending of a lengthwise dimension of the rearward lateral link member 702. It is to be noted that a variation of the rearward lateral link member 702 in its lengthwise dimension leads to a variation in a toe angle of the rear wheel 2R. In other words, as the rearward lateral link member 702 is shortened in a lengthwise dimension, on the one hand, the toe angle of the rear wheel 2R is adjusted so as to be directed in a so-called "toe-out" direction. As the rearward lateral link member 702 is extended in a lengthwise dimension, on the other hand, the toe angle thereof is adjusted so as to be directed in a so-called "toe-in" direction.

Although the foregoing description has been made on the toe angle adjusting mechanism 6 on the rear wheel 2R, a toe angle adjusting mechanism 6 for the front wheel 2F is mounted on a tie rod constituting an element for a steering wheel mechanism, which has substantially the same construction as the toe angle adjusting mechanism 6 for the rear wheels. Thus further description on the toe angle adjusting mechanism 6 for the front wheel 2F will be omitted in the following description in order to avoid duplication and for brevity of explanation.

BASE 3 (FIGS. 1, 5-12)

As shown specifically in FIGS. 5 and 7-10, a base 3 comprises a frame 301, plural bearings, generally referred to as 302, disposed concyclically on the same circular circumference on a top surface of the frame 301, and a turn table 303 placed on a ball 302a disposed turnably on the bearings 302.

The turn table 303 is designed so as to directly support the wheel 2. It is to be noted that the turn table 303F for the front wheel 2F is somewhat different in structure from the turn table 303R for the rear wheel 2R.

(a) Turn Table For Front Wheel (FIGS. 7-9):

The turn table 303F for the front wheel 2F is provided on its top surface with a stopper 304 which regulates a movement of the front wheel 2F in a forward and rearward direction and with a guide plate 305 which in turn comes in abutment with an inner side surface of the front wheel 2F. As shown specifically in FIG. 7, the turn table 303F further comprises a rotary shaft 306 extending downwardly on a lower end of which an encorder 307 is mounted. The encorder 307 is designed so as to detect an angle of rotation of the turn table 303F for the front wheel 2F. As shown specifically in FIG. 8, the rotary shaft 306 is provided at its vertically middle portion with a polygonal portion 306a in a rectangular shape in cross section, and the polygonal portion 306a is disposed so as to be interposed by a rotation regulating plate, generally referred to as 307, for regulating rotation of the rotary shaft 306. More specifically, the rotation regulating plate 307 comprises a forward rotation regulating plate portion 307a and a rearward rotation regulating plate portion 307b which are disposed so as to hold the rotary shaft 306 therebetween. The rotation regulating plate portions 307a and 307b are provided at their ends facing the rotary shaft 306 with cut-away portions generally referred to as 307c, respectively, which correspond in size and shape to a corresponding outer shape of the polygonal portion 306a. The rotation regulating plate 307 is further disposed on the frame 301 so as to be movable in forward and rearward directions and one end of the rotation regulating plate 307 is connected to an upper end of an arm, generally referred to as 308. The arm 308 comprises a forward arm 308a for the forward rotation regulating plate portion 307a and a rearward arm 308b for the rearward rotation regulating plate portion 307b. The arm 308 is designed so as to extend virtically and be rotatably mounted at its middle portion on the frame 301. A lower end portion of the arm 308 is connected to an end portion of a cylinder 309. In other words, the cylinder 309 is connected at its both end portions to the lower end portions of the forward arm 308a and the rearward arm 308b.

When the cylinder 309 is extended, that is, when the both end portions of the cylinder 309 are extended toward the outside, on the one hand, the both lower end portions of the arms 308a and 308b are forced to push outwardly and consequently the both upper end portions thereof are brought closer to each other, thus approaching the rotation regulating plate portions 307a and 307b disposed on the upper ends of the arms 308a and 308b, respectively, to clamp the rotary shaft 306. When the rotary shaft 306 is clamped by the rotation regulating plate portions 307a and 307b, the turn table 303F is thus held in such a state that the stoppers 304 are located at forward and rearward positions, respectively. When the cylinder 309 is shortened, that is, when the both end portions of the cylinder 309 are contracted, on the other hand, the two plates 307 are allowed to go apart from each other releasing the clamping of the rotary shaft 306. When the clamping of the rotary shaft 306 is released in this way, the rotary shaft 306 can be rotated and moved in forward and rearward directions as well as in leftward and rightward directions. In other words, the turn table 303F for the front wheel 2F is brought into a so-called "full float" state.

The frame 301 is provided with conveyance bases, generally referred to as 310, which are disposed so as to interpose the turn table 303F for the front wheel 2F at its forward and rearward portions therebetween. The mounting of the conveyance bases 310 permits a smooth loading and unloading of the front wheel 2F onto and from the turn table 303F.

(b) Turn Table For Rear Wheel (FIG. 10):

The turn table 303R is disposed on an upper surface of a frame 320 for the rear wheel 2R and has substantially the same structure as the turn table 303F for the front wheel 2F. In the following description, the same elements are represented by the same reference symbols and numerals and a description on the same elements will be omitted from the following description for avoidance of duplication and for brevity of explanation.

Figure 10:
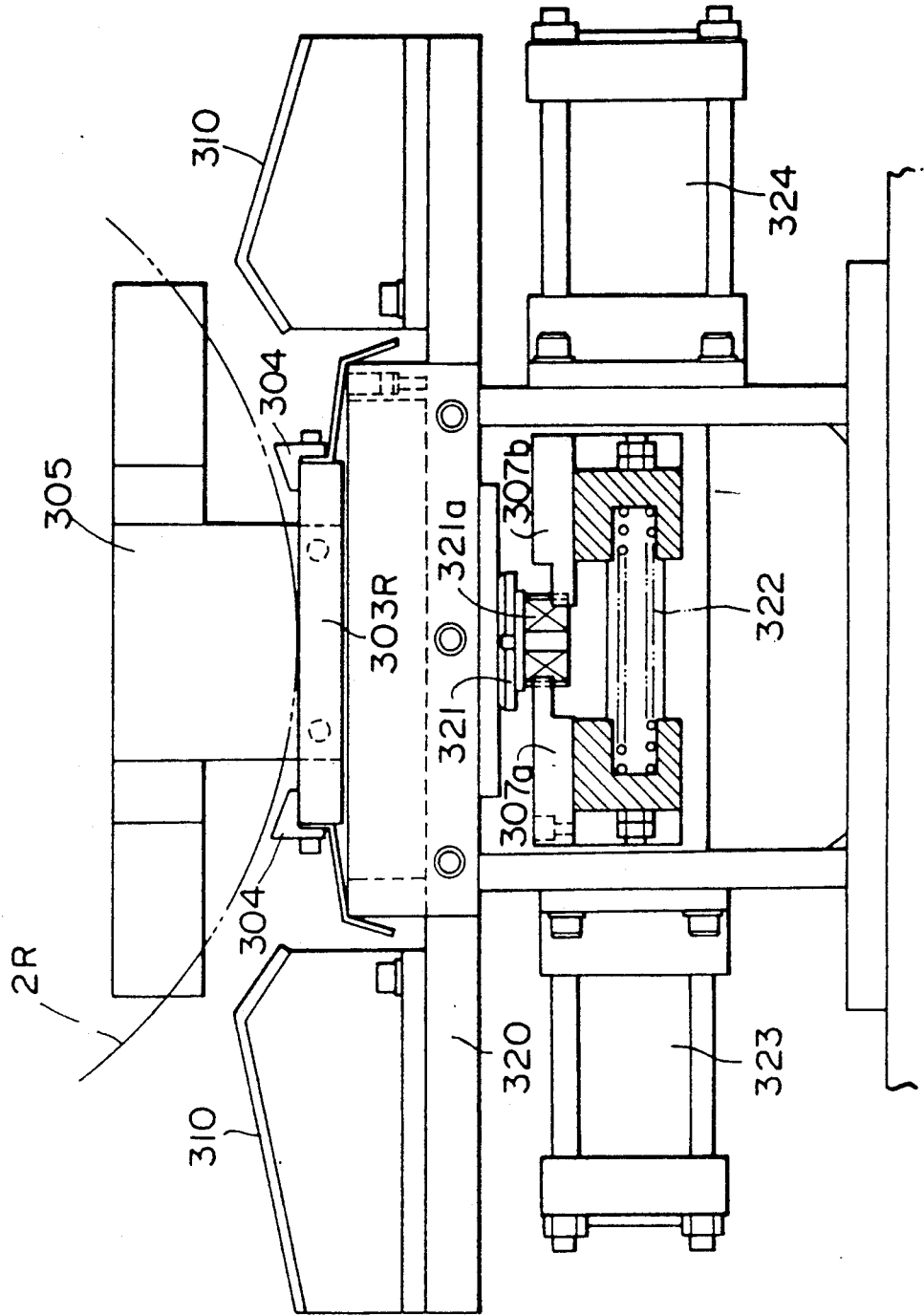
FIG. 10 is a side view showing the turn table.

As shown specifically in FIG. 10, the turn table 303R for the rear wheel 2R comprises a rotary shaft 321 extending downwardly, like the turn table 303F for the front wheel 2F. The rotary shaft 321 is provided at its lower end portion with a polygonal portion 321a in a rectangular shape in cross section which in turn is disposed so as to be held between or clamped by rotation regulating plates, generally referred to as 307. In other words, the turn table 303R is provided with no encorder, unlike the turn table 303F for the front wheel 2F. The forward and rearward rotation regulating plates 307 are constantly urged by a spring 322 so as to be forced apart from each other. More specifically, the forward rotation regulating plate portion 307a is connected to a cylinder 323 and the rearward rotation regulating plate portion 307b is likewise connected to a cylinder 324.

When the cylinders 323 and 324 are both allowed to extend toward the outside, on the one hand, the both rotation regulating plate portions 307a and 307b are brought closer to each other so as to clamp the rotary shaft 321. When the rotary shaft 321 is held between or clamped by the rotation regulating plates 307, the turn table 303R for the rear wheel 2R is held in such a state that stoppers 304 are located at positions forward and rearward of the turn table 303R. When the cylinders 323 and 324 are contracted or shortened, on the other, the rotation regulating plates 307a and 307b are pushed outwardly due to an urging action of the spring 322, thus releasing the clamping of the rotary shaft 321. The releasing of the rotary shaft 321 allows a rotation and a movement of the rotary shaft 306 in forward and rearward directions as well as in leftward and rightward directions, thus bringing the turn table 303F for the front wheel 2F into a so-called "full float" state.

It is further to be noted that the turn table 303R for the rear wheel 2R is disposed so as to be movable in forward and rearward directions with respect to the vehicle body, for example, by a driving means (not shown), thus enabling an adjustment of a distance from the turn table 303F for the front wheel 2F in accordance with models of vehicles.

Figure 11:
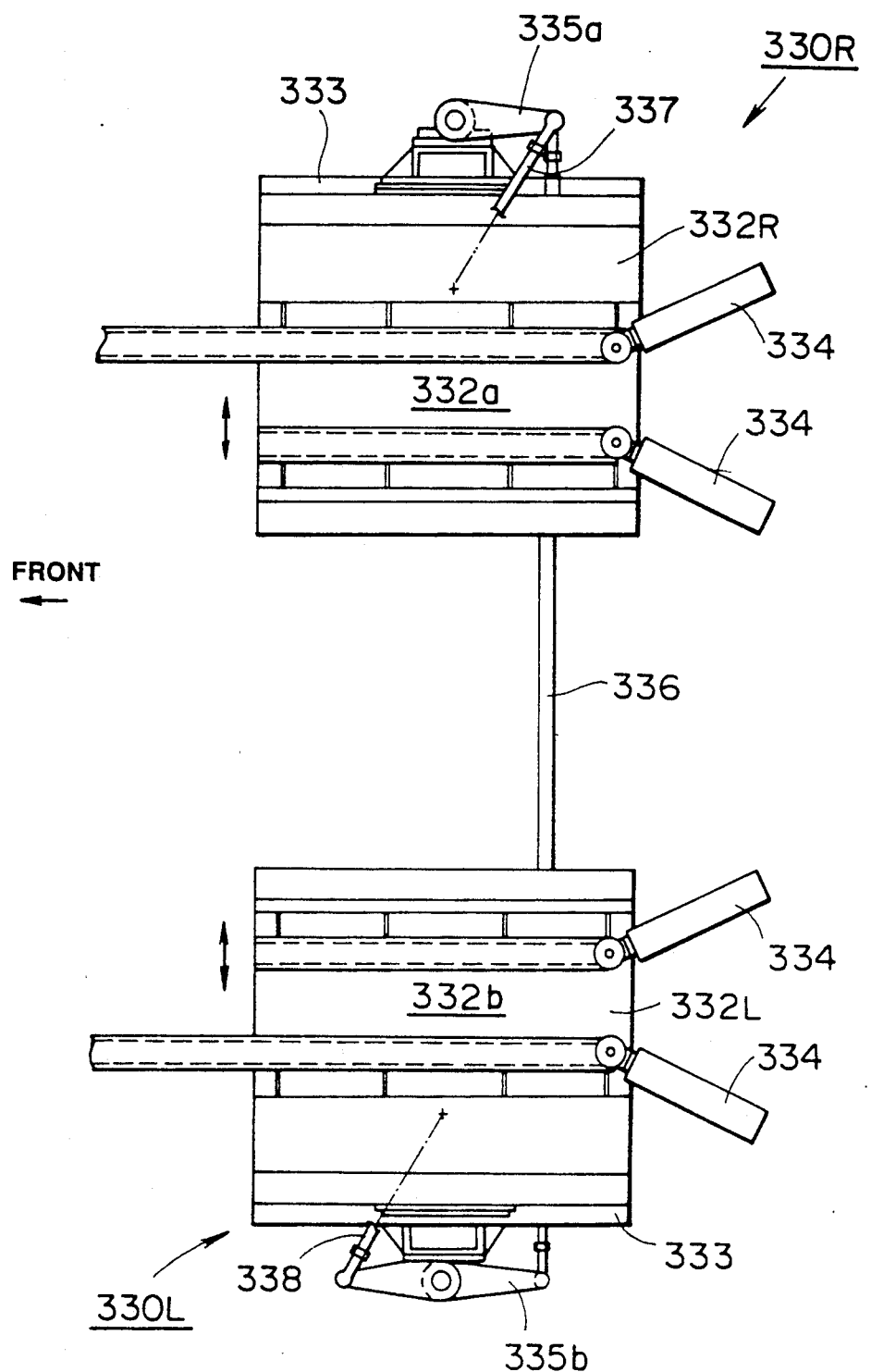
FIG. 11 is a plane view showing a guide unit for guiding a wheel to the turn table.

(c) Guide Unit (FIGS. 1 and 11):

As shown in FIG. 1, the base 3 is further provided with a guide unit, generally referred to as 330, at a position rearward of the turn table 303 for the front wheel 2F or for the rear wheel 2R.

Figure 12:
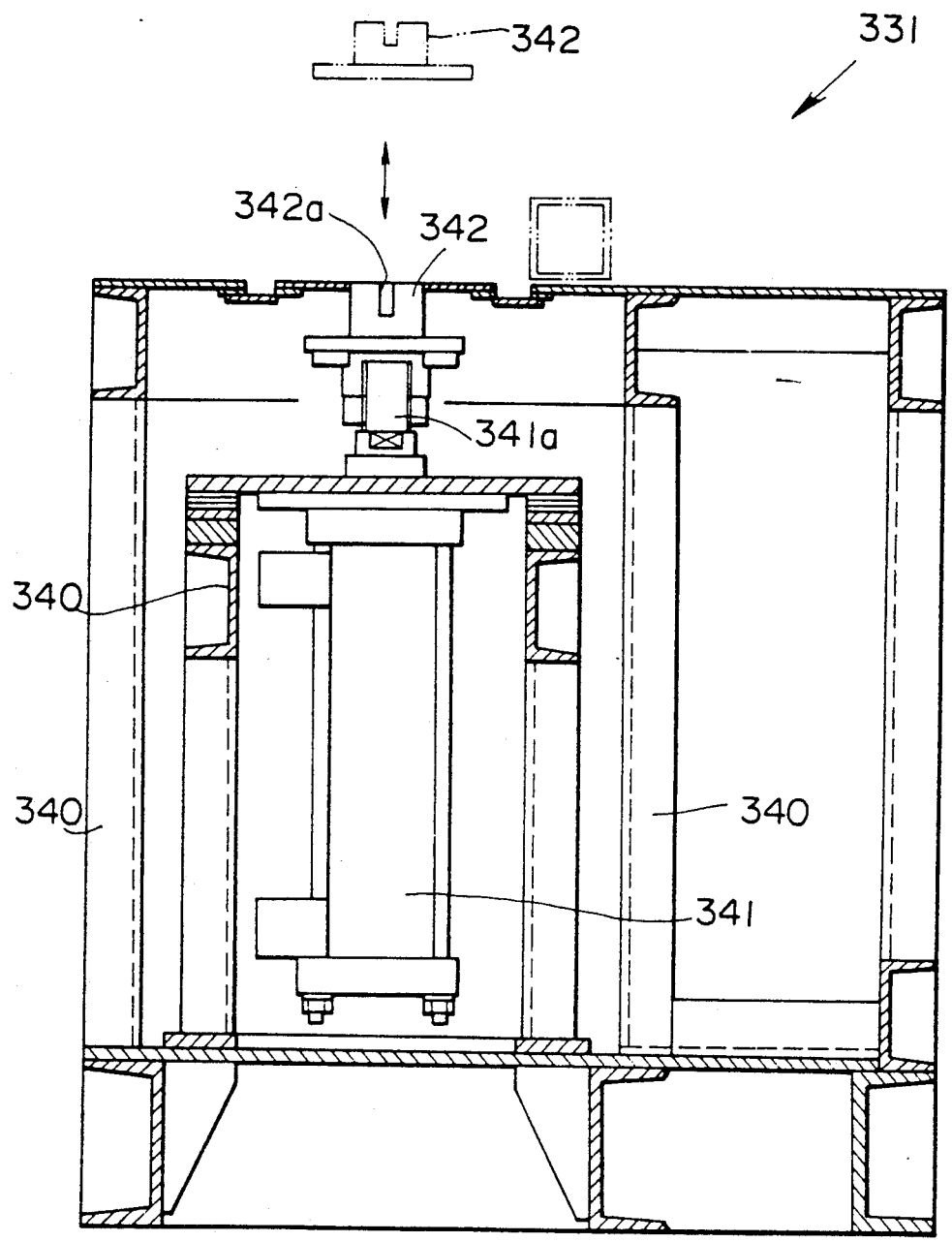
FIG. 12 is a crosss-sectional view taken along the line XII—XII of FIG. 1, indicating a lifter for raising or lifting the vehicle body to some extent guided in the toe angle adjusting station.

As shown specifically in FIGS. 1 and 12, the guide unit 330 comprises a pair of left-hand and right-hand guide bodies, generally referred to as 332, extending in forward and rearward directions and the guide body 332 is disposed so as to be movable on a frame 333 in a transverse direction. The guide body 332 is provided with a guide groove 332a extending in forward and rearward directions so as to allow the corresponding wheel 2 to be guided. Furthermore, the guide body 332 is mounted at its rearward end with guide plates, generally referred to as 334, which are disposed so as to become open rearwardly. The guide body 332 is rotatably mounted at its outer side with an arm, generally referred to as 335. More specifically, the arm 335a is mounted on the rearward guide body 332R and the arm 335b on the forward guide body 332F, and the arm 335a is connected to the arm 335b by a first connection rod 336. Furthermore, the arm 335a is connected to a guide body portion 332a of the rearward guide body 332R by a second connection rod 337, while the other arm 335b mounted on the forward guide body 332F is connected to the arm 335a and further connected to a guide body portion 332b of the forward guide body 332F by a third connection rod 338. The first connection rod 336 is disposed so as to be drivable by a cylinder (not shown) or other driving means in a transverse direction, and a movement of the first connection rod 336 permits the guide bodies 332R and 332F to come close to or to go apart from each other in a transverse direction of the vehicle body. This arrangement enables an adjustment of treads which are different between vehicle models, thus allowing a distance between the guide bodies 332 to be adjusted in accordance with different vehicle models.

As shown specifically in FIG. 12, lifters, generally referred to as 331, are mounted on the base 3 at positions forward and rearward of the guide unit 303 interposed by the forward and rearward turn tables 303F and 303R, respectively. The lifter 331 comprises a frame 340 and a cylinder 341 fixed to the frame 340 and extending in a vertical direction. The cylinder 341 is provided with a cylinder rod 341a extendable upwardly, and the cylinder rod 341a is mounted at its upper end with a cylinder head 342 which in turn is provided with a groove 342a so as to receive a side sill (not shown) of the vehicle body. Thus the side sill of the vehicle body is arranged so as to be received by or fitted in the groove 342a of the cylinder head 342 as the cylinder 341 is extended upwardly thus allowing the lifter 331 to hold the vehicle body. This arrangement fails to cause the vehicle body placed on the turn table 303 in a full float state to be deviated from a predetermined position from a force applied from the outside. The lifter 331 is disposed so as to hold the vehicle body in such a state of lifting the vehicle body to some extent, thus minimizing a weight of the vehicle body loaded to the wheels 2 and preventing a deviation in shapes of the tires mounted on the wheels 2. The lifter 331 is arranged to hold the vehicle body in such a state so that a load to the turn table 303 is rendered small, thus permitting a smooth rotation of the turn table 303.

TOE ANGLE MEASURING UNIT 4

Figure 13:
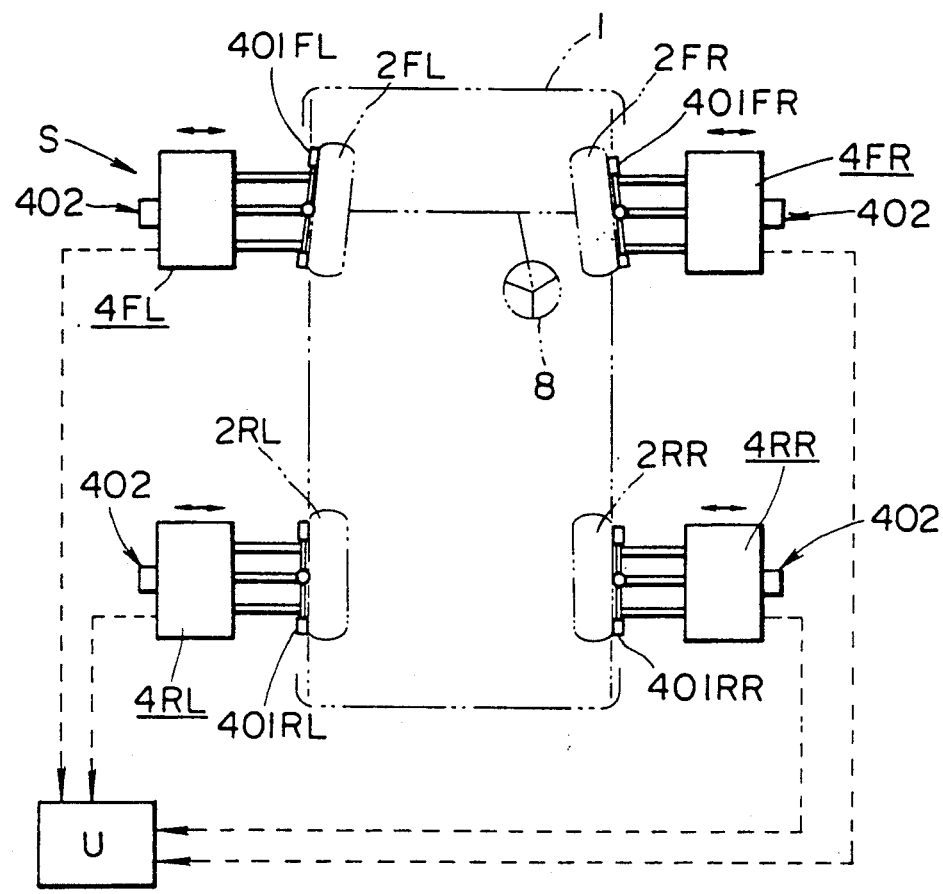
FIG. 13 is a brief diagram of a layout of the toe angle measuring unit disposed in the toe angle adjusting station.

Referring now to FIG. 13, the toe angle measuring unit 4 is shown to have a measuring plate, generally referred to as 401, which in turn is disposed so as to be abuttable with an outer side surface of the wheel 2. The toe angle measuring unit 4 is provided with a driving means 402 which in turn is disposed so as to drive the toe angle measuring unit 4 in transverse directions as shown by the arrow in FIG. 13. More specifically, as the automobile or vehicle body 1 is set in the toe angle adjusting station S, the toe angle measuring unit 4 is driven and moved toeard inside the tread until it comes in abutment with the inner side surface of the wheel 2, thus permitting a measurement for a toe angle, a camber angle or a steered angle of a front wheel 2F.

It is to be noted that, as shown in FIG. 1, the toe angle measuring unit 4 is provided with a signal output means 403 for providing a fail signal and other signals to a vehicle body as an object for inspection and with a comparison detection means 404 for comparing a found toe angle measured by the toe angle measuring unit 4 with a pre-set basic value. To the signal output means 403 is connected a line 403a having a connector 403b to be connected to a controller (not shown) of the vehicle body. To the comparison detection means 404 are connected lines 404a to 404d for inputting found values of steered angles of the front and rear wheels 2F and 2R, respectively. In the following description, the signal output means 403 and the comparison detection means 404 may be referred to as a control unit U in general terms.

Figure 14:
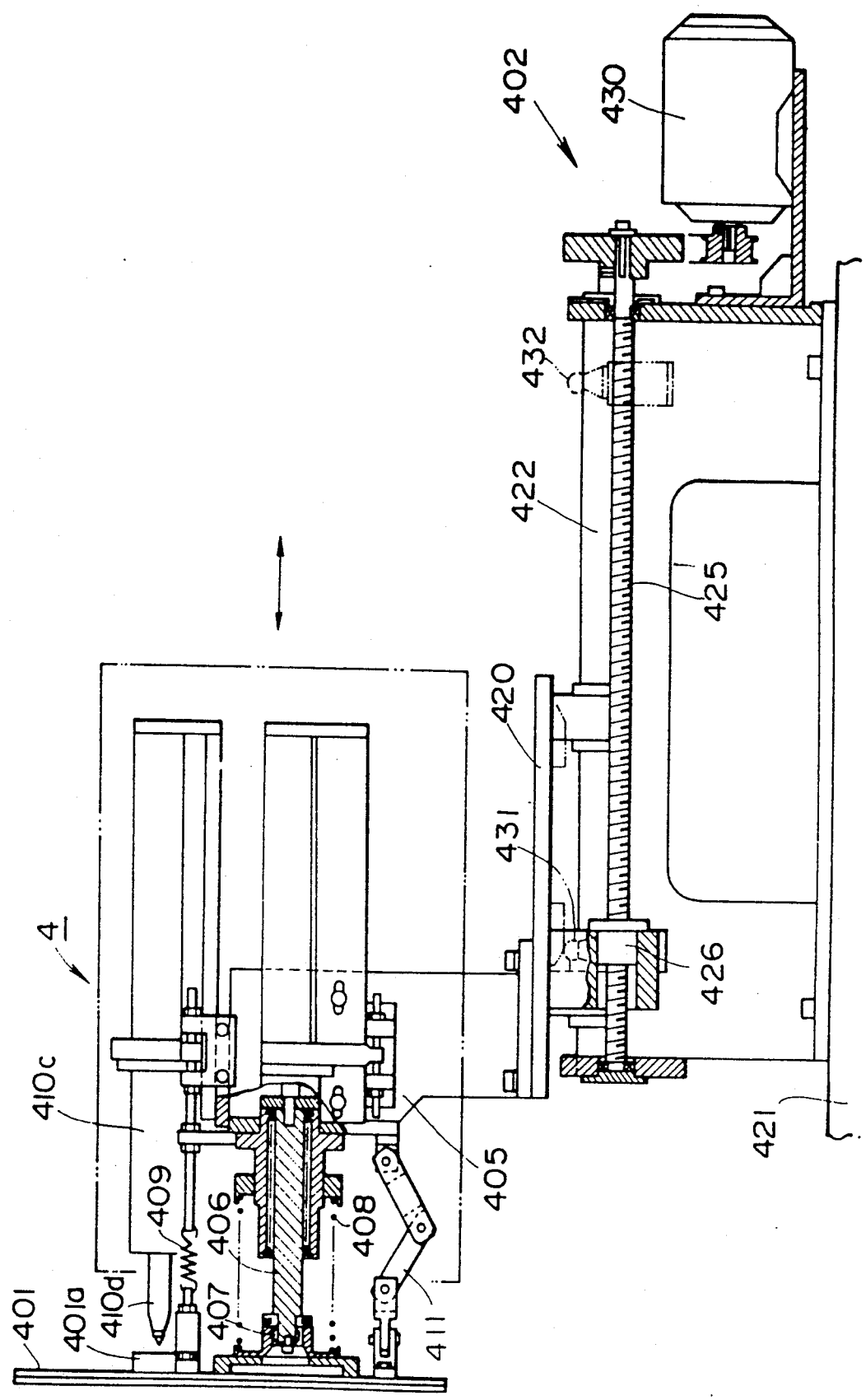
FIG. 14 is a cross-sectional view showing the toe angle measuring unit.
Figure 15:
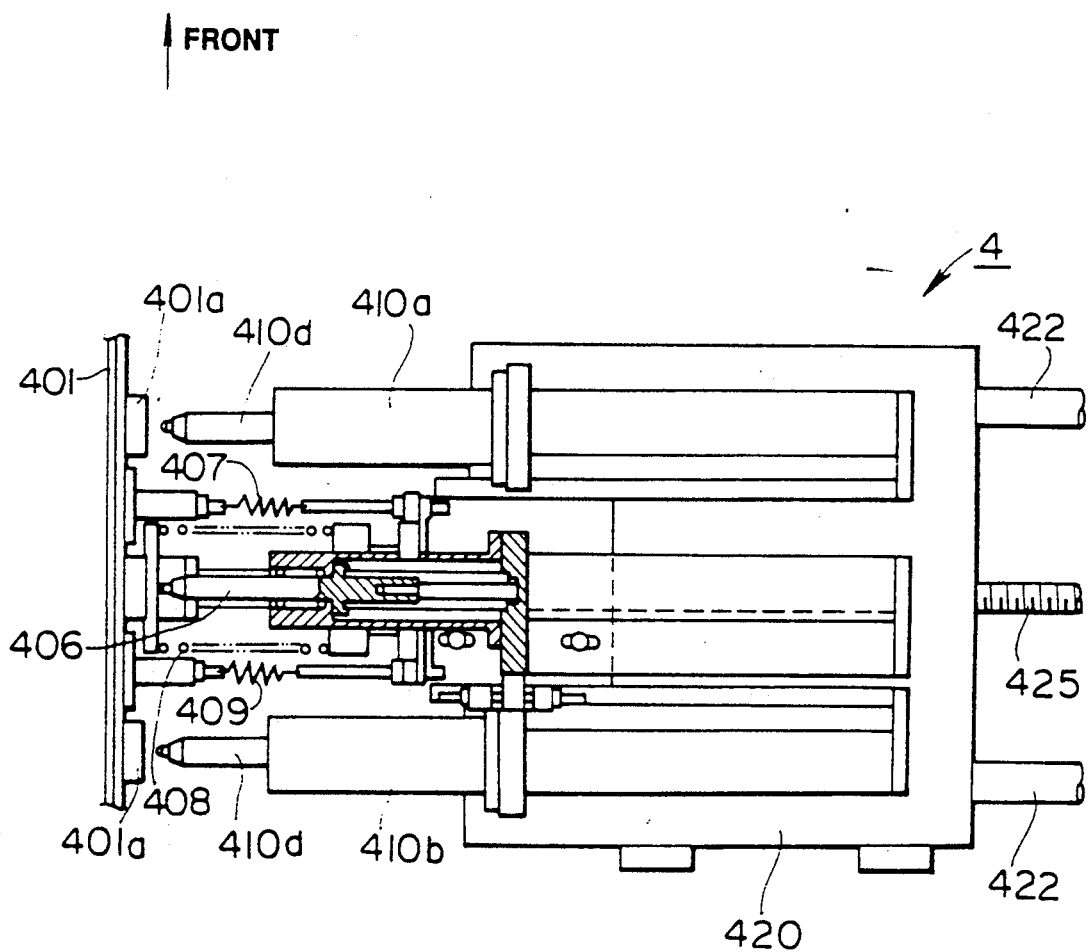
FIG. 15 is a partially cross-sectional view showing an essential portion of the toe angle measuring unit.
Figure 16:
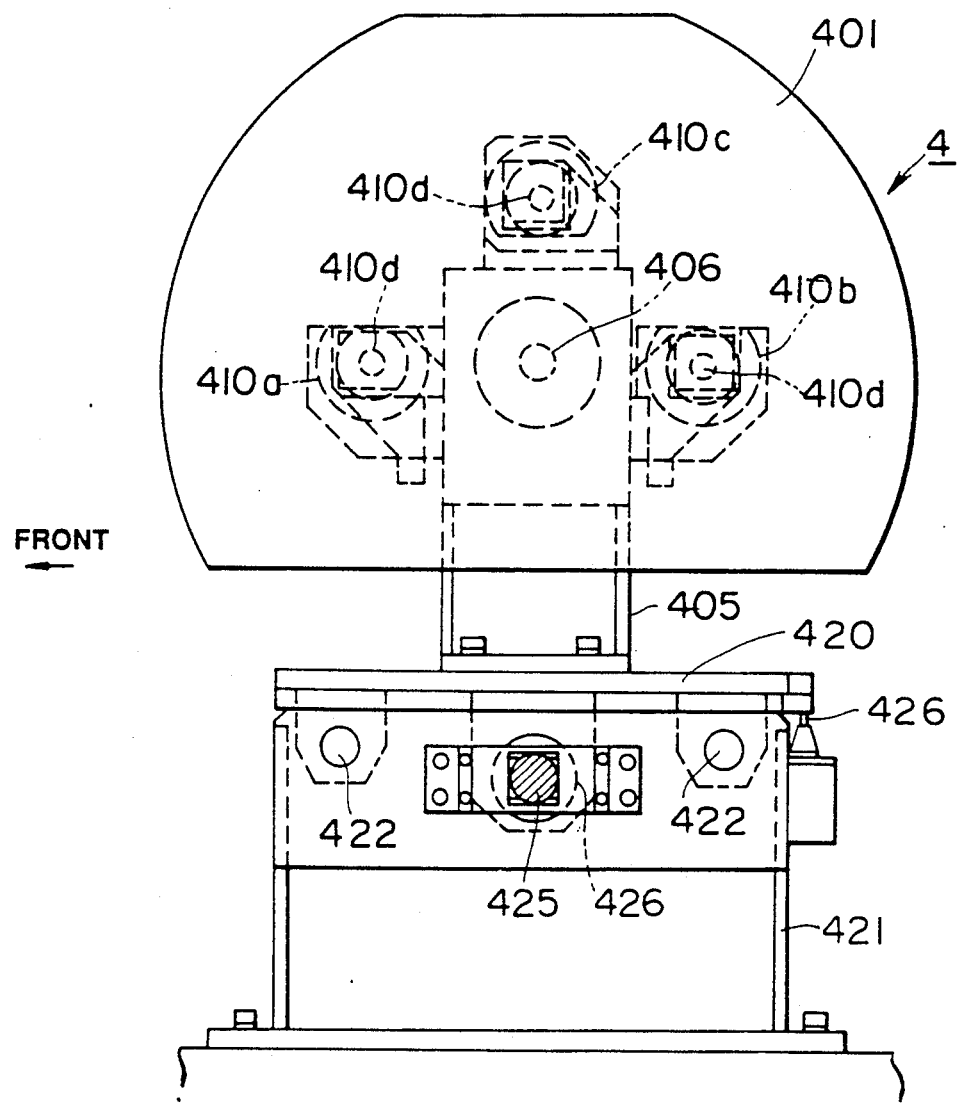
FIG. 16 is a plane view showing the toe angle measuring unit.

FIGS. 14 to 16 show details of the toe angle measuring unit 4 and the driving means 402 for driving the toe angle measuring unit 4.

Figure 17:
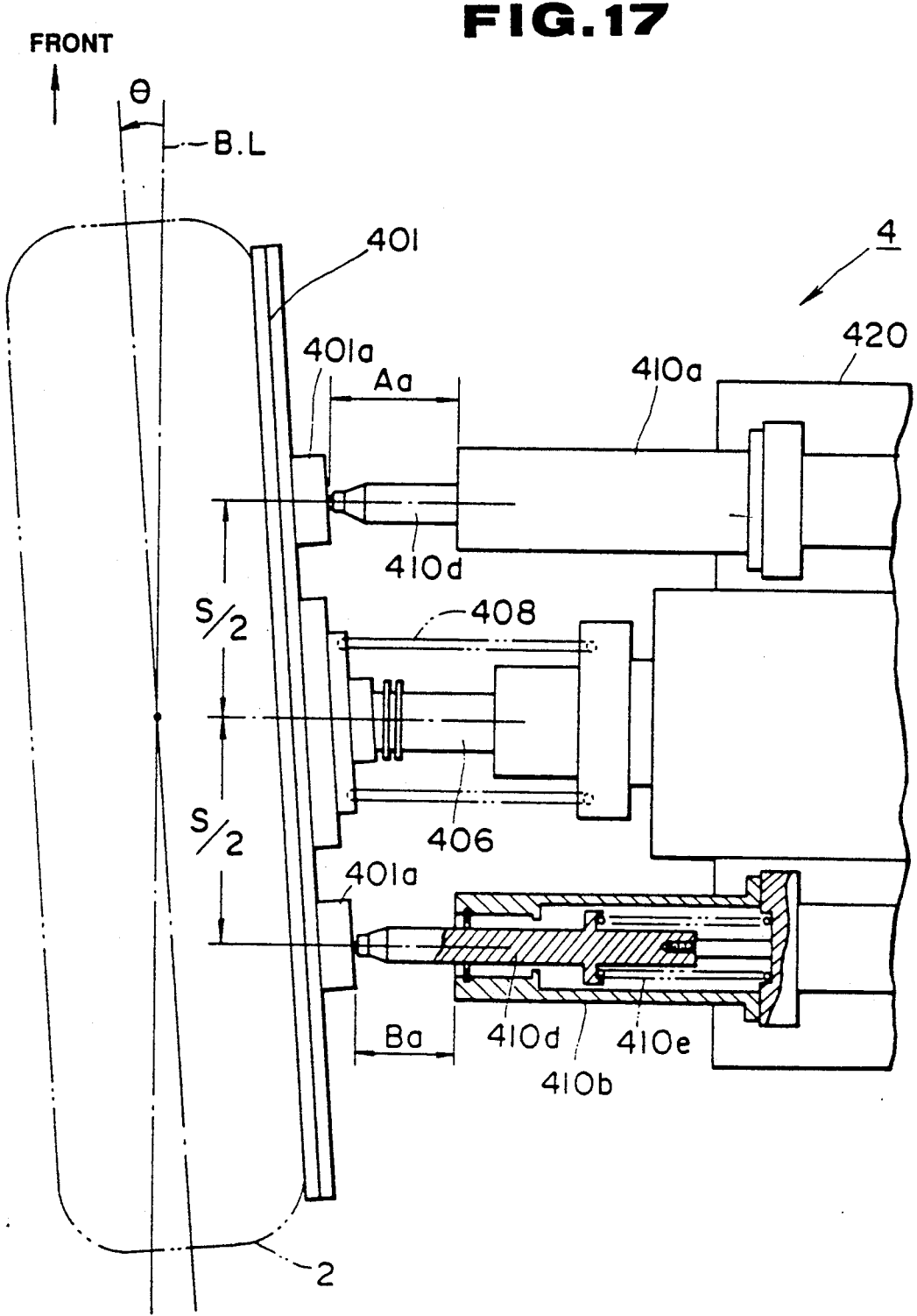
FIG. 17 is a partially cross-sectional view with an essential portion expanded, which indicates a state in which a measuring plate of the toe angle measuring unit is in abutment with an outer side surface of a tire.

The toe angle measuring unit 4 is shown to comprise a support shaft 406 extending from a frame 405 toward the inside of the tread, and the support shaft 406 is monted at its tip portion with the measuring plate 401 through a ball joint 407. Between the measuring plate 401 and the frame 405 are disposed a compression spring 408, a tension spring 409, and a link 411, thus allowing the measuring plate 401 to be disposed at an upright position and in parallel to the center axis of the vehicle body extending in a longitudinal direction when no outer force acts upon the measuring plate 401. On the contrary, when an outer force acts upon the measuring plate 401, that is, when the measuring plate 401 is in abutment with an outer side surface of the wheel 2, the measuring plate 401 is caused to swing at an angle reflecting an inclined angle of the wheel 2 about the support shaft 406 in accordance with an angle of inclination of the wheel 2 in a forward or rearward direction or in an upward or downward direction. In order to detect an angle of the measuring plate 401, the frame 405 is provided with three displacement measuring units, generally referred to as 410, each consisting of a sensor, two of them being displacement measuring units 410a and 410b disposed so as to interpose the support shaft 406 at forward and rearward positions, respectively, as shown in FIG. 15, and the remainder being a displacement measuring unit 410c disposed above the support shaft 406 as shown in FIG. 14. The displacement measuring unit 410 is provided with a detecting rod, generally referred to as 410d, extending toward a rear surface to the measuring plate 401. The detecting rod 410d is disposed so as to be extendable or contractable by a compression spring 410e, as shown in FIG. 17, which in turn is designed so as to compress the support shaft 406. As the measuring plate 401 is brought into abutment with the outer surface of the wheel 2, the detecting rod 410d is designed so as to coincide with an abutment seat 401a fixed on the measuring plate 401. When the measuring plate 401 is inclined, there is caused a difference between amounts of transferal of the detecting rods 410d in forward and rearward directions; there is caused a difference between amounts in displacement of the displacement measuring units 410 in forward and rearward directions, thus detecting a toe angle, a steered angle, a camber angle and so on on the basis of the difference.

More specifically, an angle $\theta$ of inclination of the wheel 2 in a longitudinal direction, which may be also referred to as "a tire angle", is measured on the basis of a difference of the respective detecting rods 410d of the displacement measuring units 410a and 410b disposed so as to interpose the support shaft 406 at forward and rearward positions in an equally spaced relationship (S/2). On top of the toe angle, the steered angle and the like may be measured on the tire angle $\theta$.

The tire angle $\theta$ may be computed by the following equation, in which the amount of displacement of the detecting rod 410d referred to hereinabove is represented by an absolute length of the detecting rod 410d as shown in FIG. 17.

$$\tan\theta = (Aa - Ba)/S$$

where $\theta$ is a tire angle;

Aa is an absolute length of the detecting rod 410d based on a detected amount of the displacement measuring unit 410a;

Ba is an absolute length of the detecting rod 410d based on a detected amount of the displacement measuring unit 410b; and S is a distance between the displacement measuring units 410a and 410d.

On the contrary, the camber angle, that is, an angle of inclination of the wheel 2 in upward and downward directions, may be determined from a mean value between amounts of displacement of the two displacement measuring units 410a and 410b and an amount of displacement of the third displacement measuring unit 410c disposed above the support shaft 406. It is to be noted, however, that if only the toe angle and the steered angle are intended to be measured, the two displacement measuring units 410a and 410b are sufficient.

Turning now to FIG. 15, the toe angle measuring unit 4 is fixed to a sliding table 420 which is disposed so as to be movable in a transverse direction relative to a base 421 which in turn is provided with two guide rods, generally referred to as 422, as shown in FIG. 16. The guide rod 422 is designed to guide and move the sliding table 420. And the base 421 is mounted rotatably with a threaded rod 425 so as to be engageable with a threaded bush 426 of the sliding table 420, the rod extending in a transverse direction and being disposed in parallel to the guide rod 422. The threaded rod 425 is connected at its one end to a surbo motor 430, thus driving the sliding table 420 by rotation of the threaded rod 425. And an amount of movement of the sliding table 420 may be regulated by operation of two limit switches 431 and 432 which in turn regulate a control of driving the surbo motor 430. This control can permit the toe angle measuring unit 4 to take an operation position at which the measuring plate 401 is in abutment with the wheel 2 and at a non-operation position at which the measuring plate 401 is apart from the wheel 2. For the toe angle measuring unit 4R for the rear wheel 2R, it is to be noted that the base 421 is arranged so as to be movable in a longitudinal direction by a driving means such as a surbo motor, and a distance between the toe angle measuring units 4R and 4F can be adjusted by a movement of the toe angle measuring unit 4R so as to meet vehicle models.

TOE ANGLE ADJUSTING UNIT 5 (FIGS. 18-24)

Figure 18:
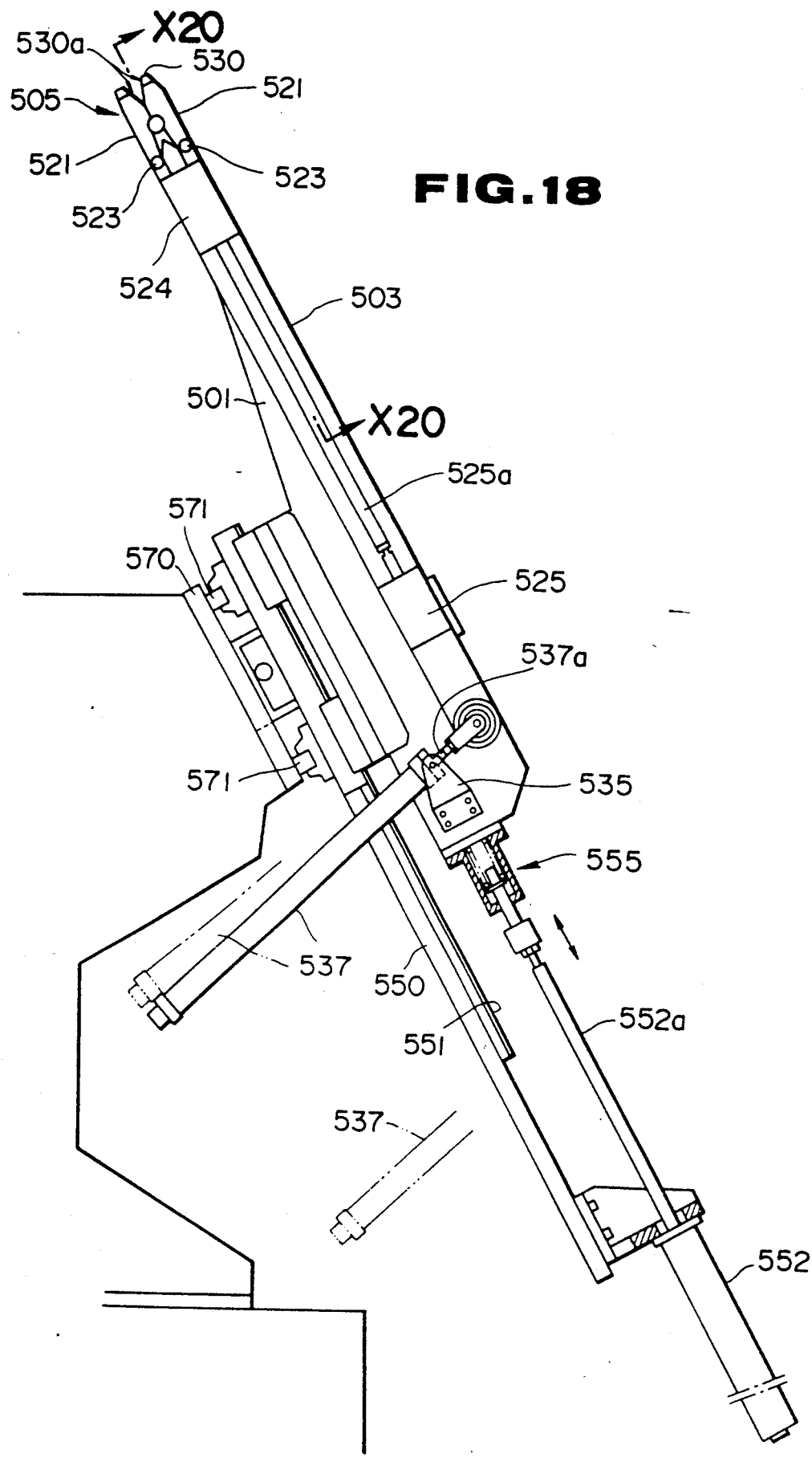
FIG. 18 is a side view showing a toe angle adjusting unit.
Figure 19:
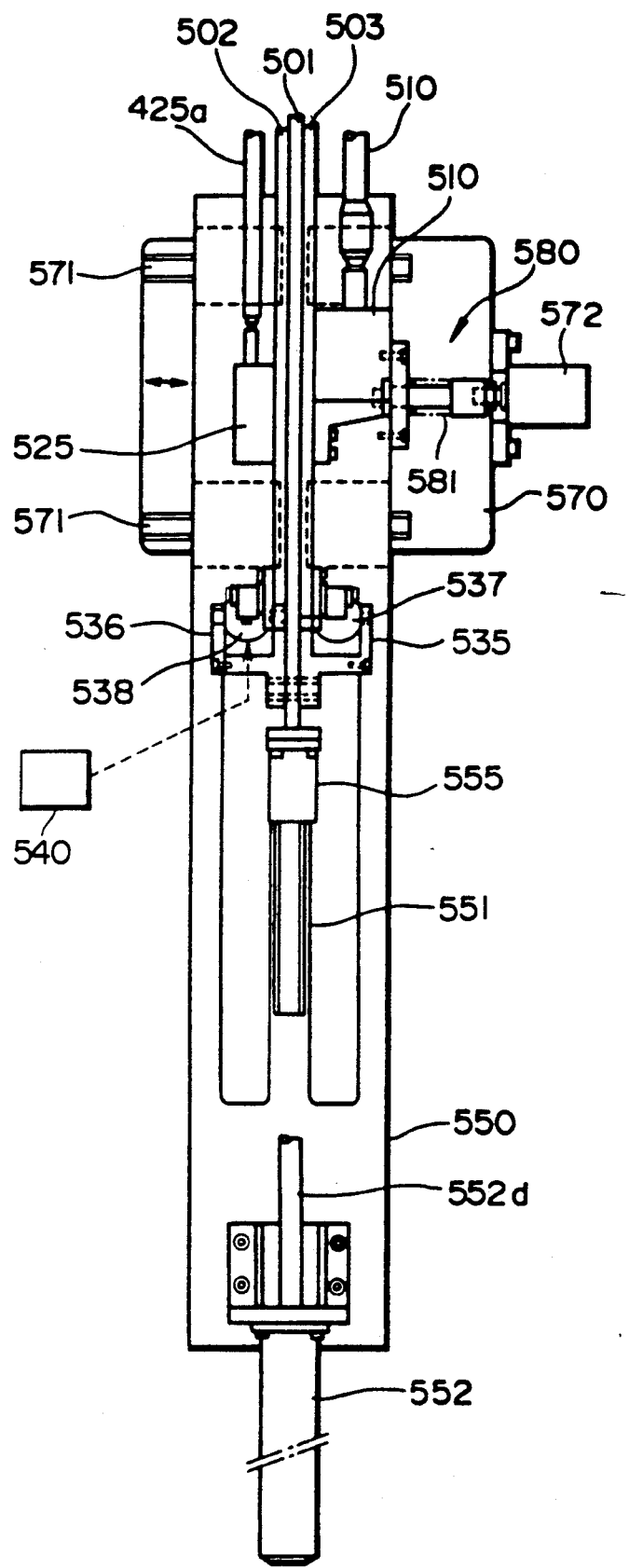
FIG. 19 is a plane view of the toe angle adjdusting unit when looked from the top.

Referring to FIGS. 18 and 19, the toe angle adjusting unit 5 is shown to comprise a main arm 501 extending in a vertical direction, which is constituted by a plate member and which is provided at its one side with a first swinging arm 502 and at its other side with a second swinging arm 503. The first swinging arm 502 and the second swinging arm 503 are constituted each by a plate member extending virtically along the main arm 501. The first swinging arm 502 is provided with a first clamp means 504 adapted to clamp a toe angle adjusting rod 601, and the second swinging arm 503 is provided with a second clamp means 505 adapted to clamp a lock nut 602.

Figure 20:
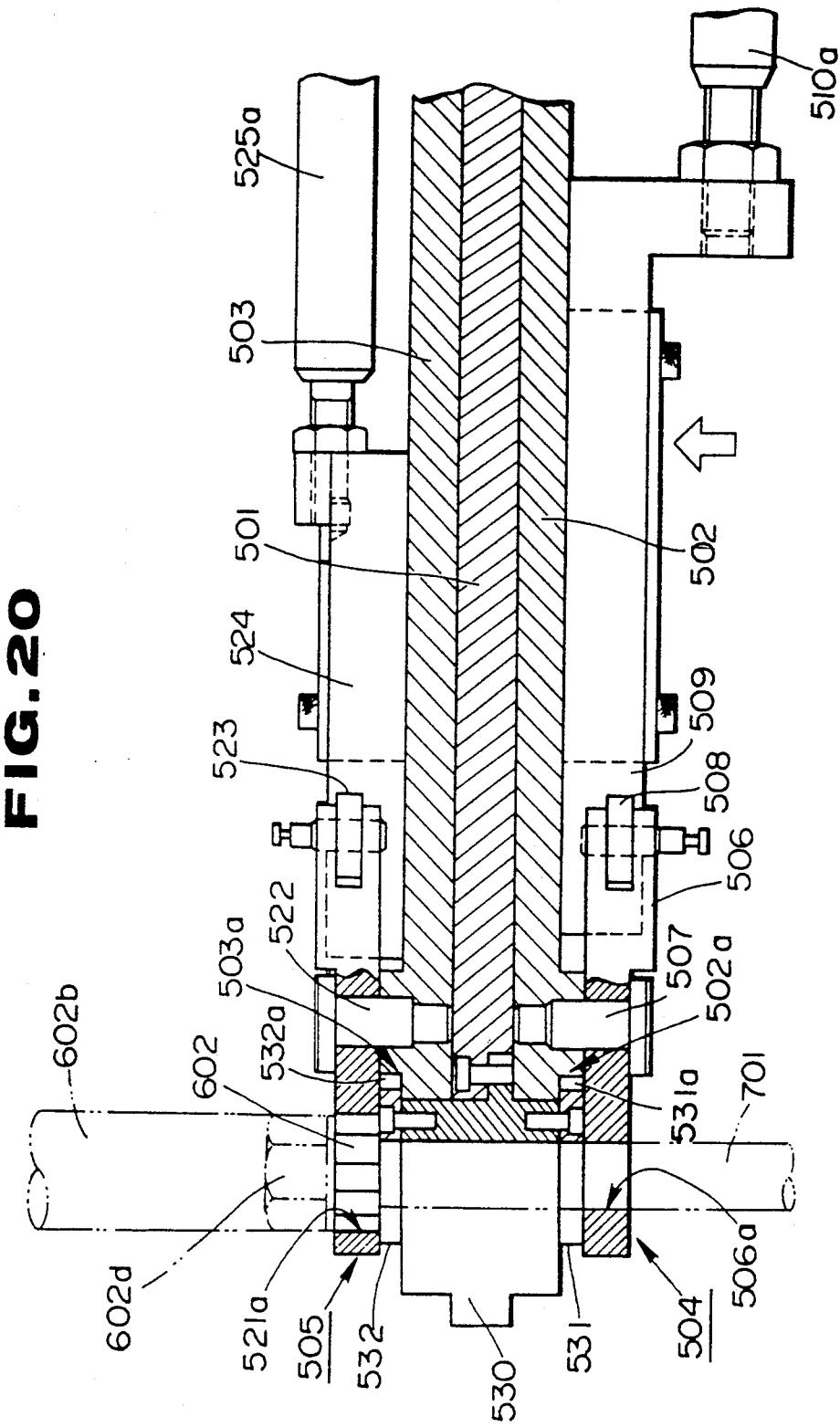
FIG. 20 is a cross-sectional view taken along the line X20—X20 of FIG. 18.

As shown specifically in FIG. 21, the first clamp means 504 is provided with a pair of upper and lower first grip members, generally referred to as 506, which are disposed on an upper end portion of the first swinging arm 502. The pair of the upper and lower first grip members 506 are disposed so as to be rotatable each at its middle portion relative to each other about a shaft 507 that in turn is fixed to the first swinging arm 502, as shown in FIG. 20. The first grip member 506 is provided at its upper end portion, on the one hand, with a grip portion, generally referred to as 506a, for holding the toe angle adjusting rod 601 so as to interpose the shaft 507. Opening the grip portion 506a unclamps the toe angle adjusting rod 601, while closing the grip portion 506a clamps the rod 601. The first grip member 506 is provided at its lower end portion, on the other, with a pair of rollers, generally referred to as 508. Between the pair of the rollers 508 is a wedge-shaped member 509 is disposed so as to be movable in outward and inward directions. The wedge-shaped member 509 is further designed so as to be movable vertically along a direction of extension of the first swinging arm 502. As the wedge-shaped member 509 enters into the pair of the rollers 508 and is held therebetween, on the one hand, the grip members 506 are brought relatively closer to each other at their upper portions, thus clamping the toe angle adjusting rod 601. When the wedge-shaped member 509 is removed from the pair of the rollers 508, on the other, the upper portions of the grip members 506 are designed so as to become apart relatively from each other by means of an urging force produced by a spring (not shown) disposed between the shaft 507 and the first grip members 506, thus allowing the grip portions 506a of the grip members 506 to unclamp the toe angle adjusting rod 601. As shown in FIG. 21, the wedge-shaped member 509 is disposed so as to be drivable by a first cylinder 510 which in turn is mounted at a lower end portion of the first swinging arm 502. The wedge-shaped member 509 is further connected to a tip portion of a piston rod 510a of the cylinder 510, as shown in FIG. 21, thus allowing the wedge-shaped member 509 to enter deeply into the pair of the rollers 508 as the piston rod 510a extends, on the one hand, and to remove from the pair of the rollers 508 as the piston rod 510a becomes shortened, on the other.

Like the first clamp means 504, the second clamp means 505 is provided with a pair of upper and lower second grip members, generally referred to as 521, which are disposed at an upper end portion of the second swinging arm 503. As shown specifically in FIG. 22, the pair of the upper and lower second grip members 521 are arranged so as to be relatively rotatable at their middle portions about a second shaft 522 which in turn is fixed to the second swinging arm 503, as shown in FIG. 20. The second grip members 521 are provided each at its upper end portion, on the one hand, with a grip portion, generally referred to as 521a, so as to hold a lock nut, generally referred to as 602, between the shaft 522. As shown specifically in FIG. 22, the lock nut 602 is clamped or unclamped by closing or opening the grip portions 521a of the second grip members 521. Each of the pair of the second grip members 521 is mounted at its lower end portion, on the other hand, with a pair of second rollers, generally referred to as 523, between which a second wedge-shaped member 524 is disposed so as to be movable inwardly or outwardly, like the first clamp means 504. More specifically, the second wedge-shaped member 524 is disposed so as to be movable vertically along a direction of extension of the second swinging arm 503. As the second wedge-shaped member 524 enters into the second rollers and is held therebetween, the upper end portions of the second grip members 521 are arranged so as to come relatively closer to each other clamping the lock nut 602 at the grip portions 521a of the second grip members 521. Like the first clamp means 504, when the wedge-shaped member 524 is allowed to be removed from the rollers 523, the respective upper portions of the second grip members 521 become apart from each other by means of an urging force of a spring (not shown) mounted between the shaft 522 and the second grip members 521, thus unclamping the lock nut 602 from the grip portions 521a. The wedge-shaped member 524 is driven by a second cylinder 525 which in turn is disposed at the lower end portions of the second swinging arms 503. As shown specifically in FIG. 20, a piston rod 525a of the cylinder 525 is connected at its tip portion to the second wedge-shaped member 524. This structural arrangement permits a deep entry of the second wedge-shaped member 524 into the rollers 523 as the piston rod 525a of the cylinder 525 advances deeply into the pair of the rollers 523, on the one hand, and a removal of the second wedge-shaped member 524 from the rollers 523 as the piston rod 525a gets shortened, on the other hand.

As shown specifically in FIG. 20, the main arm 501 is fixed at its upper end portion to a guide member 530 extending longer than the first clamp means 504 and the second clamp means 505, and the guide member 530 is provided with a guide portion 530a which is designed so as to become gradually wider as it comes closer to its tip portion, thus capable of receiving the toe angle adjusting rod 601.

As shown further in FIG. 20, the main arm 501 is arranged so as to be held by the first and second swinging arms 502 and 503 by the aid of first and second holding plates 531 and 532 interposed between the guide member 530 and the first grip member 506 and between the guide member 530 and the second grip member 521, respectively. More specifically, between the first swinging arm 502 and its grip member 506 is provided a concave groove 502a opening toward an upper end of the first swinging arm 502 so as to receive therein a lower portion 531a of the holding plate 531 bolted to the main arm 501. A surface of the lower end portion 531a of the holding plate 531 in abutment with the groove 502a is in a shape of an arc portion formed about an axis of the toe angle adjusting rod 601. On the arc surface is rotatable the first swinging arm 502 relative to the main arm 501. In other words, the first swinging arm 502 is swingable about an axis of the toe angle adjusting rod 701. The second swinging arm 503 is likewise provided with a groove 503a into which a lower end portion 532a of the holding plate 532 is disposed so as to enter. A surface formed by bringing the lower end portion 532a of the holding plate 532 in abutment with the groove 503a is in a shape of an arc formed about an axis of the lock nut 602, that is, the toe angle adjusting rod 701. This arrangement permits a swingable movement of the second swinging arm 503 about the axis of the lock nut 602.

Turning back to FIGS. 18 and 19, the main arm 501 is mounted at its lower end portion with a first bracket 535 on one side and with a second bracket 536 on the other side. As shown specifically in FIG. 18, the first bracket 535 is swingably mounted with a third cylinder 537 whose piston rod 537a is pivotably connected at its tip portion to the first swinging arm 502. This arrangement allows the second swinging arm 503 to be swung about an axis of the lock nut 602 by extending or shortening the third cylinder 537, thus rotating the lock nut 602. As FIG. 18 is a side view taken when the toe angle adjusting unit 4 is looked at from the second clamp means 505, there is shown a state in which the third cylinder 537 is mounted. FIG. 19 shows a fourth cylinder 538 which is swingably mounted on the second bracket 536, a tip portion of a piston rod which in turn is pivotably connected to a lower end portion of the first swinging arm 502. The extending or shortening of the fourth cylinder 538 allows a swingable rotation of the first swinging arm about an axis of the toe angle adjusting rod 601, thus rotating the toe angle adjusting rod 601.

As shown in FIG. 19, the fourth cylinder 538, a cylinder for driving the swinging arm 502 for the toe angle adjusting rod 601, is provided with a cylinder speed switching means 540 for switching a speed of operation of the cylinder from a high speed mode to a low speed mode or vice versa. The cylinder speed switching means 540 is controllable by a signal from the control unit U.

As shown in FIGS. 19 and 20, the main arm 501 is mounted on a sliding table 550 as a mounting seat so as to be slidable in forward and rearward directions or in a vertical direction. The sliding table 550 is arranged to extend upwardly and downwardly and mounted at its upper side with a guide rail 551 which in turn extends in a longitudinal direction and guides the main arm 501. The sliding table 550 is fixedly mounted at its lower end with a fifth cylinder 552 as a common cylinder. A piston rod 552a of the fifth cylinder 552 is connected at its end to a rearward end (a lower end) of the main arm 501, thus displacing the main arm 501 in an upward or downward direction or in a vertical direction, by extending or shortening the fifth cylinder 552. When the fifth cylinder 552 is extended or is in such a state of being in FIG. 18, on the one hand, the main arm 501 takes an operation position, and when the fifth cylinder 552 is shortened, on the other hand, the main arm 501 takes a non-operation position.

DEVIATION ABSORBING MECHANISM (FIG. 23)

Figure 23:
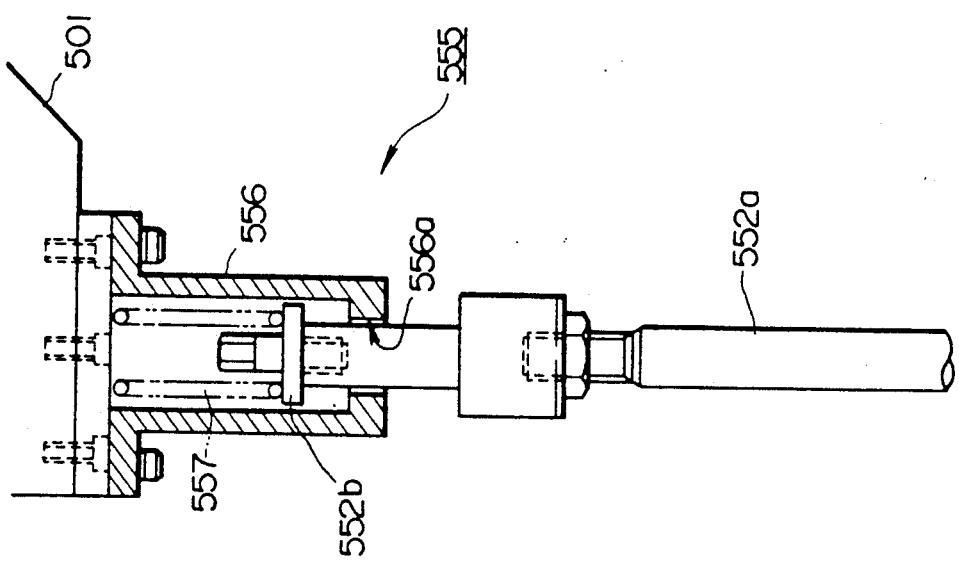
FIG. 23 is a partially cross-sectional view showing a deviation absorbing mechanism disposed on the toe angle adjusting unit.

As shown specifically in FIG. 23, a deviation absorbing mechanism 555 comprises a casing 556 fixed to a lower end surface of the main arm 501. The casing 556 is in a cylindrical shape extending vertically and is provided on its lower end wall with a hole 556a through which a tip portion of the piston rod 552a of the fifth cylinder 552 enters. At the tip portion of the piston rod 552a which enters into the hole 556a of the casing 556 is formed a guard portion 552b, and a compression spring 557 is interposed between the guard portion 552b and an inner surface of an upper wall of the casing 556. This arrangement permits a deviation absorbing mechanism 555 to absorb a deviation of the toe angle adjusting rod 601 toward a vertical direction from a predetermined position thereof, if any, when the main arm 501 is at an operation position. Such a deviation in a position of the toe angle adjusting rod 601 may be caused by differences in air pressures in the wheels 2, tire sizes and so on. Accordingly, even if a vertical deviation in a position of the toe angle adjusting rod 601 arises on account of a difference in air pressures in the wheels 2 or the like, the first and second clamp means 504 and 505 ensure the the clamping of the toe angle adjusting rod 601 or the lock nut 602.

Figure 24:
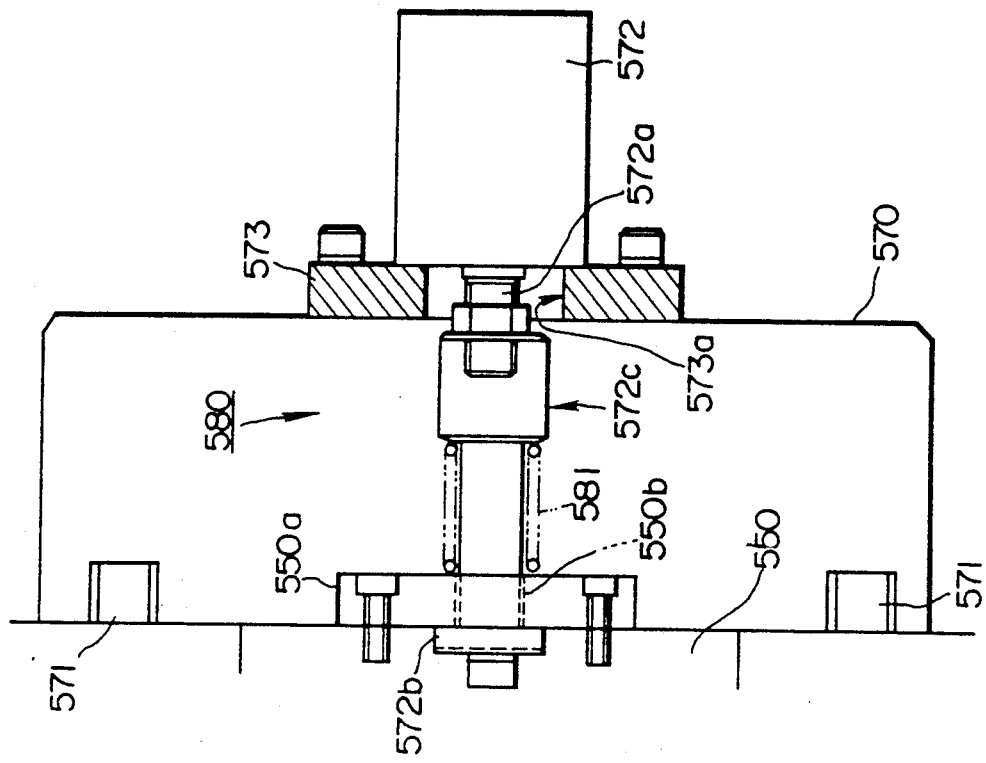
FIG. 24 is a partially cross-sectional view showing a pressing mechanism disposed on the toe angle adjusting unit.

As shown in FIG. 19, the sliding table 550 is disposed so as to be movable in a transverse direction relative to the base 570, that is, in a direction in which the toe angle adjusting rod 601 extends. More specifically, as shown in FIG. 24, the base 570 is provided with a second guide rail 571 extending in a transverse direction so as to guide and displace the sliding table 550. The sliding table 550 is connected to a sixth cylinder 572 disposed on the base 570 so as to be movable in a transverse direction by extending or shortening the sixth cylinder 572, thus leading to a transferal of the toe angle adjusting rod 601 in a direction in which the sixth cylinder 572 extends. When the sixth cylinder 572 is extended, on the one hand, the sliding table 550 is displaced outwardly in a transverse direction allowing the second clamp means 505 to take an operation position of clamping the lock nut 602. When the sixth cylinder 572 is shortened, on the other hand, the sliding table 550 is displaced inwardly in a transverse direction, thus allowing the second clamp means 505 to take a non-operation position, that, a waiting position next to the lock nut 602. At a connection portion of the sixth cylinder 572 with the sliding table 550 is disposed a pressing mechanism 580 having a structure as will be described hereinbelow, thus permitting a compensation for the situation in which the second clamp means 505 cannot take a clamp position to clamp the lock nut 602 even if the sixth cylinder 572 is extended.

PRESSING MECHANISM (FIG. 24)

The pressing mechanism 580 basically comprises a compression spring 581 which in turn is mounted between a piston rod 572a of the sixth cylinder 572 and an upright plate 573 disposed on the base 570 in such a manner as providing an urging force to the second clamp means 505 so as to take a predetermined operation position. The first upright plate 573 is provided on the base 570 at its side end at an inner position in a direction of extension of the toe angle adjusting rod 601, that is, at a side end at an inner position in a transverse direction, and the upright plate 573 is fixed to the sixth cylinder 572. The first upright plate 573 is provided with a hole 573a through which the piston rod 572a of the sixth cylinder 572 projects outwardly in a transverse direction. The sliding table 550 is provided on its side end portion with a second upright plate 550a which in turn is provided with a second hole 550b through which the piston rod 572a of the sixth cylinder 572 is designed so as to allow its tip portion to pass and project. At a portion at which the piston rod 572a projects through the second hole 550b is disposed a stopper portion 572b functioning as a stopper for the second upright plate 550a. The piston rod 572a is provided at its middle portion with an enlarged portion 672c. Between the second upright plate 550a and the enlarged portion 572c of the piston rod 572a is mounted a compression spring 581 which works as the pressing mechanism 580. With the arrangement of the pressing mechanism 580 as have been described hereinabove, the compression spring 581 is designed to urge a pressure so as to press the second clamp means 505 toward a predetermined operation position through the sliding table 550 to clamp the lock nut 602 even if the second clamp means 505 cannot be transferred to such a predetermined operation position without adequate engagement of the grip member 521 of the second clamp means 505 with the lock nut 602 in a sufficient way when the piston rod 572a of the sixth cylinder 572 is extended and when the sliding table 550 is moved to an operation position. Such a situation may occur because the sliding table 550 is caused to be transferred from the toe angle adjusting rod 601 side to the lock nut 602 side when an operation position is taken. With this arrangement, the second clamp means 572 urged by the compression spring 581 permits the lock nut 602 to be clamped by the aid of a swinging movement of the second swinging arm 503.

TOE ANGLE ADJUSTMENT (FIGS. 25 TO 40)

The following is a brief description on the toe angle adjustment.

The terms used in this specification and the attached claims as "toe angle adjustment" or related terms are intended to mean adjustment of a toe angle including adjustment of a toe-in amount of the rear wheel 2R and the front wheel 2F as well as a horizontal adjustment of the steering wheel 8. The horizontal adjustment of the steering wheel 8 is intended herein to mean adjustment of the steering wheel 8 so as to become in a horizontal state, that is, to bring the steering wheel 8 into a neutral state, when the vehicle is driving straight. The horizontal adjustment is performed by adjusting a tire angle of the front wheel 2F, not by adjusting a state in which the steering wheel 8 is mounted. The horizontal adjustment of the steering wheel 8 may be done in such a state as the front wheel 2F is steered.

(1) Adjustment of a toe-in amount of the rear wheel 2R:

The adjustment of a toe-in amount of the rear wheel 2R can be performed prior to an adjustment of a toe-in amount of the front wheel 2F. The toe-in amount of the rear wheel 2R may be adjusted on the basis of a reference line B·L of the toe angle measuring unit 4, as shown in FIG. 17, that is, by making a tire angle $\theta$ for the left-hand and right-hand rear wheels a predetermined toe angle with respect to the reference line B·L on the basis of the reference lines B·L which are set each at an angle of zero degree. Other technique for adjusting a toe-in amount may be a method in which a composite angle of the rear wheels 2R is based. This technique will be described more in detail.

The composite angle of the rear wheels may be defined in the following relationship and means a direction in which the vehicle advances straight, which is determined in relative relationship of one of the rear wheels 2R with the other thereof.

$$\text{Composite Angle Of Rear Wheels} = \frac{\text{Right-hand Rear Wheel Tire Angle } \theta_{RR} + \text{Left-hand Rear Wheel Tire Angle } \theta_{RL}}{2}$$

In the above relationship, the tire angle $\theta_{RR}$ of the right-hand rear wheel 2RR, on the one hand, is a found tire angle of the right-hand rear wheel 2RR measured by the toe angle measuring unit 4, and the found tire angle is a value when the reference line B·L is set at an angle of zero degree. The tire angle $\theta_{RL}$ of the left-hand rear wheel 2RL, on the other hand, is a found tire angle of the lef-hand rear wheel 2RL measured by the toe angle measuring unit 4, and the found tire angle is likewise a value when the reference line B·L is set at an angle of zero degree. And either the tire angle $\theta_{RR}$ of the right-hand rear wheel 2RR or the tire angle $\theta_{RL}$ of the left-hand rear wheel RL is provided with positive sign (+) and the other is provided with negative sign (−). It is thus to be understood that whether the vehicle advances in a straight direction is decided on the basis of a relative relationship of the left-hand rear wheel 2RL with the right-hand rear wheel 2RR and that the composite angle of the rear wheels 2R represents a degree of deviation of the straight direction from the reference line B·L. The composite angle of the rear wheels will be represented by reference symbol "I·Lr" in the following description.

The toe-in amount of the rear wheel 2R may be adjusted on the basis of the rear wheel composite angle I·Lr and computed on the basis of a toe-in amount for the left-hand and right-hand rear wheels 2RL and 2RR with respect to the rear wheel composite angle I·Lr when the rear wheel composite angle I·Lr assumes an angle of zero. If the computed toe-in amount is larger than a predetermined reference value, the toe-in amounts of the rear wheels 2R are adjusted. The reference value is set so as to meet each vehicle model. It is a matter of course that an amount to be adjusted in adjusting the toe-in amount may be computed on the basis of the rear wheel composite angle I·Lr. It is to be noted, however, that when the toe-in amounts of the rear wheels 2R are adjusted, that is, when the toe-in adjustment is made on the basis of the rear wheel composite angle I·Lr, the straight direction in which the vehicle advances straight does not necessarily coincide with a longitudinal axis of the vehicle body. In other words, the center line extending in forward and rearward directions of the vehicle body is not necessarily a straight direction in the vehicle body advances straight. However, if a degree of deviation of the straight direction from the longitudinal center of the vehicle body is extremely trivial, the driver does not perceive such a trivial deviation and this deviation can be neglected as causing no problem with the driving of the vehicle. It is noted in other embodiments of the present invention, however, that the toe-in adjustment may be performed for only one of the rear wheels 2R.

As have been described hereinabove, the toe-in adjustment for the rear wheel 2R based on the rear wheel composite angle I·Lr has the advantages that it is performed more rapidly and readily compared to the toe-in adjustment on the basis of the reference line B·L and that the former is smaller in amounts to be adjusted than the latter.

(2) Adjustment of Toe-In Amounts for Front Wheels 2F:

The following is a description on a basic idea of adjustment of tire angles of the front wheels 2F including adjustment of the toe-in amounts for the front wheels 2F and a horizontal adjustment of the steering wheel 8.

If adjustment of the toe-in amounts for the front wheels 2F is performed with no attention paid to a relationship with the vehicle body, an element to be taken into consideration is basically a relative relationship of the left-hand front wheel 2FL with the right-hand front wheel 2FR only. If so, the toe-in amounts may be adjusted for the front wheels 2F on the basis of the reference line B·L or on the basis of a composite angle for the front wheels 2F or the rear wheel composite angle I·Lr. It is to be noted, however, that this idea is established only when a relative relationship of the front wheels 2F with the rear wheels 2R is disregarded and when the toe-in amounts for the front wheels 2 are adjusted without a horizontal adjustment of the steering wheel 8. It is further understood that the adjustment for the toe-in amounts of the front wheels 2F can be performed on the basis of the reference line of the toe angle measuring unit 4 on condition that the front wheels 2F are in neutral state.

(3) Horizontal Adjustment of Steering Wheel 8:

As have been described hereinabove, the vehicle body advances straight in a direction decided by the rear wheel composite angle I·Lr. Accordingly, in order to adequately perform the horizontal adjustment of the steering wheel 8, that is, adjustment of the steering wheel 8 so as to become at a horizontal position, a relative relationship of the rear wheels 2R with the front wheels 2F should be taken into consideration.

A found tire angle of the front wheel 2F measured by the toe angle measuring unit 4 should be understood herein to include a steered angle of the front wheel 2R steered by the steering wheel 8, in addition to the toe angle. It should be noted, however, that a ratio of the toe angle to the steered angle within the found tire angle is not definite. In other words, how much and at what ratio a steered angle and a toe angle are contained in the found tire angle is not definite and constant. It is thus necessary to determine a value of the steered angle in order to perform adjustment of the toe-in amounts for the front wheels 2F as well as adjustment of the steering wheel 8 to a horizontal position by adjusting the tire angles of the front wheels 2F. As the steered angle of the front wheel 2F is set as an angle corresponding to an angle at which the steering wheel 8 is steered, it is to be understood that the front wheels 2F are in neutral state when the steering wheel 8 is located at a neutral position if the tire angle of the front wheel 2F is adjusted using the steered angle of the steering wheel 8 as an absolute standard. It is further to be noted that there is a constant relationship of the steered angle of the steering wheel 8 with the steered angle of the front wheel 2F corresponding thereto although it varies with vehicle models. Thus it is possible to prepare such relationships in advance so as to adapt each of vehicle models. The steered angle of the steering wheel 8 may be detected by a steered angle detecting means 9 as will be described hereinbelow.

Accordingly, the issue is what the tire angle of the front wheel 2F should be adjusted on the basis of.

As have been described hereinabove, when the front wheels 2F are at vertically neutral state, the vehicle body advances straight in a direction determined by the rear wheel composite angle I·Lr even if the front wheels 2F are deviated to some extent from their neutral positions. In other words, when the vehicle body is in such a state as advancing in a straight direction, the left-hand and right-hand front wheels 2F are directed in a direction determined by the rear wheel composite angle I·Lr as will be described in detail hereinbelow.

A composite angle of the front wheels 2F, as will be referred to as a front wheel composite angle, may be defined below:

$$\text{Composite Angle Of Front Wheels} = \frac{\text{Right-hand Front Wheel Tire Angle } \theta_{FR} + \text{Left-hand Front Wheel Tire Angle } \theta_{FL}}{2}$$

In the above relationship, the tire angle $\theta_{FR}$ of the right-hand front wheel 2FR is intended to mean a found tire angle of the front wheel 2FR measured by the toe angle measuring unit 4, on the one hand, while the tire angle $\theta_{FL}$ of the left-hand front·wheel 2FL is likewise intended to mean a found tire angle of the front wheel 2FL measured thereby. It is further noted that the tire angles $\theta_{FR}$ and $\theta_{FL}$ are found on condition that the reference line B·L is set at an angle of zero degree and are represented by providing either of them with negative sign (−) and the other with positive sign (+). It is thus to be understood that, to however larger extend the front wheels 2F are steered, such large steered angles of the front wheels 2F does not exert any influence upon the front wheel composite angle defined hereinabove. In the following description, the front wheel composite angle is represented by reference symbol "I·Lf".

Figure 25:
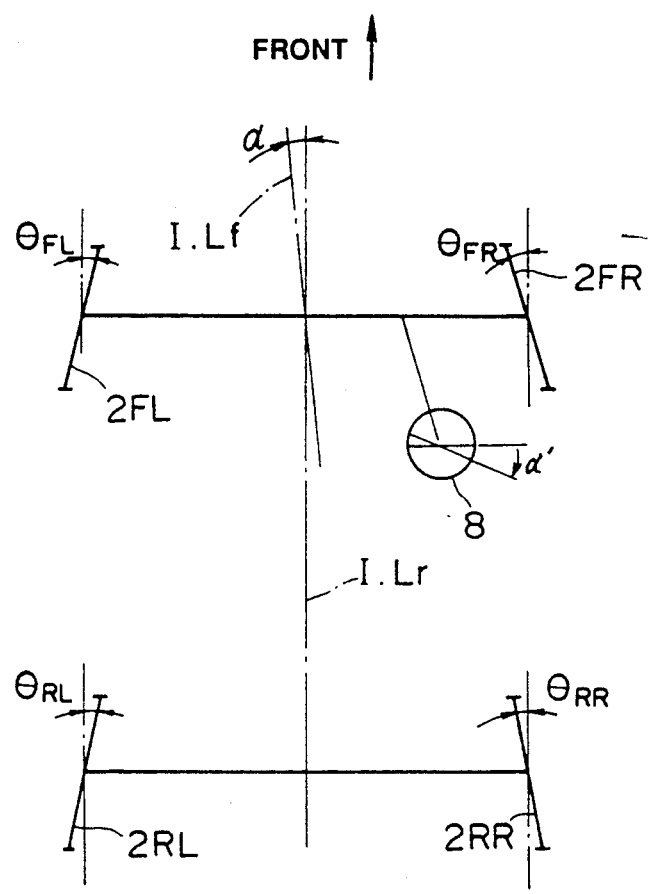
FIG. 25 is an explanation diagram for explaining a correction of a steered angle of a steering wheel in the toe angle adjustment for the front wheels.

It is presumed herein that, as shown in FIG. 25, the front wheel composite angle I·Lf obtained by the front wheels 2F subsequent to the toe-in adjustment for the front wheels 2F and to the adjustment of the steering wheel 8 to a horizontal position is deviated by a somewhat small amount "α". This amount will sometimes be referred to as a deviated angle or related terms. In this case, as the vehicle body advances in a straight direction, a direction in which the vehicle advances is defined by the rear wheel composite angle I·Lr so that the front wheels 2F are also directed in a direction defined by the rear wheel composite angle I·Lr. In other words, the front wheels 2F are steered to somewhat extent in such a state as compensating for the deviated angle α created between the front wheel composite angle I·Lf and the rear wheel composite angle I·Lr. This means that the steering wheel 8 is steered at an angle corresponding to the deviated angle α when the vehicle body advances in a straight direction. It is noted that the angle "α'" in FIG. 25 is a steered angle of the steering wheel 8 corresponding to the deviated angle α.

It is accordingly said to be inappropriate to perform the adjustment of the toe-in amounts of the front wheels 2F and the adjustment of the steering wheel 8 at a horizontal position or at a neutral position without any attention paid to the rear wheel composite angle I·Lr.

Thus the tire angle of the front wheel 2F is adjusted on the basis of the rear wheel composite angle I·Lr.

STEERED ANGLE DETECTING MEANS (FIG. 26)

Figure 26:
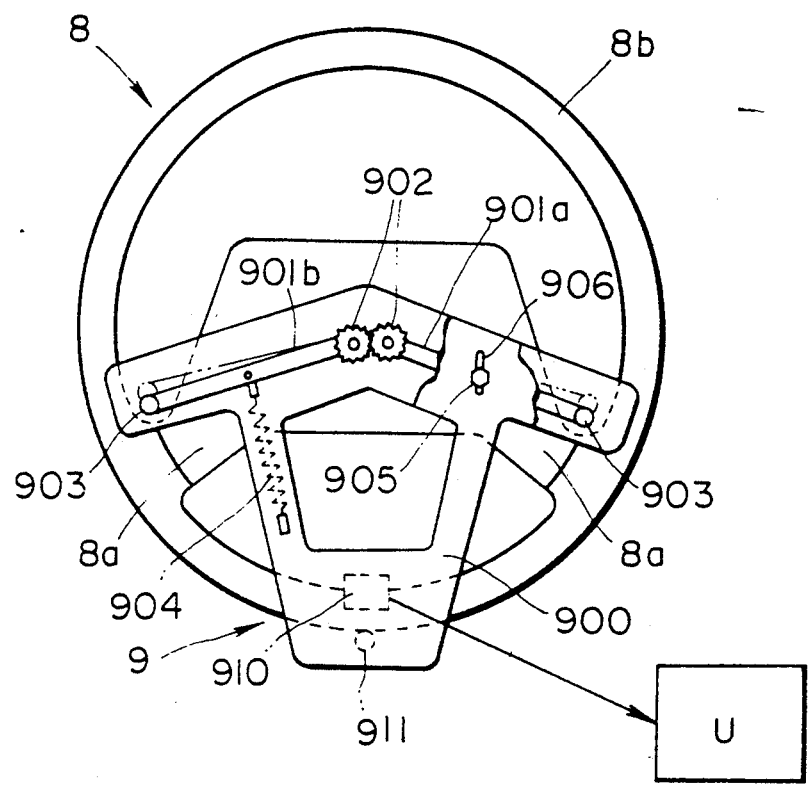
FIG. 26 is a plane view showing a steered angle detecting means of the steering wheel.
Figure 27:
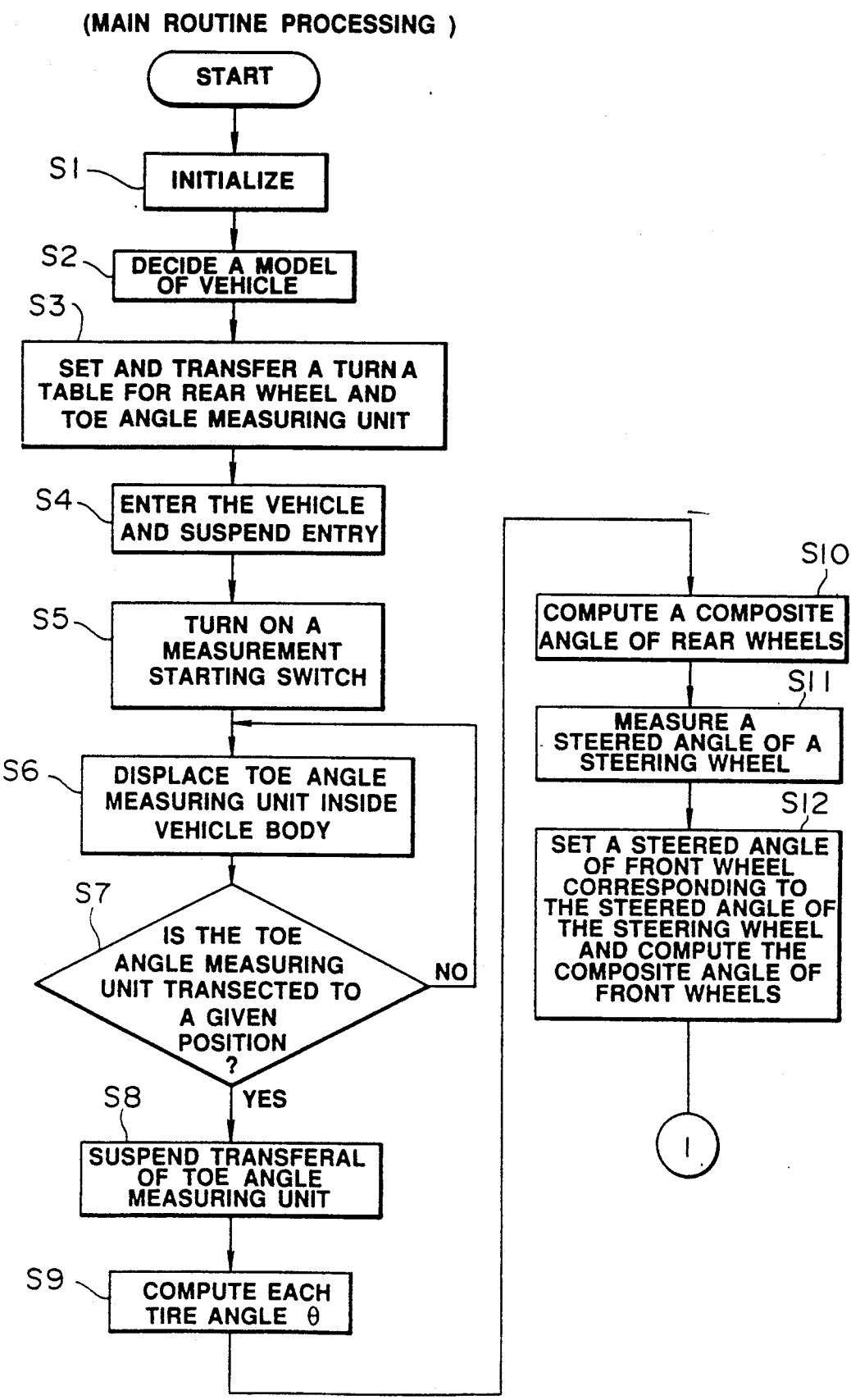
FIGS. 27 to 38 are each a flowchart showing an example of a control over the toe angle adjustment.

A steered angle of the steering wheel 8 may be detected by a steered angle detecting means 9 as shown in FIG. 26. The steered angle detecting means 9 comprises a main body 900 with a pair of left-hand and right-hand arms 901 extending in leftward and rightward directions, respectively. The left-hand arm 901a is integrally provided at its inner end portion with a gear 902 engageable with another gear 902 that in turn is integrally disposed at an inner end portion of the right-hand arm 901b. The gears 902 are rotatably supported by the main body 900. And the arms 901 are disposed so as to be swingable at equal angles about the respective inner end portions of the arms 901. The arm 901 is provided at its outer end portion with a pin 903 which in turn is engaged with a stay portion 8a of the steering wheel 8. Between the main body 900 and the arm 901 is mounted a tension spring 904. The swinging of the arm 901 is regulated by an association of a pin 905 fixed to the arm 901 with a guide portion 906 disposed on the main body 900. The main body 900 is further provided with an angle sensor 910 and a holding pin 911, the angle sensor 910 being disposed on a vertical line passing through an intersection of the left-hand arm 901a with the right-hand arm 901b, and the holding pin 911 being disposed so as to be engageable with a wheel portion 8b of the steering wheel 8. The steered angle detecting means 9 is mounted on the steering wheel 8 in association of the holding pin 911 with the pin 903 mounted on the arm 901.

The angle sensor 910 is constituted by a sensor using a magnetoresitant element for linear displacement and converting an angle inclined from the vertical line into voltage in a non-contact manner in a combination with a magnet and a pendulum. The steered angle of the steering wheel 8 detected by the angle sensor 910 is input into the control unit U.

Given the foregoing, the toe angle adjustment will be described more in detail with reference to flowcharts starting with FIG. 28.

MAIN ROUTINE PROCESSING (FIGS. 27-28)

Subsequent to initialization processing by resetting flags and the like at step S1, a model of a vehicle entering into the toe angle adjusting station S is decided by manual operation or using a host computer at step S2. The decision of vehicle modes also includes a decision of vehicles with power steering from vehicles with no power steering. At step S3, the turn tables 303R and the toe angle measuring units 4R for the rear wheels 2R, each consisting of a toe angle sensing unit, are set and transferred in a longitudinal direction ao as to interpose a vehicle of a different model entering into the station S at an appropriate distance from the turn tables 303F and the toe angle measuring units 4F for the front wheels 2F, each consisting of a toe angle sensing unit. Then the measurement for a tire angle $\theta$ of the wheel 2 is started using the toe angle measuring unit 4 from step S4 to tep S8. At step S4, the vehicle body is entered in the station S and stopped at a predetermined position. After the entry of the vehicle body has stopped, a switch is turned on to start with measurement at step S5. At step S6, each of the toe angle measuring units is displaced in a direction inside the vehicle body until the measuring plate 401 is brought into abutment with each of the wheels 2 and, at step S7, it is decided whether or not the toe angle measuring unit 4 is transferred to a predetermined position. If NO at the step S7, the flow returns to the step S6. If it is decided YES at the step S7, the flow proceeds to step S8 where the transferal of the toe angle measuring unit 4 is suspended. Then at step S9, the tire angle $\theta$ is computed for each of the wheels 2 on the basis of measured first results, for example, Aa1 and Ba1. The tire angle $\theta$ for each of the rear wheels 2R is computed by the following equation:

$$\tan \theta 1 = \frac{Aa1 - Ba1}{S}$$

Then at step S10, the rear wheel composite angle I·Lr is computed on the basis of the above equation and at step S11, a steered angle of the steering wheel 8 is measured. At step S12, a steered angle of the front wheel 2F corresponding to the steered angle of the steering wheel 8 is set on the basis of a table as indicated in FIG. 40, in which the steered angles of the front wheels 2F are prepared for vehicle models. Furthermore, for the same vehicle model, the steered angles of the front wheels 2F are prepared for vehicle bodies with a power steering mechanism or with no power steering mechanism. At the step S12, the front wheel composite angle I·Lf is also computed.

Toe angles for the front wheels 2F and the rear wheels 2R are then computed at step S13. The toe angles of the rear wheels 2R, on the one hand, are computed on the basis of the rear wheel composite angle I·Lr. In other word, a found tire angle $\theta$ of the rear wheel 2R on the basis of the reference line B·L which assumes an angle of zero degree is modified by a tire angle on the basis of a direction of the rear wheel composite angle I·Lr which is set at an angle of zero degree, and the tire angle modified is determined as a toe angle for the rear wheel 2R. The toe angles of the front wheels 2F, on the other hand, are computed on the basis of the front wheel composite angle I·Lf. A found tire angle of the front wheel 2F on the basis of a direction of the reference line B·L which is set at an angle of zero degree is first replaced by a tire angle at which a direction of the front wheel composite angle I·Lf is set at an angle of zero degree. A toe angle of the front wheel 2F is determined as a value obtainable by deducting a steered angle of the front wheel 2F, that is, a steered angle corresponding to a steered angle of the steering wheel 8, from the replaced tire angle. The toe angles of the front wheels 2F and the rear wheels 2R obtained at the step S13 are displayed on a display screen at step S14. The flow then proceeds to step S15 where a deviated angle $\alpha$ (an offset amount), an angle of the front wheel composite angle I·Lf deviated from the rear wheel composite angle I·Lr, is computed as shown in FIG. 25. At step S16, the toe angle of each of the wheel 2 is converted from a unit of angle to a unit of length for a toe-in amount. Then at step S17, these figures are displayed together with the reference value (FIG. 39) for a visible observation by an operator.

At step S18, it is decided whether or not the toe-in amount and the deviated angle $\alpha$ are within a reference value as shown in FIG. 39, thus judging whether the toe angle adjustment is necessary. It is to be noted that the deviated angle $\alpha$ of the front wheel composite angle I·Lf with respect to the rear wheel composite angle I·Lr represents an error of mounting the steering wheel 8. If it is decided that the toe-in amount and the deviated angle α for each of the wheels 2 are all within a reference value at the step S18, on the one hand, it is decided that no toe angle adjustment is necessary and the vehicle is removed at step S19. If it is decided at the step S18 that at least either of the toe-in amount or the deviated angle α is beyond the predetermined value, on the other, the flow proceeds to step P20 where the toe angle measuring unit 4 is adjusted to zero point and at step S21, the toe angle adjustment is performed.

ZERO POINT ADJUSTING ROUTINE PROCESSING (FIG. 38)

The zero point adjusting routine processing for the toe angle measuring unit 4 is implemented using the two displacement measuring unit 410: the forward displacement measuring unit 410a being located at a position forward of the toe angle measuring unit 4 with the support shaft 406 interposed (represented as a sensor A in the flowchart) and the rearward displacement measuring unit 410b being located at a position rearward of the toe angle measuring unit 4 (represented as a sensor B in the flowchart). A first measured value Aa1 of the forward displacement measuring unit 410a is replaced by a predetermined value $A_o$ and a first measured value Ba1 of the rearward displacement measuring unit 410b is replaced by a predetermined value $B_o$, thus performing the zero point adjustment for the displacement measuring units 410a and 410b, respectively, at step S22. Next at step S23, flag I is set and flag I=1 means the completion of the zero point adjustment.

ADJUSTMENT ROUTINE PROCESSING (FIGS. 29-37)

Figure 29:
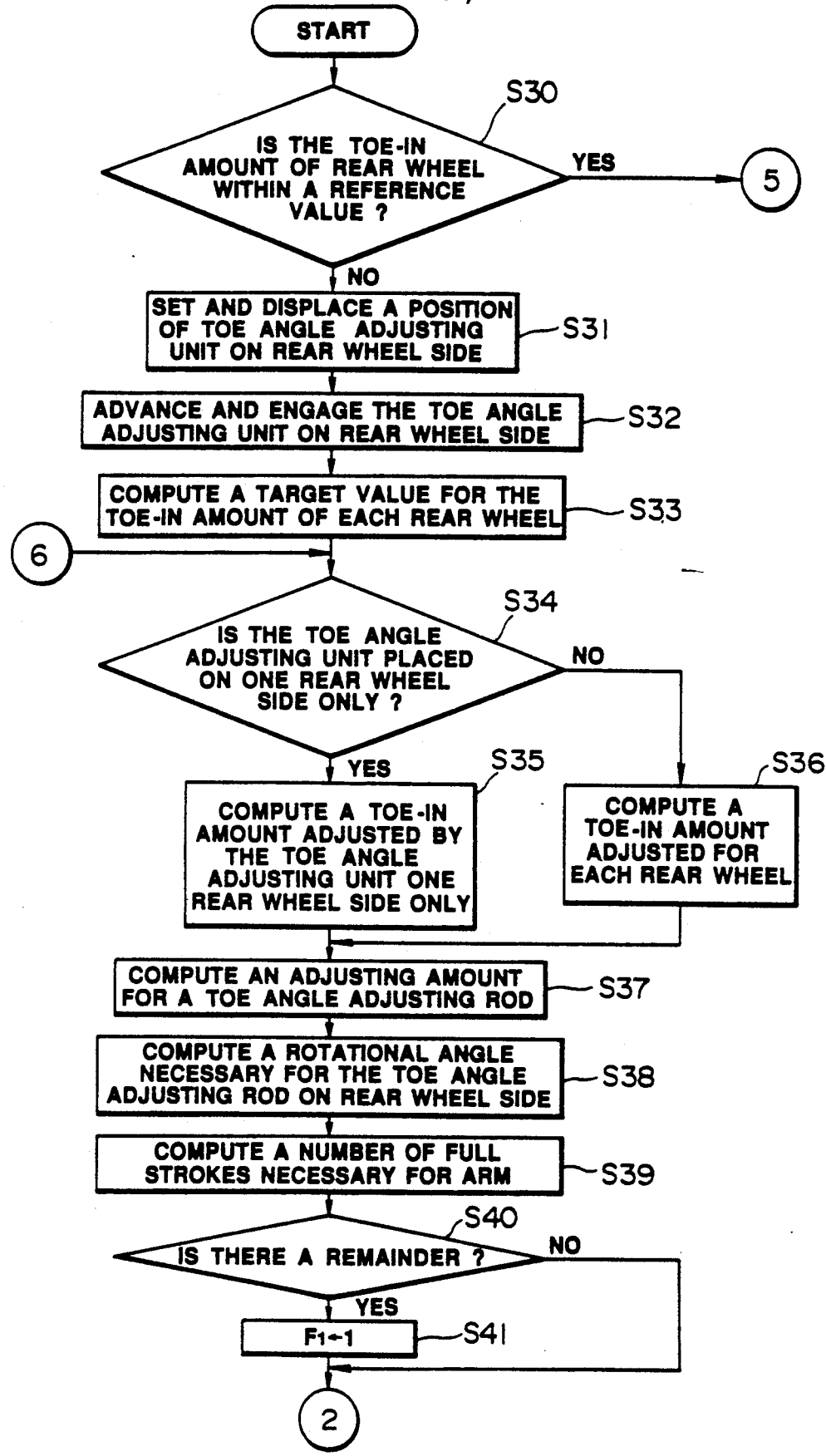
Figure 30:
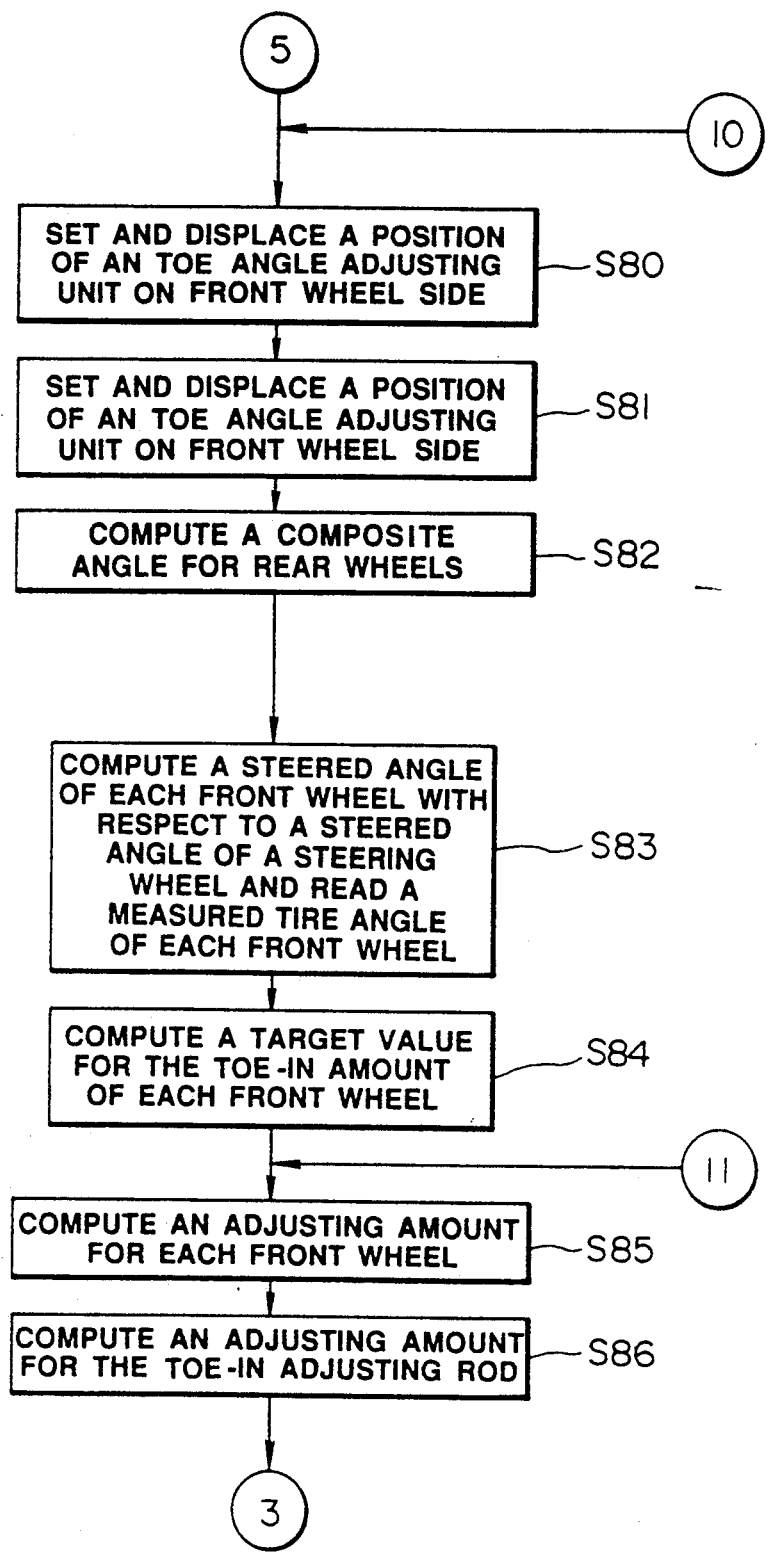

Referring to FIG. 29, as the toe angle adjustment for the rear wheels 2R is performed prior to the toe angle adjustment for the front wheels 2F, it is first decided at step S30 whether or not the toe angles of the rear wheels 2R are appropriate, that is, whether or not the toe-in amount for each of the rear wheels 2R is all within a predetermined value. When it is decided that the toe angle adjustment for the rear wheels 2R is necessary, the flow advances to step S31 and the processing is continued from the step S31.

(a) Toe Angle Adjustment for Rear Wheels:

The toe angle adjustment for the rear wheels 2R starts with the setting of the toe angle measuring unit 5R at an operation position at step S31. More specifically, the first clamp means 504 and the second clamp means 505 are set at operation positions and at gripping positions by extending the fifth cylinder 552 and transferring the main arm 501 to an operation position. At this time, the first and second clamp means 504 and 505 are both in an open state, and the turn table 550 is taken at a waiting position by shortening the sixth cylinder 572. The first and second clamp means 504 and 505 are then operated so as to enter the wedge-shaped members 509 and 524 into their grip members 506 and 521, thus closing their grip members 506 and 521, respectively. Thereafter, at step S32, the sixth cylinder 572 is extended to transfer the sliding table 550 to an operation position. At an stage the sixth cylinder 572 has been completely extended, the third cylinder 537 is allowed to extend to some extent, thus swinging the second arm 503. The swinging action of the second arm 503 is ready to take an grip position at which the second clamp means 505 grips the lock nut 602 in association with the pressing mechanism 580, thus leading to completion of the setting of the first and second clamp means 504 and 505.

Then at step S33, a target value necessary for the toe angle adjustment is set as a mean value of an upper limit reference value and a lower limit reference value on the basis of a reference value for the vehicle model selected from the table as shown in FIG. 39. The target value may be computed by the following:

$$\text{Target Value} = \frac{\text{Upper Limit Reference Value} + \text{Lower Limit Reference Value}}{2}$$

Steps S34 to S36 are inserted in the flowchart shown in FIG. 29 to cover another embodiments according to the present invention. At step S34, it is decided whether or not the toe angle adjusting mechanism 6 is disposed only on either of the left-hand rear wheel 2RL or the right-hand left wheel 2RR. The the flow proceeds to step S37. If YES at the step S34, on the one hand, the flow advances to step S35 and there is computed an adjusted toe-in amount for the rear wheel 2R on which the toe angle adjusting mechanism is disposed. If NO at the step S34, as in this embodiment, on the other hand, the flow advances to step S36 where an adjusted toe-in amount for each of the rear wheels 2R is computed. Then at step S37, an adjusted amount, that is, an amount necessary for adjustment of the toe angle adjusting rod 601 is computed by producing a deviation of the current toe angle obtained at the step S13 with respect to the target value. At step S38, the adjusted amount is replaced by a rotational angle necessary for the toe angle adjusting rod 601 from the relationship with screw pitches of the toe angle adjusting rod 601. A number of strokes of the first swinging arm 502 is computed on the basis of the rotational angle at step S38 as follows:

$$\text{Number of Strokes of Swinging Arm 502} = \frac{\text{Rotational angle necessary for toe angle adjusting rod}}{\text{Rotational angle of toe angle adjusting rod rotated when first swinging arm swings in one stroke}}$$

Figure 31:
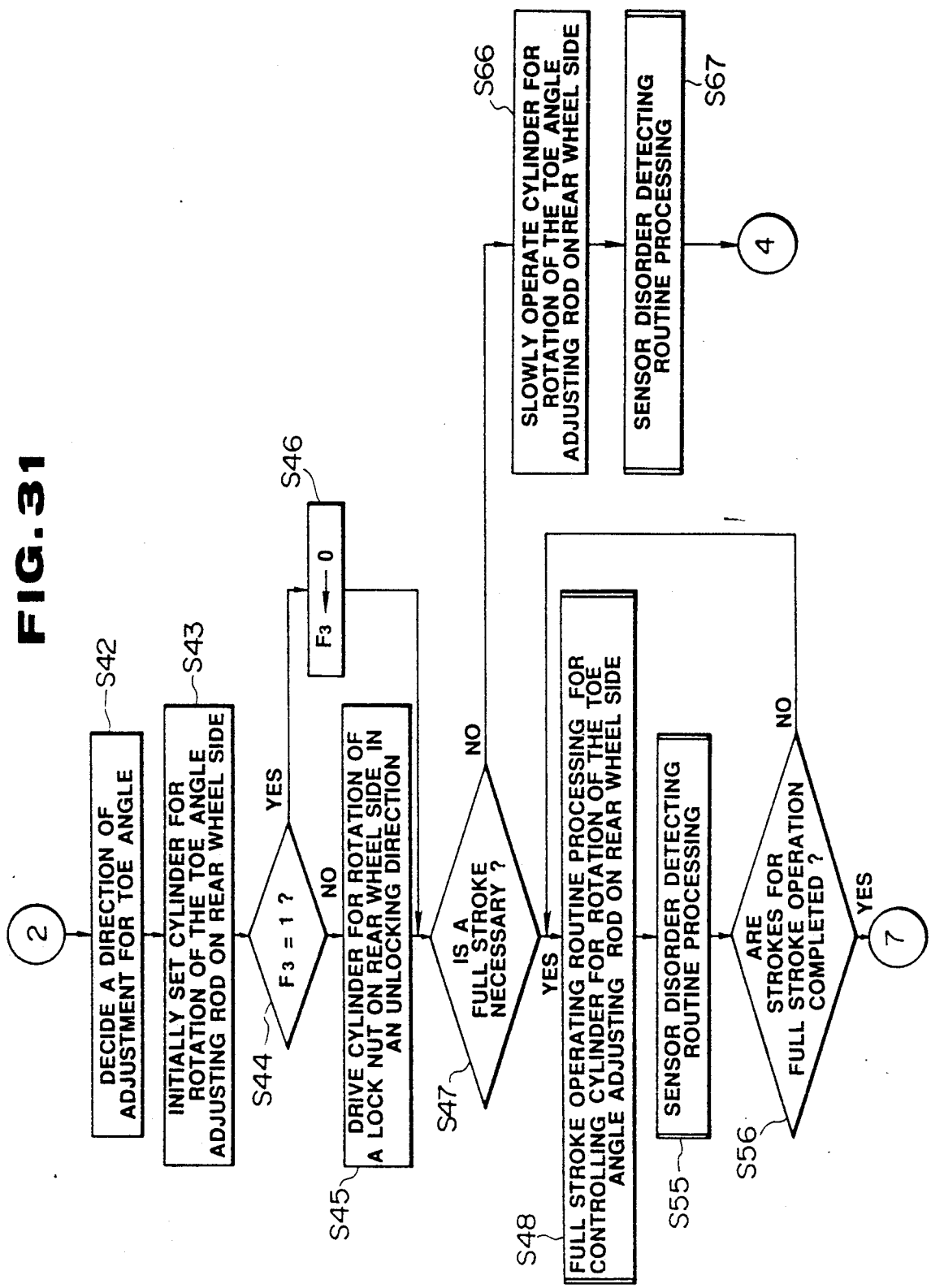

If a remainder is given at step S40 in the computation at the step S39 by the above equation, on the one hand, this means that a fine adjustment for a toe angle is required, in addition to the toe angle adjustment on the basis of full strokes of the first swing arm 502. Thus the flow proceeds to step S41 where flag F1 is set. F1=1 is meant that a fine adjustment for the toe angle is required. If there is no remainder, the flow advances to step S42 in FIG. 31.

At step S42, a direction of adjustment for a toe angle is determined by deciding whether the toe angle adjusting rod 601 is extended or shortened, or a direction of rotation of the toe angle adjusting rod 601. Then at step S43, the fourth cylinder 538 for swinging the first swinging arm 502 for rotation of the toe angle adjusting rod 601 on the rear wheel side is initially set in accordance with the direction of the toe angle adjustment determined at the step S42. In other words, the fourth cylinder 538 is shortened or extended up to its stroke end in accordance with the rotational direction of the toe angle adjusting rod 601, and the toe angle adjusting rod 601 is then clamped by the first clamp means 504. At step S44, it is decided whether flag F3=1 or not. The flag F3 is to decide whether or not a readjustment for the toe angle is necessary, as will be described hereinbelow. At the initial stage, however, the flag is F3=0 that the flow proceeds to step S45 where the cylinder for rotation of the lock nut 702 on the rear wheel side is driven in an unlocking direction in which the lock nut 702 is unclamped by the second clamp means 505. In other words, at the step S45, the lock nut 702 is clamped by the second clamp means 505 and then unlocked by the second clamp means 505. This allows the toe angle adjusting rod 601 to rotate. If YES at the step S44, the flow proceeds to S46 where flag F3 is reset.

Then at step S47, whether a full stroke is necessary is decided by judging the number of strokes is 1 or more. When the number of strokes is found to be 1 or more, on the one hand, the flow proceeds to step S48 for rotating the toe angle adjusting rod 601 by means of operation of the fourth cylinder 538 in full stroke. The full stroke operation control of the fourth cylinder 538 will be described in FIG. 37.

Figure 37:
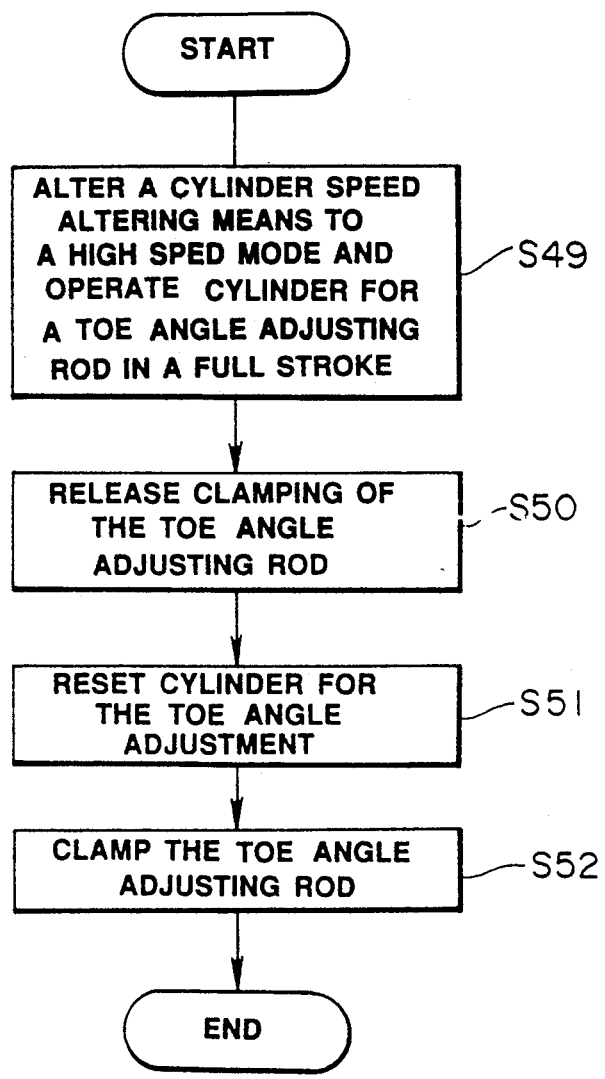

As shown in FIG. 37, the full stroke operation control routine processing is performed at steps S49 to S52. At step S49, the cylinder speed altering means 540 is changed to a high speed mode, and the fourth cylinder 538 for the toe angle adjusting rod 601 is operated in full stroke. Then at step S50, the clamping of the toe angle adjusting rod 601 by the first clamp means 504 is released and, at step S51, the fourth cylinder for the toe angle adjustment is reset. The toe angle adjusting rod 601 is clamped again by the first clamp means 504 at step S52. The operation of the fourth cylinder 538 in full stroke is repeated in numbers as required at step 56 in FIG. 31. A necessity of a repetitive operation of the fourth cylinder 538 will be described hereinbelow in detail. A limit is produced upon strokes of the fourth cylinder 538 so that, when a toe angle to be adjusted is large, strokes of the fourth cylinder 538 should be repeated several times. In this instance, it is necessary to disengage the toe angle adjusting rod 601 from the first clamp means 504 at the time when the fourth cylinder 538 is returned to an original position. Engagement or disengagement of the toe angle adjusting rod 601 with or from the first clamp means 504 may be made, for example, by mechanical means such as a ratchet mechanism, however, the means of this type permits an adjustment of the toe angle adjusting rod 601 in one direction only, nut not in another direction. In other words, such a mechanical means enables an adjustment of the toe angle adjustment in either positive (+) or negative (−) direction only, thus failing to render the toe angle adjustment automatic.

As a repetitive full stroke operation has finished, disorders or abnormalities of the toe angle measuring unit 4 are detected at step S55, as will be described in detail in FIG. 38.

If a fine adjustment is necessary for the toe angle adjustment after the full stroke operation has been finished at the step S56, the flag F1 is reset at step S58, and a fine toe angle adjustment is performed at steps S59 to S62. At step S59, after the cylinder speed altering means 540 (FIG. 19) has been changed to a low speed mode, the fourth cylinder 538 for rotation of the toe angle adjusting rod 601 on the rear wheel side is slowly operated while measuring a tire angle, more specifically, while determining a variation in tire angles, $\Delta\theta$, at step S60, attendant upon the toe angle adjustment. Then at step S61, a toe-in amount on the rear wheel side is computed and, at step S62, it is decided whether or not the toe-in amount has amounted to the target value. As have been described hereinabove, the fine adjustment is performed at a low speed mode while feeding an actual tire angle back, thus permitting an accurate adjustment. On the contrary, the toe angle adjustment is implemented using a high speed mode at the time of the full stroke operation, thus leading to a rapid adjustment. Thus, accuracy in the fine adjustment has been provided together with rapidity in the toe angle adjustment. When it is decided at the step S62 that the toe-in amount is not within the target value, that is, that the fine adjustment has not been finished, on the one hand, the flow returns to step S59 and the process from the step S59 to S62 is repeated. When it is decided at the step S62 that the toe-in amount is within the target value, that is, that no fine adjustment of the toe angle has been finished, on the other hand, the flow proceeds to step S63. After completion of the fine toe angle adjustment, the lock nut 702 is locked again by the second clamp means 505, and the toe angle adjusting unit 5 is reset at a non-operation position (steps S64 and S65).

If it is decided at the step S47 that no full stroke operation is required for the toe angle adjustment, that is, that only a fine adjustment is required, the flow proceeds to step S66 where the fourth cylinder 538 for rotation of the toe angle adjusting rod 601 is slowly operated while feeding the tire angle back in substantially the same procedures as at the step S48. Then at step S67, abnormalities or disorders in the toe angle measuring unit 4 are detected.

When no fine adjustment for the toe angle is necessary, the flow proceeds from the step S57 to step S68 and it is then decided whether or not the toe angle adjustment is appropriate. If the toe angle adjustment is inappropriate, the flow advances to step S71 where the flag F3 is set and the flow returns to the step S34 for readjustment of the toe angle. The flag F3=1 means a toe angle re-adjustment.

Given completion of the toe angle adjustment for the rear wheels 2R, as have been described hereinabove, or given no necessity of the toe angle adjustment for the rear wheels 2R from the beginning, the toe angle adjustment for the front wheels 2F is performed.

Figure 32:
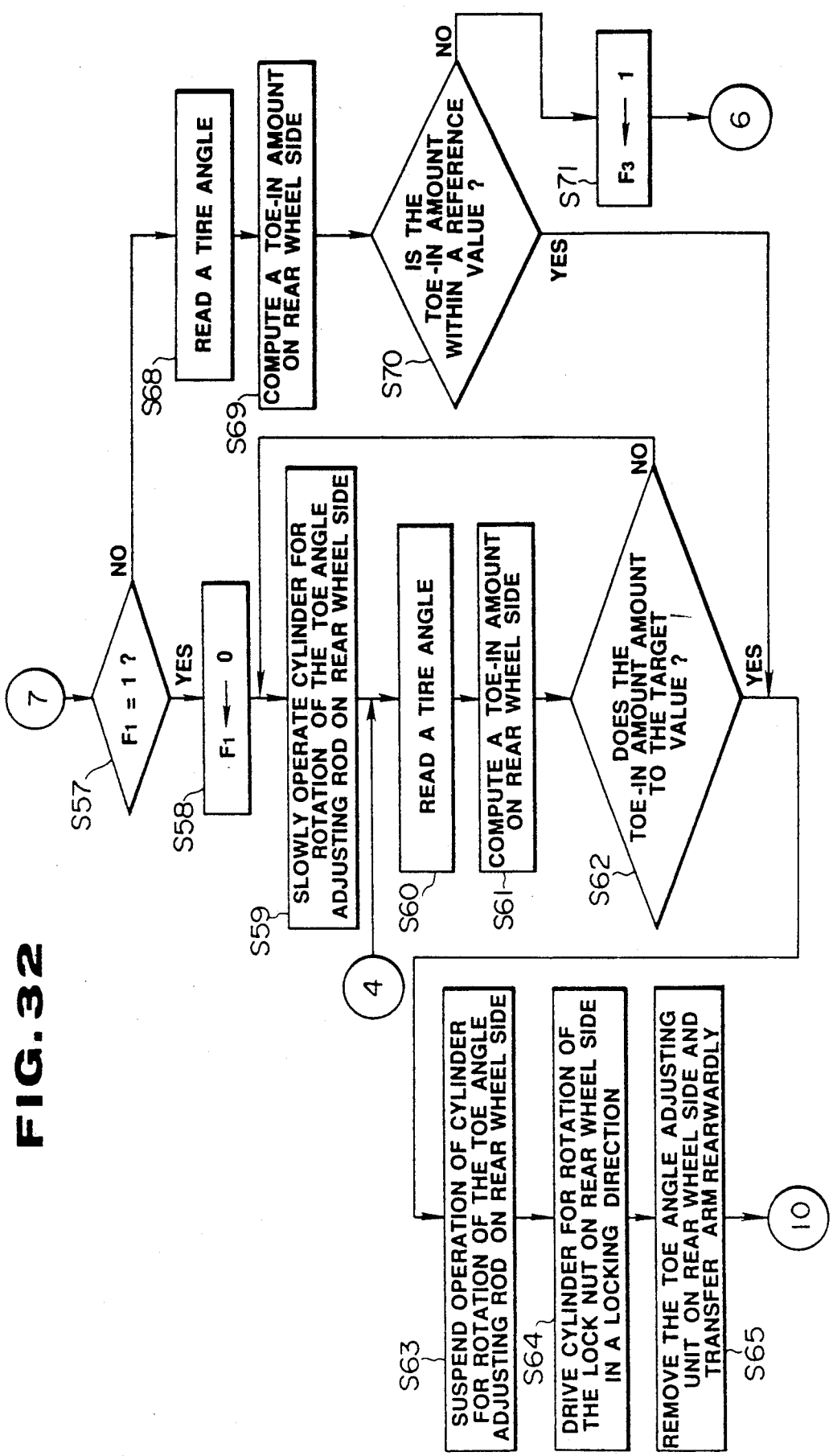
Figure 33:
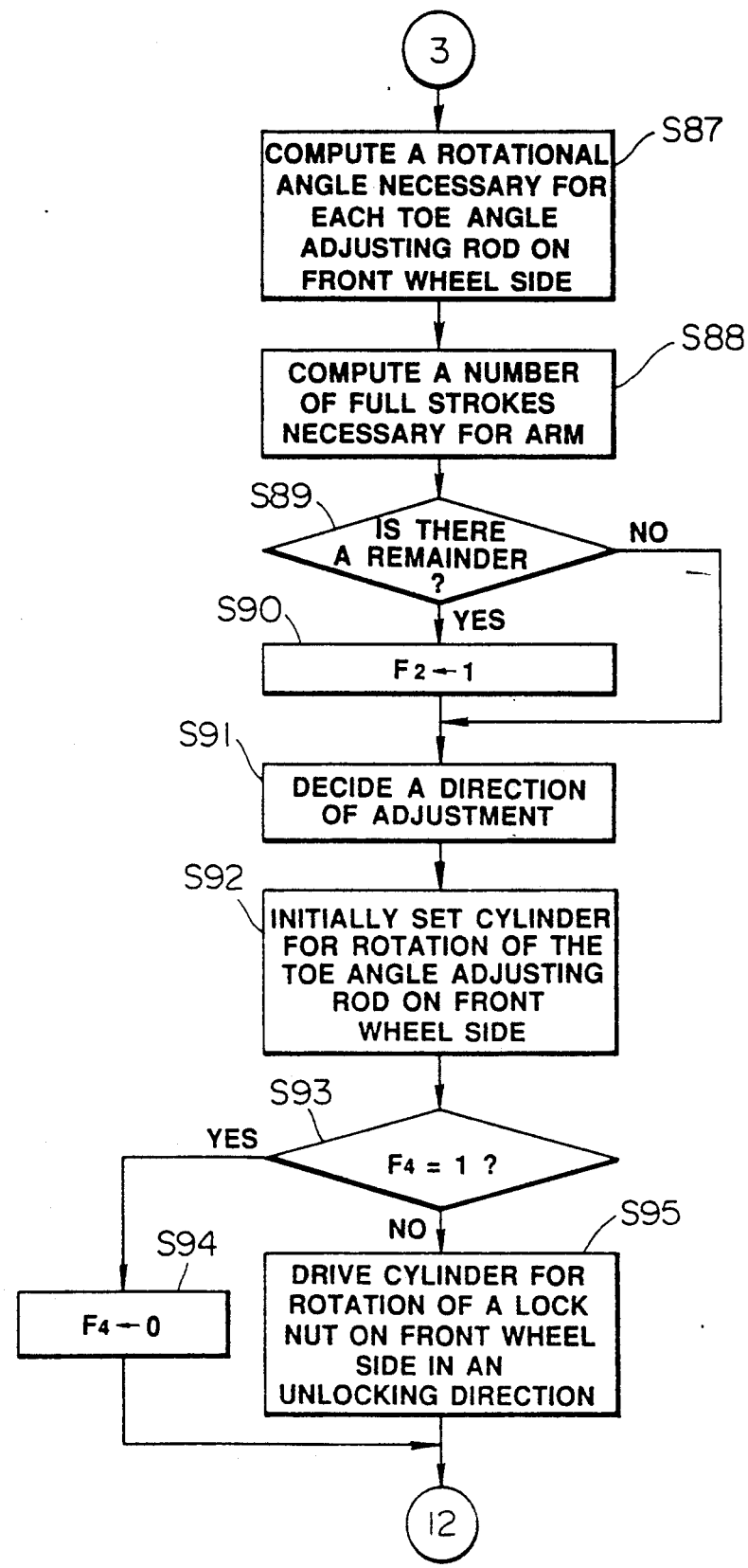
Figure 34:
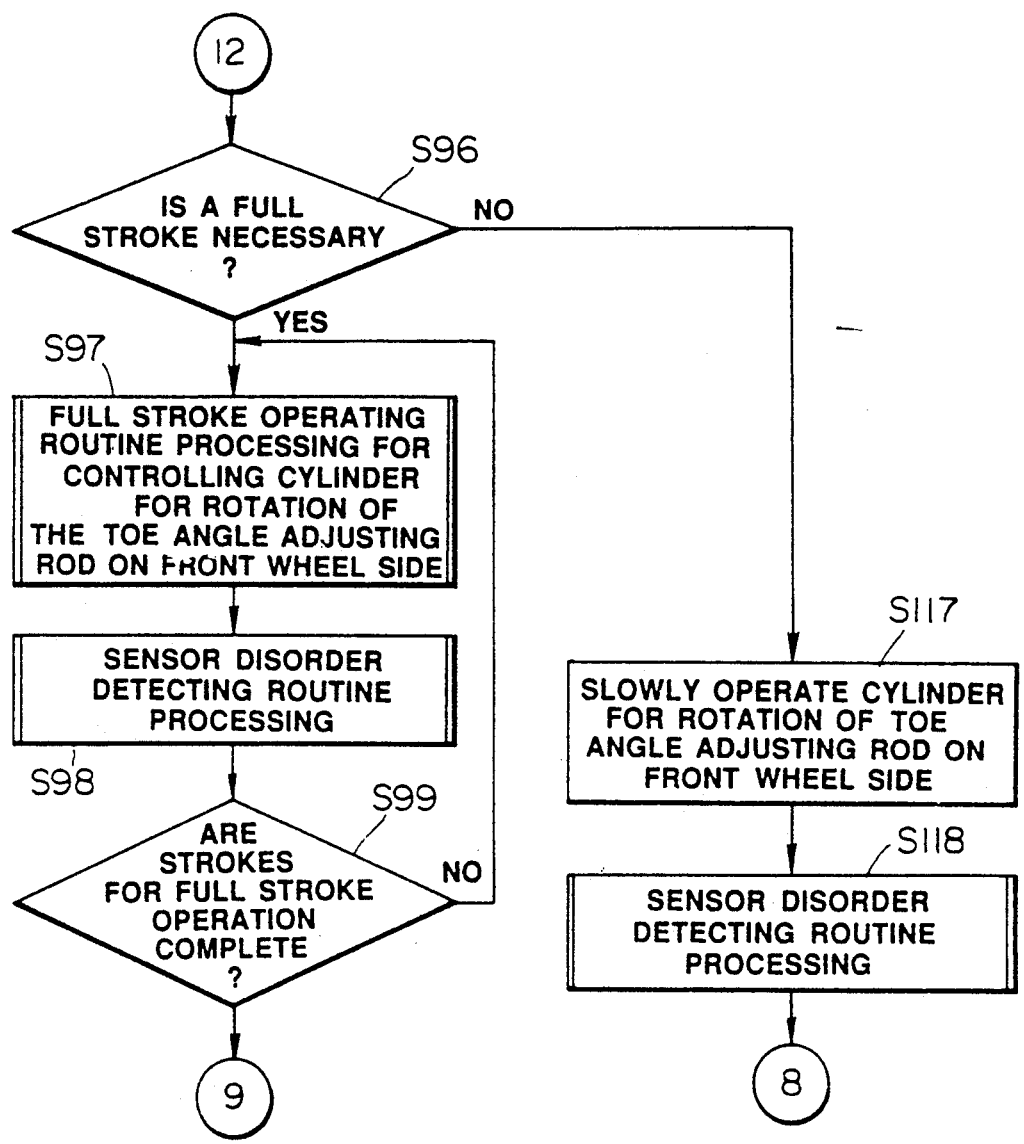
Figure 35:
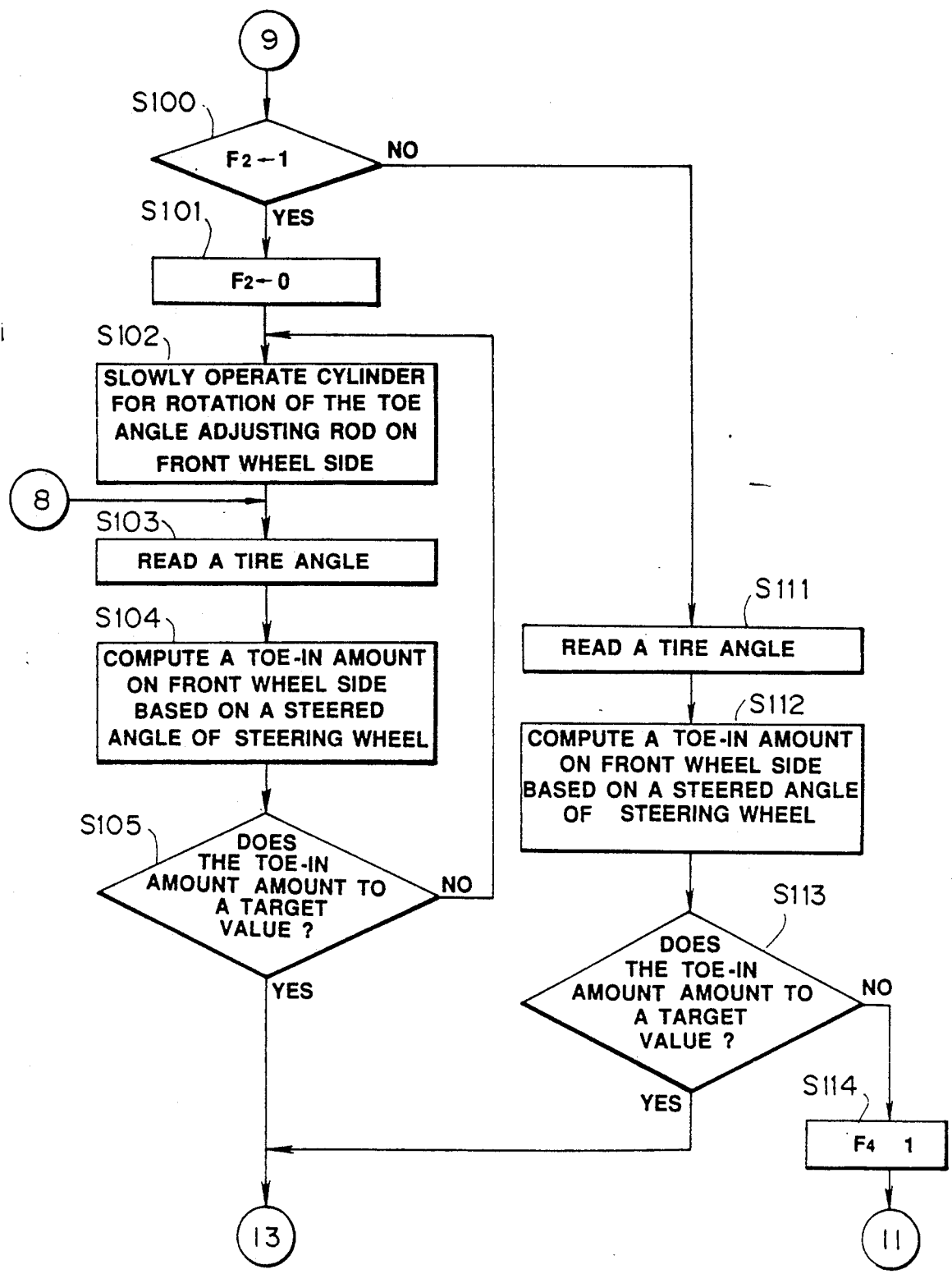
Figure 36:
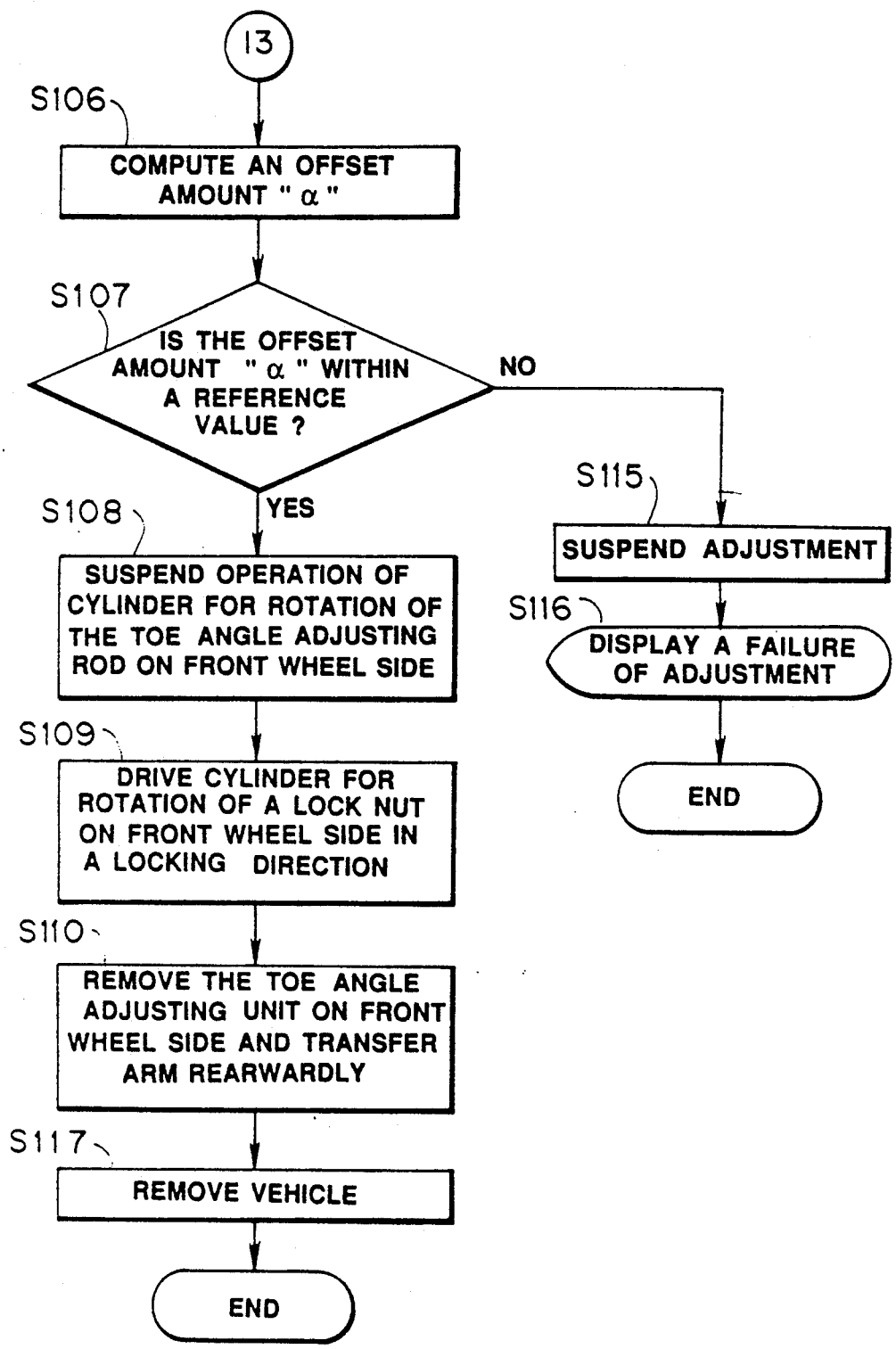

(b) Toe Angle Adjustment for Front Wheels:

The toe angle adjustment for the front wheels 2F is performed by means of procedures from step S80 after the step S30 in FIG. 29 or the step S65 in FIG. 32. It is to be noted herein that, as operation of the toe angle adjusting unit 4F for the front wheels 4F is substantially the same as operation of the toe angle adjusting unit 4R for the rear wheels 2R, thus a detailed decription on the operation of the former will be omitted and a description will be made only on the characteristic part of the toe angle adjustment for the front wheels 2F.

The toe angle adjustment for the front wheels 2F is executed on the basis of the rear wheel composite angle I·Lr after adjustment by means of procedures from step S82 to step S86. The toe angles of the respective left-hand and right-hand front wheels 2F with respect to the rear wheel composite angle I·Lr is adjusted to amount to a target value on the basis of a direction of the rear wheel composite angle I·Lr set at an angle of zero degree. The target value is set according to the following:

$$\text{Target Value} = \frac{\text{Upper Limit Reference Value} + \text{Lower Limit Reference Value}}{2}$$

More specifically, after the rear wheel composite angle I·Lr has been computed at the step S82 on the basis of a tire angle of the rear wheel 2R which has been already adjusted, the flow proceeds to step S83 where a steered angle of each of the front wheels 2F with respect to a steered angle of the steering wheel 8 is computed and a found tire angle of each of the front wheels 2F is read at step S83. Then at step S84, the target value is computed for the toe-in amount of each of the front wheels 2F in accordance with the above equation. At step S85, a toe angle adjusting amount for each front wheel 2F is computed on the basis of a difference between a toe angle and the target value, the toe angle being obtained by correcting the found tire angle measured on the basis of the rear wheel composite angle I·Lr and then deducting a steered angle of the front wheel from the above corrected amount. At step S86, a toe-in amount adjusting amount for the toe-in adjusting rod is then computed.

In the toe angle adjustment for the front wheels 2F, operation of the fourth cylinder 538 for rotation of the toe angle adjusting rod 601 on the front wheel side in full stroke is performed at the steps as shown in FIG. 37 after the cylinder speed altering means 540 has been changed to a high speed mode in substantially the same manner as operation of the cylinder in the toe angle adjustment for the rear wheels 2R.

As have been described hereinabove, the tire angle of the front wheel 2F is measured at step S103 after the toe angle of the front wheel 2F has been adjusted at step S102, the front wheel composite angle I·Lf is computed at step S104, and an angle $\alpha$ deviated from the rear wheel composite angle I·Lr is computed at step S106. If the deviated angle $\alpha$ is not within a reference scope of a given offset value $\alpha$ as shown in FIG. 39, the flow proceeds to step S115 where the adjustment is suspended and "Not Adjustable" is displayed on a display screen of the display unit at step S116, then leading to re-adjustment for the toe angle of the front wheel 2F.

DISORDER DETECTING ROUTINE PROCESSING FOR TOE ANGLE MEASURING UNIT 4

Given the following, disorders or abnormalities in the toe angle measuring unit 4 are to be detected.

A deviation in the tire angles on the basis of the toe angle adjustment, $\Delta\theta$, is detected using the two displacement measuring units 410 which consist of the forward displacement measuring unit 410a (sensor A) and the rearward displacement measuring unit 410b (sensor B) which are diposed at forward and rearward positions in a longitudinal direction, respectively. As the forward and rearward displacement measuring units 410a and 410b are disposed at an equally spaced relationship (S/2) from the support shaft 406, a displacement amount (An−Ao) detected by the forward displacement measuring unit 410a should be equal to another displacement amount (Bn−Bo) detected by the rearward displacement measuring unit 410b in their absolute values. Accordingly, if there is a discrepancy between their absolute values, it is to be found that there would be a disorder or abnormality in operation in at least one of the displacement measuring units 410. Furthermore, a probability of occurrence of disorders or abnormalities is greater when the detecting rod 410d of the displacement measuring unit 410 is extended than when it is shortened. In other words, a probability of occurrence of such an error is rendered higher at the time of extending the detecting rod 410d because the detecting rod 410d is extended by an urging force of the compression spring 410e. As there is detected a disorder or abnormality in the displacement measuring unit 410, there is determined a tire angle on the basis of a value detected by the displacement measuring unit 410 on the side of the detecting rod 410d which is shortened in the toe angle adjustment. That is, a deviation in the tire angle, $\Delta\theta$, on the basis of the toe angle adjustment is determined.

Figure 38:
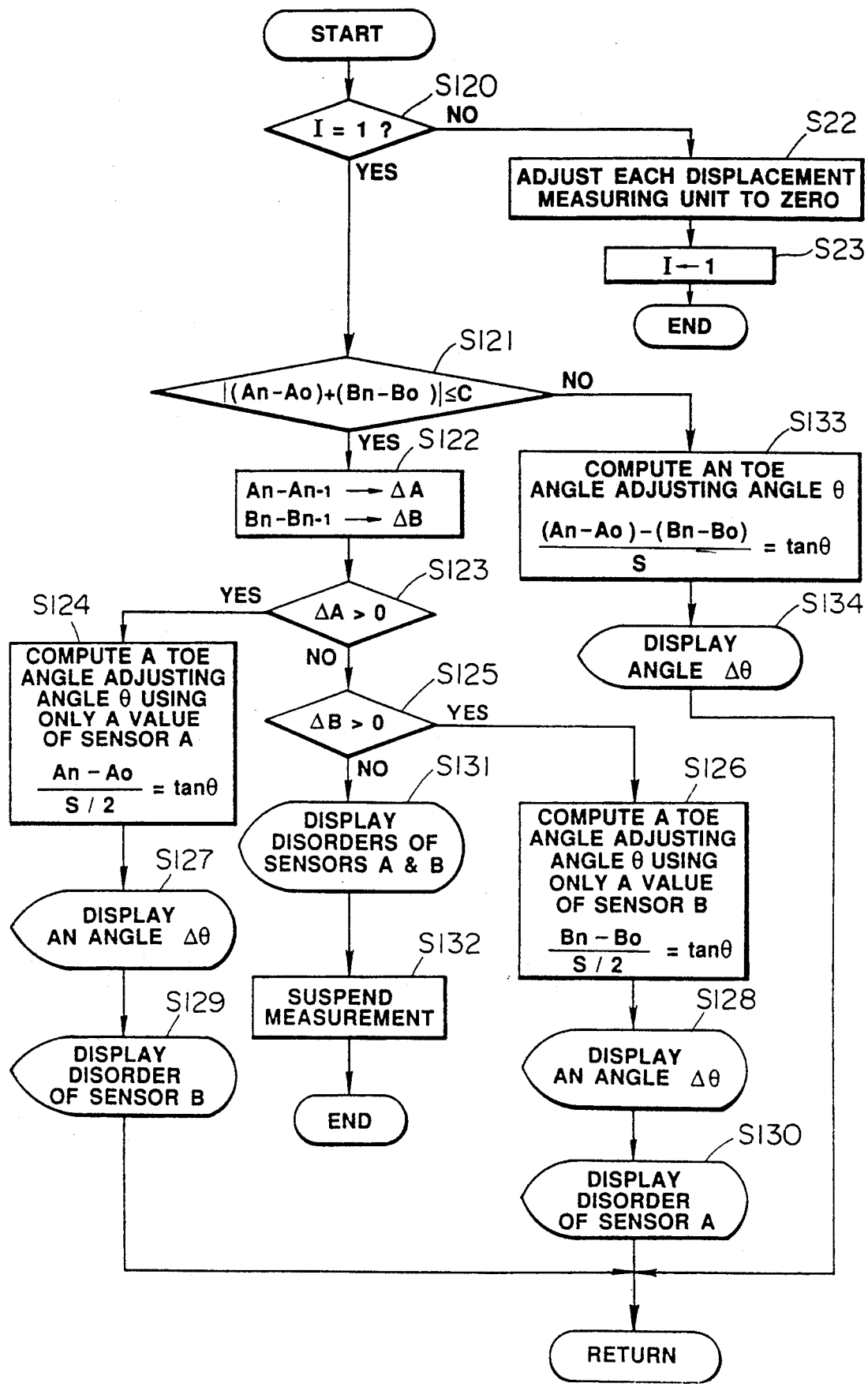

Given the foregoing, the disorder detecting routine processing will be described below on the basis of the flowchart as shown in FIG. 38.

First at step S121, it is decided whether the forward and rearward displacement measuring units 410a and 410b are normal or abnormal in operation by checking whether the sum of a displacement amount (An−Ao) and another displacement amount (Bn−Bo) of the detecting rods 410d on the basis of the values An and Bn detected in the order is within an acceptable margin of error (C). In this case, the detected values An and Bn are represented both by positive sign (+) when they increase or decrease in a direction inside the vehicle body.

If it is decided that there is abnormality in operation of the displacement measuring units 410, the flow proceeds to step S122. Then a deviated tire angle $\Delta\theta$ is computed only on the basis of a measured result of an increase or decrease of the values An and Bn obtained by the displacement measuring unit 410 that is in a direction of being shortened, in accordance with the processing from step S123 to step S126. The deviated tire angle $\Delta\theta$ is displayed at steps S127 and S128, and there is displayed at steps S129 and S130 a disorder or abnormality on the side of the displacement measuring unit 410 that is in a direction of being extended.

If it is obtained the measured result that the forward and rearward displacement measuring units 410a and 410b extend in both cases, it is decided that both are abnormal in operation so that the display unit displays to that effect at step S131 followed by suspension of the operation of the toe angle measuring unit 4.

If it is decided to be normal at the step S121, a deviated tire angle $\Delta\theta$ is computed on the results obtained by the forward and rearward displacement measuring units 410a and 410b, respectively, at step S133, and the deviated tire angle is displayed at step S134.

VARIATIONS (Step S35 in FIG. 29)

For the toe angle adjusting mechanism 6 for the rear wheel 2R, it may be mounted on either of the right-hand rear wheel 2RR or the left-hand rear wheel 2RL only.

In this case, in the flowchart as shown in FIG. 29, the flow advances from step S34 to step S35 where a target adjustment value for only one wheel is computed. Then at step S37, it is to be noted that this target adjustment value is two times as large as a target adjustment value to be adjusted in adjusting both the righ-hand and left-hand rear wheels 2R. In this case, the number of the toe angle adjusting units 5 may be reduced from four to three in this embodiment.

The following variants should also be interpreted to be encompassed within the scope of the present invention.

Figure 28:
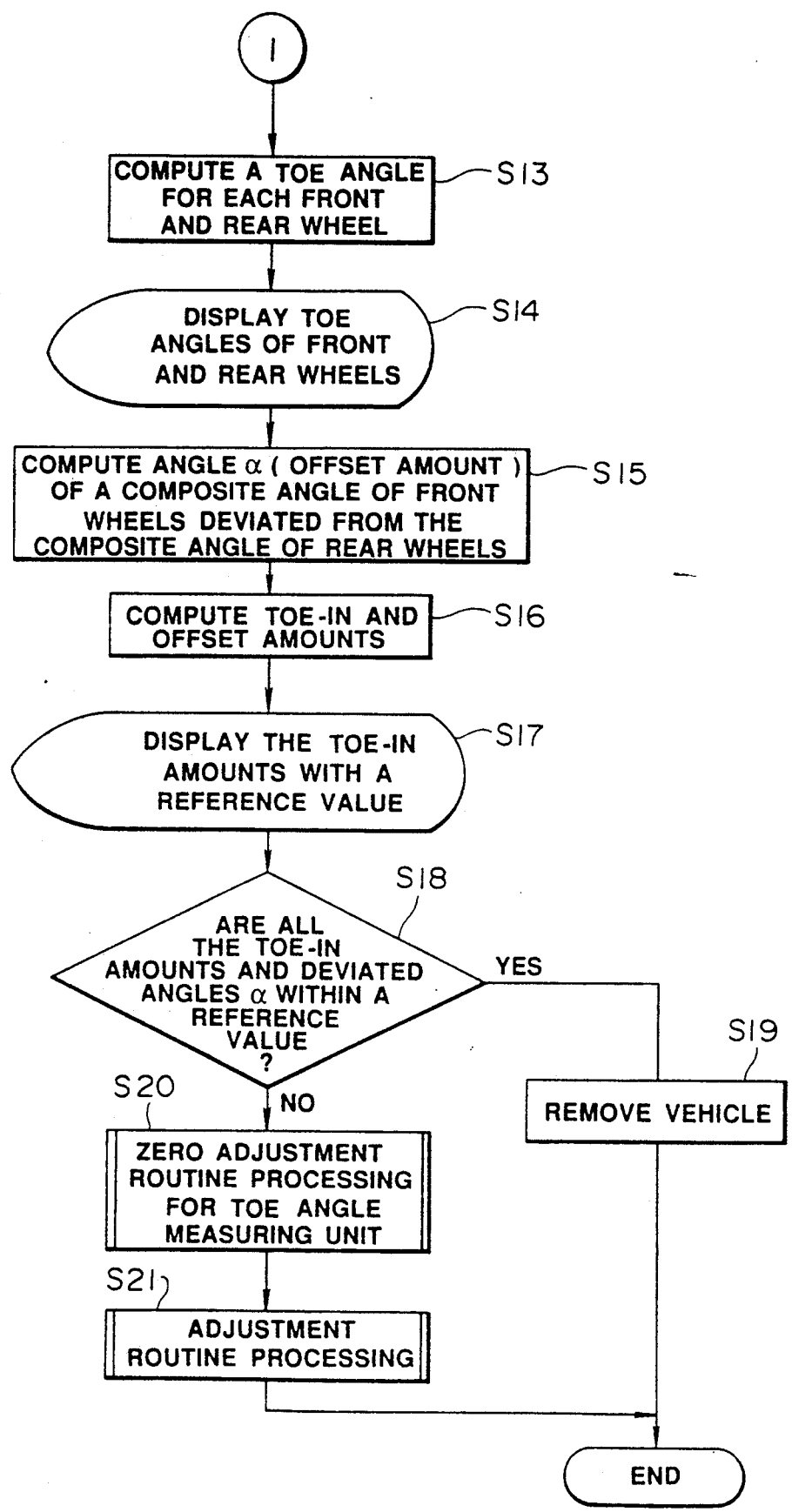

At the step S13 in FIG. 28, the found tire angle may be treated as a toe angle for the left-hand and right-hand rear wheel 2R. In this case, for instance, when a toe angle of only one rear wheel 2R is adjusted, a sum of a deviation of the toe angle of the right-hand rear wheel 2RR and a deviation of the toe angle of the left-hand rear wheel 2RL may be set as a value to be adjusted.

For a vehicle body with a four wheel steering mechanism in which the front wheels 2F are steered together with the rear wheels 2R, a toe angle of the rear wheel 2R may be adjusted by cancelling the rear wheel steering mechanism so as to forcibly bring the rear wheels 2R into a neutral state.

What is claimed is:

1. A method for adjusting a toe angle of a wheel of a vehicle comprising:

a step of measuring a first tire angle of each of the front wheels and the rear wheels on the basis of a tire angle measuring unit;

a step of determining a first toe angle adjusting amount so as to allow a toe angle of the rear wheels to amount to a target toe angle therefor in a relative relationship of one of the rear wheels with the other thereof only by adjusting the toe angle of either one of the rear wheels;

a step of adjusting a toe angle of either one of the rear wheels on the basis of the first toe angle adjusting amount;

a step of determining a second tire angle of the rear wheel using the tire angle measuring unit after the toe angle of the rear wheel has been adjusted;

a step of determining a composite angle of the rear wheels from the second tire angle, the composite angle representing a forward advancing direction of the vehicle, the direction being decided on the basis of a relative relationship of one of the rear wheels with the other thereof;

a step of converting the first tire angle of the front wheels to a tire angle based on the composite angle of the rear wheels to yield a corrected tire angle therefor;

a step of detecting a toe angle of the front wheels from the third tire angle thereof;

a step of determining a second toe angle adjusting amount for the front wheels from the toe angle of the front wheels detected from the corrected tire angle thereof and a target toe angle therefor; and a step of adjusting the toe angle of the front wheels on the basis of the second toe angle adjusting amount.

2. A method for adjusting a toe angle of a wheel of a vehicle comprising:

a step of measuring a first tire angle of each of the front wheels and the rear wheels on the basis of a tire angle measuring unit;

a step of determining a first composite angle of the rear wheels from the first tire angle of the rear wheels, the composite angle representing a forward advancing direction of the vehicle, the direction being decided on the basis of a relative relationship of one of the rear wheels with the other thereof;

a step of converting the first tire angle of the rear wheels to a tire angle based on the first composite angle of the rear wheels to yield a corrected tire angle therefor;

a step of determining a first toe angle adjusting amount so as to allow the corrected tire angle of the rear wheels to amount to a target toe angle therefor in a relative relationship of one of the rear wheels with the other thereof only by adjusting the toe angle of either one of the rear wheels, the corrected tire angle of the rear wheels being regarded as a toe angle thereof;

a step of determining a second tire angle of the rear wheel using the tire angle measuring unit after the toe angle of the rear wheel has been adjusted;

a step of determining a second composite angle of the rear wheels from the second tire angle of the rear wheels, the composite angle representing a forward advancing direction of the vehicle, the direction being decided on the basis of a relative relationship of one of the rear wheels with the other thereof;

a step of converting the first tire angle of the front wheels to a tire angle based on the second composite angle of the rear wheels to yield a corrected tire angle therefor;

a step of detecting a toe angle of the front wheels from the corrected tire angle for the front wheels;

a step of determining a second toe angle adjusting amount from the toe angle of the front wheels detected from the corrected tire angle therefor and a target toe angle therefor; and a step of adjusting the toe angle of the front wheels on the basis of the second toe angle adjusting amount.

3. A method for adjusting a toe angle of a wheel of a vehicle comprising:

a step of measuring a tire angle of each of the front wheels and the rear wheels on the basis of a tire angle measuring unit to yield a found tire angle thereof;

a step of determining a composite angle of the rear wheels from the found tire angle of the rear wheels, the composite angle being defined as a forward advancing direction, the direction being decided on the basis of a relative relationship of one of the rear wheels with the other thereof;

a step of detecting a steered angle of a steering wheel by a steered angle detecting means;

a step of setting a steered angle for the front wheels corresponding to the steered angle of the steering wheel;

a step of converting the found tire angle of the front wheels to a tire angle using the composite angle of the rear wheels to yield a corrected tire angle thereof;

a step of computing a toe angle of the front wheels by subtracting the steered angle of the respective front wheels from the corrected tire angle thereof;

a step of determining a toe angle adjusting amount for the front wheels from the toe angle of the respective front wheels and a target toe angle therefor; and a step of adjusting a toe angle for each of the front wheels on the basis of the toe angle adjusting amount.

4. A method as claimed in claim 3, further comprising a step of adjusting a toe angle of each of the rear wheels prior to the step of adjusting the toe angle for each of the front wheels in which the composite angle of the rear angles is computed using a found tire angle of the rear wheels obtained by measuring a tire angle thereof after a toe angle of the rear wheels has been adjusted, said step of adjusting the toe angle for the rear wheels comprising:

a step of determining a toe angle adjusting amount for each of the rear wheels so as to allow the found tire angle of each of the rear wheels to amount to a target toe angle therefor, said found tire angle thereof being regarded as a toe angle thereof; and a step of adjusting the toe angle of each of the rear wheels using the toe angle adjusting amount therefor.

5. A method as claimed in claim 3, further comprising a step of adjusting a toe angle of each of the rear wheels separately from the step of adjusting the toe angle of the front wheels, said step of adjusting the toe angle of the rear wheels comprising:

a step of determining the composite angle of the rear wheels on the basis of the found tire angle of the rear wheels;

a step of converting the found tire angle of the rear wheels to a tire angle using the composite angle of the rear wheels to yield a corrected tire angle therefor;

a step of determining a toe angle adjusting amount for each of the rear wheels so as to allow the corrected tire angle therefor to amount to a target angle therefor, said corrected tire angle being regarded as a toe angle therefor; and a step of adjusting the toe angle of each of the rear wheels using the toe angle adjusting amount therefor.

6. A method as claimed in claim 3, further comprising a step of adjusting a toe angle of one of the rear wheels prior to the step of adjusting the toe angle of each of the front wheels in which the composite angle of the rear wheels is computed using a found tire angle thereof obtained by measuring a tire angle of the rear wheels after a toe angle of the rear wheels has been adjusted, said step of adjusting the toe angle of one of the rear wheels comprising:

a step of determining a toe angle adjusting amount for the one of the rear wheels so as to allow the found tire angle thereof to amount to a target toe angle for the rear wheels by adjusting the toe angle of the rear wheel in a relative relationship of one of the rear wheels with the other thereof, the found tire angle thereof being regarded as a toe angle thereof; and a step of adjusting the toe angle of either one of the rear wheels using the toe angle adjusting amount.

7. A method as claimed in claim 3, further comprising a step of adjusting a toe angle of one of the rear wheels prior to the step of adjusting the toe angle of the front wheels in which the composite angle of the rear wheels is computed using a found tire angle thereof obtained by measuring a tire angle of the rear wheels after a toe angle thereof has been adjusted, said step of adjusting the toe angle of the one of the rear wheels comprising:

a step of determining a tire angle of the rear wheels using the tire angle detecting unit to give a found tire angle thereof;

a step of determining a composite angle of the rear wheels from the found tire angle thereof;

a step of converting the found tire angle thereof to a tire angle therefor using the composite angle of the rear wheels to give a corrected tire angle therefor;

a step of determining a toe angle adjusting amount for the rear wheels so as to allow the corrected tire angle for each of the rear wheels to amount to a target toe angle therefor by adjusting a toe angle of either one of the rear wheels in a relative relationship of one of the rear wheels with the other thereof, and a step of adjusting the toe angle for the either one of the rear wheels on the basis of the toe angle adjusting amount therefor.

8. A method as claimed in claim 4, wherein the toe angle for the front wheels and the rear wheels is adjusted by feeding back the found tire angle of each of the front and rear wheels.

9. A method as claimed in claim 8, wherein the toe angle for the front wheels and the rear wheels is adjusted by feeding back the found tire angle of each of the front and rear wheels at a final stage at which the toe angle of the front and rear wheels is adjusted.

10. A toe angle adjusting apparatus for a vehicle comprising:

a tire angle measuring means for measuring a first tire angle of each of the front wheels and the rear wheels;

a toe angle adjusting means for adjusting a toe angle of the front and rear wheels, disposed so as to correspond to the front wheels and either one of the rear wheels;

an adjusting amount setting means for setting a first toe angle adjusting amount for each of the front wheels and the either one of the rear wheels so as to allow the first tire angle thereof to amount to a target toe angle therefor in a relative relationship of one of the rear wheels with the other thereof only by adjusting a toe angle of the either one of the rear wheels, the first tire angle thereof being regarded as a toe angle therefor;

a first controlling means for controlling operation of the toe angle adjusting means disposed to correspond to the either one of the rear wheels on the basis of the first toe angle adjusting amount;

a composite angle computing means for computing a composite angle of the rear wheels using a second tire angle thereof measured by the tire angle measuring means after the toe angle of the rear wheels has been adjusted, the composite angle thereof representing a forward advancing direction of the vehicle, said direction being decided by the relative relationship of one of the rear wheels with the other thereof;

a tire angle correcting means for correcting the first tire angle of the front wheels to a tire angle therefor so as to be on the basis of the composite angle thereof to provide a corrected tire angle;

a toe angle detecting means for detecting a toe angle of each of the front wheels from the corrected tire angle therefor;

a second adjusting amount setting means for setting a second adjusting amount from the toe angle of the front wheels detected by said toe angle detecting means and a target toe angle therefor; and a second controlling means for controlling operation of the toe angle adjusting means for the front wheels on the basis of the second toe angle adjusting amount therefor.

11. A toe angle adjusting apparatus for a vehicle comprising:

a tire angle measuring means for measuring a first tire angle of each of the front wheels and the rear wheels;

a toe angle adjusting means for adjusting a toe angle of the front and rear wheels, disposed so as to correspond to the front wheels and either one of the rear wheels;

a first composite angle computing means for computing a first composite angle of the rear wheels on the basis of the first tire angle thereof, the composite angle thereof representing a forward advancing direction of the vehicle, said direction being decided by the relative relationship of one of the rear wheels with the other thereof;

a first tire angle correcting means for correcting the first tire angle for the rear wheels to a tire angle therefor based on the composite angle thereof to give a first corrected tire angle thereof;

a first adjusting amount setting means for setting a first toe angle adjusting amount so as to allow the first corrected tire angle therefor to amount to a target toe angle therefor in a relative relationship of one of the rear wheels with the other thereof only by adjusting a toe angle of the either one of the rear wheels, said first corrected tire angle therefor being regarded as a toe angle therefor;

a first controlling means for controlling operation of the toe angle adjusting means for the rear wheel disposed on the either one of the rear wheels on the basis of the first toe angle adjusting amount;

a second composite angle computing means for computing a second composite angle of the rear wheels on the basis of a tire angle thereof obtained by measuring a tire angle thereof by said tire angle measuring means after the toe angle of the rear wheels has been adjusted, the composite angle thereof representing a forward advancing direction of the vehicle, said direction being decided by the relative relationship of one of the rear wheels with the other thereof;

a second tire angle correcting means for correcting the first tire angle of the front wheels to a tire angle therefor using the composite angle thereof to give a second corrected tire angle therefor;

a toe angle detecting means for detecting a toe angle of each of the front wheels from the second corrected tire angle therefor;

a second adjusting amount setting means for setting a second adjusting amount from the toe angle of the front wheels detected by said toe angle detecting means and a target toe angle therefor; and a second controlling means for controlling operation of the toe angle adjusting means for the front wheels using the second toe angle adjusting amount therefor.

12. A toe adjusting apparatus for a vehicle comprising:

a tire angle measuring means for measuring a first tire angle of each of the front wheels and the rear wheels;

a steered angle detecting means for detecting a steered angle of a steering wheel;

a toe adjusting means for adjusting a toe angle of each of the front wheels and the rear wheels disposed so as to correspond to each of the front and rear wheels;

a first toe angle setting means for setting a first toe angle adjusting amount for each of the front and rear wheels from the found tire angle thereof and a target toe angle therefor, said found tire angle being regards as a toe angle therefor;

a first controlling means for controlling operation of said toe angle adjusting means for the rear wheels on the first toe angle adjusting amount therefor;

a composite angle computing means for computing a composite angle of the rear wheels on the basis of a second tire angle of the rear wheels measured by said tire angle measuring means and adjusted for a toe angle of the rear wheels, the composite angle thereof representing a forward advancing direction of the vehicle, said direction being decided by a relative relationship of one of the rear wheels with the other thereof;

a tire angle correcting means for correcting the first tire angle of the front wheels measured by said tire angle measuring means to a second tire angle therefor on the basis of the composite angle of the rear wheels;

a steered angle setting means for setting a steered angle of each of the front wheels so as to correspond to the steered angle of the steering wheel detected by said steered angle detecting means;

a toe angle detecting means for detecting a toe angle of each of the front wheels by subtracting the steered angle of the respective front wheels from the second tire angle thereof;

a second adjusting amount setting means for setting a second adjusting amount from the toe angle of the front wheels detected by said toe angle detecting means and a target toe angle therefor; and a second controlling means for controlling operation of said toe angle adjusting means for the front wheels using the second toe angle adjusting amount.

13. A toe angle adjusting apparatus for a vehicle comprising;

a tire angle measuring means for measuring a first tire angle of each of front wheels and rear wheels;

a steered angle detecting means for detecting a steered angle of a steering wheel;

a toe angle adjusting means for adjusting a toe angle of each of the front wheels and the rear wheels disposed so as to correspond to each of the front and rear wheels;

a composite angle computing means for computing a composite angle of the rear wheels on the basis of the first tire angle thereof measured by the tire angle measuring means, the composite angle thereof representing a direction in which the vehicle advances straight, said direction being decided by a relative relationship of one of the rear wheels with the other thereof;

a first tire angle correcting means for correcting the first tire angle of the rear wheels to a second tire angle therefor corrected so as to be using the composite angle thereof to give a first corrected tire angle thereof;

a first adjusting amount setting means for setting a first toe angle adjusting amount for each of the front and rear wheels from the second tire angle thereof and a target toe angle therefor, the second tire angle thereof being regarded as a toe angle therefor;

a first controlling means for controlling operation of said toe angle adjusting means for the rear wheels using the first toe angle adjusting amount therefor;

a second tire angle correcting means for correcting the first tire angle of the front wheels to a third tire angle therefor using the composite angle of the rear wheels to give a second corrected tire angle thereof;

a steered angle setting means for setting a steered angle for each of the front wheels so as to correspond to the steered angle of the steering wheel;

a toe angle detecting means for detecting a toe angle of each of the front wheels by substracting the steered angle of the respective front wheels from the second corrected tire angle thereof;

a second adjusting amount setting means for setting a second adjusting amount from the toe angle of the front wheels detected by said toe angle detecting means and a target toe angle therefor; and a second controlling means for controlling operation of said toe angle adjusting means for the front wheels on the basis of the second toe angle adjusting amount.

14. A toe angle adjusting apparatus for a vehicle comprising: a tire angle measuring means for measuring a first tire angle of each of the front wheels and the rear wheels;

a steered angle detecting means for detecting a steered angle of a steering wheel;

a toe angle adjusting means for adjusting a toe angle of the front and rear wheels, disposed so as to correspond to the front wheels and either one of the rear wheels;

an adjusting amount setting means for setting a first toe angle adjusting amount for each of the front wheels and the either one of the rear wheels so as to allow the first tire angle thereof to amount to a target toe angle therefor in a relative relationship of one of the rear wheels with the other thereof only by adjusting a toe angle of the either one of the rear wheels, the first tire angle thereof being regarded as a toe angle therefor;

a first controlling means for controlling operation of the toe angle adjusting means for the rear wheels using the first toe angle adjusting amount therefor;

a composite angle computing means for computing a composite angle of the rear wheels using a second tire angle thereof obtained by measuring a tire angle of the rear wheels after the toe angle of the rear wheels has been adjusted, the composite angle thereof representing a forward advancing direction of the vehicle, said direction being decided by the relative relationship of one of the rear wheels with the other thereof;

a tire angle correcting means for correcting the first tire angle of the front wheels to a third tire angle therefor so as to correspond to the composite angle thereof;

a steered angle setting means for setting a steered angle of each of the front wheels so as to correspond to the steered angle of the steering wheel;

a toe angle detecting means for detecting a toe angle of each of the front wheels by subtracting the steered angle of the respective front wheels from the third tire angle therefor;

a second adjusting amount setting means for setting a second adjusting amount from the toe angle of the front wheels detected by said toe angle detecting means and a target toe angle therefor; and a second controlling means for controlling operation of the toe angle adjusting means for the front wheels on the basis of the second toe angle adjusting amount therefor.

15. A toe angle adjusting apparatus for a vehicle comprising:

a tire angle measuring means for measuring a first tire angle of each of the front wheels and the rear wheels;

a steered angle detecting means for detecting a steered angle of a steering wheel;

a toe angle adjusting means for adjusting a toe angle of the front and rear wheels, disposed so as to correspond to the front wheels and either one of the rear wheels;

a first composite angle computing means for computing a first composite angle of the rear wheels on the basis of the first tire angle thereof, the composite angle thereof representing a forward advancing direction of the vehicle, said direction being decided by the relative relationship of one of the rear wheels with the other thereof;

a first tire angle correcting means for correcting the first tire angle for the rear wheels to a tire angle therefor using the composite angle thereof to give a first corrected tire angle thereof;

a first adjusting amount setting means for setting a first toe angle adjusting amount for each of the front and rear wheels so as to allow the first corrected tire angle therefor to amount to a target toe angle therefor in a relative relationship of one of the rear wheels with the other thereof only by adjusting a toe angle of the either one of the rear wheels, said first corrected tire angle therefor being regarded as a toe angle therefor;

a first controlling means for controlling operation of a toe angle adjusting means for the rear wheel using the first toe angle adjusting amount;

a second composite angle computing means for computing a second composite angle of the rear wheels on the basis of a tire angle thereof obtained by measuring a tire angle thereof by said tire angle measuring means after the toe angle of the rear wheels has been adjusted, the composite angle thereof representing a forward advancing direction of the vehicle, said direction being decided by the relative relationship of one of the rear wheels with the other thereof;

a second tire angle correcting means for correcting the first tire angle of the front wheels to a tire angle therefor using the composite angle thereof to give a second corrected tire angle;

a steered angle setting means for setting a steered angle for each of the front wheels so as to correspond to the steered angle of the steering wheel;

a toe angle detecting means for detecting a toe angle of each of the front wheels by subtracting the steered angle of the respective front wheels from the second corrected tire angle therefor;

a second adjusting amount setting means for setting a second adjusting amount from the toe angle of the front wheels detected by said toe angle detecting means and a target toe angle therefor; and a second controlling means for controlling operation of the toe angle adjusting means for the front wheels using the second toe angle adjusting amount therefor.

16. A toe angle adjusting apparatus as claimed in one of claims 12 to 15, wherein the steered angle of the front wheels corresponding to the steered angle of the steering wheel is set separately for a vehicle with a power steering mechanism for assiting the front wheels to steer and for a vehicle without such a power steering mechanism.

17. A toe angle adjusting apparatus for a vehicle in which a toe angle adjusting mechanism is arranged so as to adjust the toe angle of wheels of the vehicle by rotating a toe angle adjusting rod about its axis, the toe angle adjusting apparatus comprising:

- a toe angle detecting means for detecting an actual toe angle of each of the wheels;
- a first arm disposed so as to face the vehicle from underneath and extending in a vertical direction;
- a first clamp means for clamping the toe angle adjusting rod, mounted on an upper end of the first arm;
- a first driving means for swinging the toe angle adjusting rod about its axis, thus rotating the first arm of the toe angle adjusting rod;
- an adjusting amount setting means for setting a toe angle adjusting amount using the actual toe angle and a target toe angle; and
- a controlling means for controlling the first driving means using the toe angle adjusting amount.

18. A toe angle adjusting apparatus as claimed in claim 17, wherein:

- the first driving means is a cylinder;
- the controlling means comprises an operation means for computing a number of swings of the first arm on the basis of the toe angle adjusting amount set by the adjusting amount setting means and a cylinder controlling means for controlling operation of the cylinder in accordance with a number of swings of the first arm determined by the operation means for computing the number of swings thereof;
- first clamp driving means for driving the first clamp means to clamp or unclamp the toe angle adjusting rod; and
- first clamp controlling means for controlling the first clamp means in response to a signal from the cylinder controlling means so as to clamp the toe angle adjusting rod when the cylinder is operated in a direction of adjusting the toe angle and to unclamp the toe angle adjusting rod when the cylinder is operated to return to its original position.

19. A toe angle adjusting apparatus as claimed in claim 18, wherein:

- the first arm is disposed displaceably between an operation position at which the first clamp means clamps the toe angle adjusting rod and a non-operation position at which the first clamp means is located underneath the toe angle adjusting rod in an awaiting state; and
- the first arm is connected to a second driving means for displacing the first arm between the operation position and the non-operation position and disposed so as to interpose a deviation absorbing means for absorbing a deviation in a vertical position of the toe angle adjusting rod with the second driving means.

20. A toe angle adjusting apparatus as claimed in claim 19, wherein:

- the toe angle adjusting mechanism is provided with a lock nut for regulating a rotational movement of the toe angle adjusting rod;
- a second arm is mounted adjacent to the first arm, extending in a vertical direction;
- a second clamp means is provided on a top end of the second arm so as to clamp the lock nut;
- a third driving means is disposed so as to swing the second arm about an axis of the lock nut;
- a fourth driving means for displacing the second arm in a direction of extending the toe angle adjusting rod between a first position at which the second clamp means clamps the lock nut and a second position at which the second clamp means is displaced toward the tow angle adjusting rod from the first position; and
- an urging means for urging the second arm toward the lock nut, which is disposed between the fourth driving means and the second arm.

21. A toe angle adjusting apparatus as claimed in claim 20, wherein:

- the cylinder is provided with a cylinder speed altering means for switching an operation speed of the cylinder between a high speed mode and a low speed mode;
- a cylinder speed controlling means for operating the cylinder at a high speed in a number corresponding to a number of full strokes of the cylinder out of the number of swings determined by the operation means for computing the number of swings thereof and at a low speed in a number corresponding to a remainder from the number of swings determined thereby.

22. A toe angle adjusting apparatus as claimed in claim 21, wherein a direction setting means for setting a direction for adjusting the toe angle using the actual toe angle of the wheels and the target toe angle.

* * * * *